US011051103B2

(12) United States Patent
Jung et al.

(10) Patent No.: US 11,051,103 B2
(45) Date of Patent: Jun. 29, 2021

(54) SOUND OUTPUT APPARATUS, DISPLAY APPARATUS AND METHOD FOR CONTROLLING THE SAME

(71) Applicant: SAMSUNG ELECTRONICS CO., LTD., Suwon-si (KR)

(72) Inventors: Dong Hyun Jung, Seoul (KR); Sang Chui Ko, Seongnam-si (KR); Dong-Kyu Park, Hwaseong-si (KR); Sang Moon Lee, Seongnam-si (KR); Byeong Geun Cheon, Seongnam-si (KR); Hae Kwang Park, Suwon-si (KR); Young Tae Kim, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 166 days.

(21) Appl. No.: 16/102,150

(22) Filed: Aug. 13, 2018

(65) Prior Publication Data

US 2019/0069089 A1 Feb. 28, 2019

(30) Foreign Application Priority Data

Aug. 23, 2017 (KR) .................. 10-2017-0106534

(51) Int. Cl.
*H04R 1/00* (2006.01)
*H04R 5/02* (2006.01)
(Continued)

(52) U.S. Cl.
CPC ............. *H04R 5/02* (2013.01); *G06F 1/1605* (2013.01); *G10K 11/22* (2013.01); *H04R 1/025* (2013.01);
(Continued)

(58) Field of Classification Search
CPC ... H04R 1/20; H04R 1/22; H04R 1/30; H04R 1/32; H04R 1/323; H04R 1/345; H04R 1/403
See application file for complete search history.

(56) References Cited

U.S. PATENT DOCUMENTS 2,789,651 A     4/1957  Daniels
4,369,857 A  *  1/1983  Frazer ..................... H04R 1/30
                                                        181/159
(Continued)

FOREIGN PATENT DOCUMENTS

EP     0725540 A2    8/1996
EP     0725540 A3    12/1998
(Continued)

OTHER PUBLICATIONS

Communication dated Jun. 19, 2019, issued by the European Patent Office in counterpart European Application No. 18 184 821.9.
(Continued)

*Primary Examiner* — Matthew A Eason
(74) *Attorney, Agent, or Firm* — Sughrue Mion, PLLC

(57) ABSTRACT

A sound output apparatus, a display apparatus and a method for controlling the same are provided. The sound output apparatus includes a housing; and at least one speaker provided on a side of the housing, wherein the housing includes an accommodation portion provided with an insertion groove to which the at least one speaker is inserted and mounted, wherein the at least one speaker includes a sound generator configured to generate a sound; and a guide tube that has a cross sectional area that changes from a first end of the guide tube to a second end of the guide tube, wherein the guide tube receives the generated sound via the first end, and the guide tube includes an outer surface having a plurality of radiation apertures arranged in at least one row.

18 Claims, 46 Drawing Sheets

(51) Int. Cl.
*G06F 1/16* (2006.01)
*G10K 11/22* (2006.01)
*H04R 1/34* (2006.01)
*H04R 1/02* (2006.01)
*H04R 3/12* (2006.01)
*H04N 5/64* (2006.01)

(52) U.S. Cl.
CPC ............... *H04R 1/345* (2013.01); *H04R 3/12* (2013.01); *H04N 5/642* (2013.01); *H04R 2499/15* (2013.01)

(56) References Cited

U.S. PATENT DOCUMENTS

| | | | |
|---|---|---|---|
| 5,111,509 | A | 5/1992 | Takeuchi et al. |
| 5,552,569 | A * | 9/1996 | Sapkowski .......... H04R 1/2865 181/151 |
| 2007/0223744 | A1 | 9/2007 | Wada |
| 2009/0274329 | A1* | 11/2009 | Ickler .................... G10K 11/26 381/338 |
| 2010/0260369 | A1 | 10/2010 | Suzuki |
| 2011/0026744 | A1 | 2/2011 | Jankovsky et al. |
| 2011/0305359 | A1 | 12/2011 | Ikeda et al. |
| 2011/0311086 | A1 | 12/2011 | Nakamura et al. |
| 2012/0183162 | A1 | 7/2012 | Chabanne et al. |
| 2012/0237070 | A1 | 9/2012 | Ickler et al. |
| 2012/0263333 | A1 | 10/2012 | Akino |
| 2013/0265226 | A1 | 10/2013 | Park et al. |
| 2014/0321689 | A1 | 10/2014 | Chen et al. |
| 2015/0341738 | A1 | 11/2015 | Lyons et al. |
| 2015/0382103 | A1 | 12/2015 | Powell |
| 2016/0170707 | A1 | 6/2016 | Petainen |
| 2016/0219364 | A1 | 7/2016 | Seefeldt et al. |
| 2017/0026726 | A1 | 2/2017 | Kim et al. |

FOREIGN PATENT DOCUMENTS

| | | |
|---|---|---|
| EP | 2 604 045 B1 | 7/2015 |
| EP | 3 334 182 A1 | 6/2018 |
| JP | 5-73068 A | 3/1993 |
| JP | 2009-296153 A | 12/2009 |
| KR | 10-2010-0044628 A | 4/2010 |
| KR | 10-1612791 B1 | 4/2016 |
| KR | 10-2017-0011795 A | 2/2017 |
| WO | 2009/134591 A1 | 11/2009 |

OTHER PUBLICATIONS

International Search Report dated Mar. 20, 2018 issued by the International Searching Authority in counterpart International Patent Application No. PCT/KR2017/013904 (PCT/ISA/210).
Communication dated Feb. 21, 2018 issued by the European Patent Office in European Patent Application No. 17204749.0.
Office Action dated Apr. 24, 2018, issued by the United States Patent and Trademark Office in U.S. Appl. No. 15/827,627.
Office Action dated Sep. 13, 2018, issued by the United States Patent and Trademark Office in U.S. Appl. No. 15/827,627.
K. R. Holland et al., "A Low-Cost End-Fire Acoustic Radiator*", Institute of Sound and Vibration Research, University of Southampton, Southampton, J. Audio Eng. Soc., vol. 39, No. 7/8, Jul./Aug. 1991, 11 pages total.
Communication dated Nov. 21, 2018 issued by the European Patent Office in counterpart European Patent Application No. 18184821.9.
International Search Report dated Dec. 14, 2018 issued by the International Searching Authority in counterpart International Patent Application No. PCT/KR2018/009052. (PCT/ISA/210).
Written Opinion dated Dec. 14, 2018 issued by the International Searching Authority in counterpart International Patent Application No. PCT/KR2018/009052. (PCT/ISA/237).
Communication dated Aug. 31, 2020, issued by the State Intellectual Property Office of P.R. China in Chinese Application No. 201810929817.5.
Communication dated Jan. 28, 2021 by Intellectual Property India in Indian Patent Application No. 201917052653.

* cited by examiner

SOUND OUTPUT APPARATUS, DISPLAY APPARATUS AND METHOD FOR CONTROLLING THE SAME

CROSS-REFERENCE TO RELATED APPLICATION(S)

This application is based on and claims priority under 35 U.S.C. § 119 from Korean Patent Application No. 10-2017-0106534, filed on Aug. 23, 2017 in the Korean Intellectual Property Office, the disclosure of which is incorporated by reference herein in its entirety

BACKGROUND

1. Field

The disclosure relates to a sound output apparatus, a display apparatus and a method for controlling the same.

2. Description of Related Art

A sound output apparatus is an apparatus capable of outputting a sound. A sound output apparatus may include a speaker device or an earphone device for generating sound waves. A sound output apparatus generates an acoustic wave by applying an electrical signal to a diaphragm provided in a speaker device or the like to vibrate it, such that a wavelength corresponding to the vibration of the diaphragm is generated in the air.

An example of a sound output apparatus includes a digital television. A digital television is a type of display apparatus, and represents an apparatus capable of providing at least one of image data and audio data to a user. A digital television converts multimedia data received from an external source (e.g., a broadcast transmission device) via a communication network and/or multimedia data stored in the form of an electric record stored in an embedded recording medium into visual information and auditory information so as to output the visual information and auditory information to a user. A digital television may be used in various fields such as home and business. In recent years, a thickness of digital televisions has become relatively thin, and in many cases, the screen is curved concavely to have a curved surface shape.

SUMMARY

Provided are a sound output apparatus, a display apparatus and a method for controlling the same capable of implementing the high immersive effect and wide sound field.

Additional aspects will be set forth in part in the description which follows and, in part, will be apparent from the description, or may be learned by practice of the presented embodiments.

In accordance with an aspect of the disclosure, a sound output apparatus includes: a housing; and at least one speaker provided on a surface of the housing, wherein the housing includes an accommodation portion provided with an insertion groove to which the at least one speaker is inserted and mounted, wherein the at least one speaker includes: a sound generator configured to generate a sound; and a guide tube that has a cross sectional area that changes from a first end of the guide tube to a second end of the guide tube, and wherein the guide tube receives the generated sound via the first end, and the guide tube includes an outer surface having a plurality of radiation apertures arranged in at least one row.

The at least one speaker may be provided on the surface of the housing such that the outer surface of the guide tube having the plurality of radiation apertures extends in a direction in parallel to the surface of the housing, a direction inclined with respect to the surface of the housing or a direction toward a normal of the surface of the housing.

The at least one speaker may be provided on at least one of an upper portion of the surface of the housing, a middle portion of the surface of the housing, and a lower portion of the surface of the housing.

The second end of the guide tube may be in contact with or adjacent to one of a side end boundary and an upper end boundary of the surface of the housing.

The guide tube may extend in a direction parallel to an upper portion boundary or a side portion boundary of the surface of the housing.

The accommodation portion provided with the insertion groove may include at least one of: a first accommodation portion provided with a first insertion groove to which the at least one speaker may be inserted and mounted, wherein the first insertion groove may protrude from the surface of the housing; a second accommodation portion provided with a second insertion groove to which the at least one speaker may be inserted and mounted, wherein the second insertion groove may be recessed in the surface of the housing, formed to be in parallel to the surface of the housing, or formed to be inclined with respect to the surface of the housing; and a third accommodation portion provided with a third insertion groove to which the at least one speaker may be inserted and mounted, wherein the third insertion groove may be formed to be inserted into the surface of the housing.

The first insertion groove may face an upper end of the housing, a side end of the housing, or a lower end of the housing.

The second insertion groove may face in a direction inclined with respect to the surface of the housing, a direction of the normal of the surface of the housing or a tangential direction of the surface of the housing.

The sound output apparatus may further include a processor configured to distribute an audio signal including of a signal of at least one channel, to the at least one speaker.

The processor may be further configured to perform at least one of up-mixing and down-mixing on the audio signal.

The at least one speaker may include at least two speakers provided on the housing.

The processor may be further configured to distribute the audio signal to the sound generator of the two speakers.

The sound output apparatus may further include a display panel provided on another surface opposite to the surface of the housing.

The surface of the housing may be an upper surface of the housing or a side surface of the housing.

The display panel may include a rigid display panel or a flexible display panel.

The plurality of radiation apertures may face in a direction toward an upper end of the housing, a direction opposite to a direction to which the display panel is directed, a side surface direction of the housing, a direction toward of a lower end of the housing, or a direction in a range between the direction toward the upper end of the housing and the direction opposite to the direction to which the display panel is directed.

In accordance with another aspect of the disclosure, a control method of a sound output apparatus includes: obtaining an audio signal composed of a signal of at least one channel; distributing the audio signal to at least one speaker, wherein the at least one speaker is provided on a surface of a housing of the sound output apparatus; and radiating a sound from the at least one speaker, wherein the at least one speaker includes: a sound generator configured to generate the sound; and a guide tube that has a cross sectional area that changes from a first end of the guide tube to a second end of the guide tube, and wherein the guide tube receives the generated sound via the first end, and the guide tube includes an outer surface having a plurality of radiation apertures arranged in at least one row.

The control method may further include performing at least one of up-mixing and down-mixing on the audio signal.

The control method may further include performing sound processing by applying a predetermined algorithm to the audio signal.

In accordance with another aspect of the disclosure, a display apparatus includes: an exterior housing; a display panel installed on a first surface of the exterior housing; and at least one speaker provided on at least one of a second surface opposite to the first surface of the exterior housing and a side surface of the exterior housing, wherein the exterior housing includes an accommodation portion provided with an insertion groove to which the at least one speaker is inserted and mounted, wherein the at least one speaker includes: a sound generator configured to generate a sound; and a guide tube that has a cross sectional area that changes from a first end of the guide tube to a second end of the guide tube, and wherein the guide tube receives the generated sound via the first end, and the guide tube includes an outer surface having a plurality of radiation apertures is arranged in at least one row.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
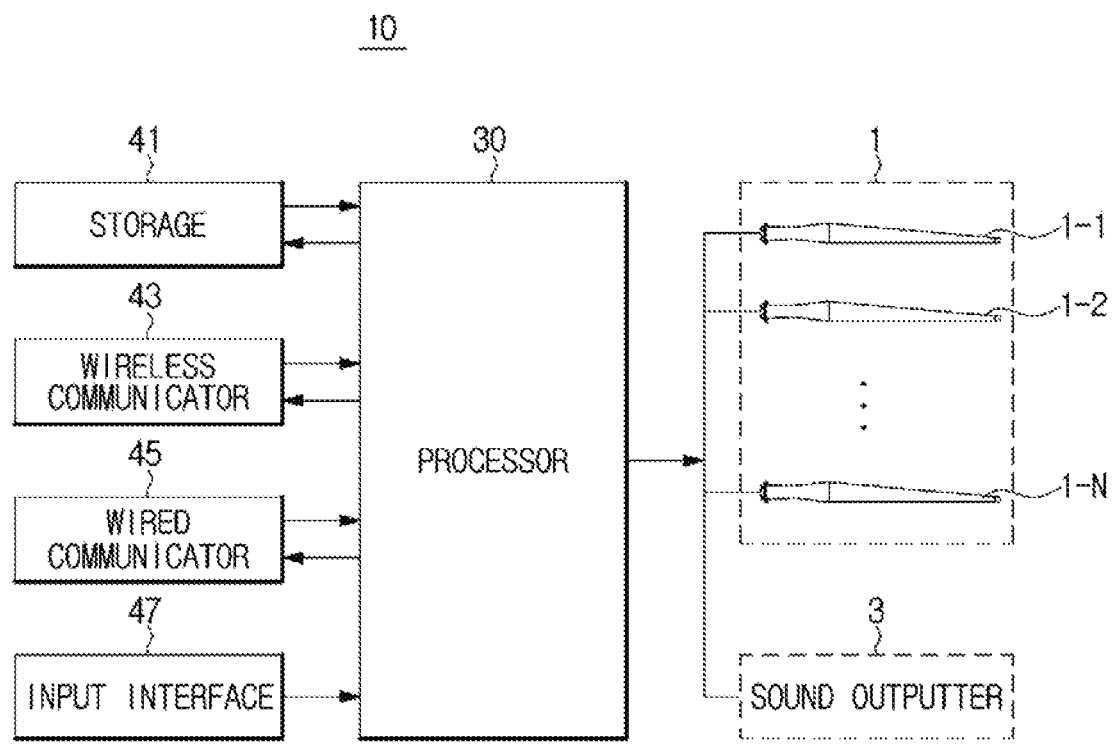
FIG. 1 is a block diagram illustrating a sound output apparatus according to an embodiment.

In the following description, like reference numerals refer to like elements throughout the specification. Terms such as "unit," "module," "member," and "block" may be embodied as hardware or software. According to embodiments, a plurality of "unit," "module," "member," and "block" may be implemented as a single component or a single "unit," "module," "member," and "block" may include a plurality of components.

It will be understood that when an element is referred to as being "connected" another element, it can be physically or electrically connected to the other element.

Also, when a part "includes" or "comprises" an element, unless there is a particular description contrary thereto, the part may further include other elements, not excluding the other elements.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms such as the first and second terms are used to distinguish one part from another part, and they do not mean a sequential expression unless otherwise specified.

As used herein, the singular forms "a," "an" and "the" are intended to include the plural forms as well, unless the context clearly indicates otherwise.

A sound output apparatus and a first sound outputter installed in the sound output apparatus according to a variety of embodiments will be described with reference to FIGS. 1 to 14.

FIG. 1 is a block diagram illustrating a sound output apparatus according to an embodiment.

Referring to FIG. 1, according to an embodiment, a sound output apparatus 10 may include a first sound outputter (or first speaker) 1 outputting a sound and a processor 30 controlling the first sound outputter 1 to output a sound. The sound may include voice, music, sound effects or various other sounds that can be transmitted in the form of waves.

The sound output apparatus 10 represents an apparatus capable of outputting a sound to the outside. For example, the sound output apparatus 10 may include a digital television apparatus, a radio apparatus, an audio apparatus, a phonograph, a voice recognition speaker apparatus, a compact disc player equipped with a speaker, a monitor apparatus provided with a speaker, a laptop computer, a tablet PC, a portable game machine, a navigation device, a personal digital assistant (PDA), a car audio device, an indoor or outdoor billboard, home appliance in which a speaker is installed, or a variety of devices capable of outputting a sound.

The first sound outputter 1 may radiate a sound wave to the outside so as to output a sound so that a user can listen to the sound transmitted through the vibration of the air.

According to an embodiment, the sound output apparatus 10 may include a single first sound outputter 1-1 or a plurality of first sound outputters 1-1, 1-2, . . . , 1-N, (N is a natural number of 1 or more). The first sound outputters 1-1, 1-2, . . . , 1-N may radiate different sounds from each other or radiate the same sound under the control of the processor 30.

The detail structure and operation of the first sound outputters 1-1, 1-2, . . . , 1-N will be described later.

The processor 30 may be configured to control an operation the first sound outputter 1 or some components that are needed for the operation of the first sound outputter 1, or be configured to control an overall operation of the sound output apparatus 10. For example, the processor 30 may include a central processing unit (CPU), a microcontroller unit (MCU), a microprocessor (MCOM), an electronic control unit (ECU) or an application processor (AP) and/or other electronic devices capable of generating various arithmetic processing and control signals.

Particularly, the processor 30 may receive sound source data from at least one of a storage 41, a wireless communicator 43, a wired communicator 45, and an input interface 47, through a wire or a circuit.

The sound source data may include audio data of at least one channel, and may further include metadata including information on audio data, as needed. For example, the audio data of at least one channel may include two-channel audio data, three-channel audio data, four-channel audio data, or five-channel audio data. The at least one channel audio data may further include audio data reproduced by the woofer, such as 2.1 channel, or 5.1 channel. In addition, the at least one channel audio data may further include an upper speaker channel for a height (sound) effect, such as a 5.1.2 channel or a 7.1.4 channel. In addition, the sound source data may include audio data defined in various forms based on design considerations and requirements.

According to an embodiment, when the sound source data is transmitted, the processor 30 may identify whether the first sound outputter 1 and/or a second sound outputter 3 (or second speaker) correspond to the channel of the transmitted sound source data, and as needed, the processor 30 may perform a channel mapping. For example, when the sound source data includes a number of channels of audio data that is smaller than the total number of sound output apparatuses, that is, the first sound outputter 1 and/or the second sound outputter 3, the processor 30 may perform up-mixing corresponding to a sound processing, to further increase the number of channels of the sound data so that the sound data having an appropriate channel can be output from each of the first sound outputter 1 and/or the second sound outputter 3. In contrast, when the sound source data includes audio data of a number of channels that is larger than the total number of the first sound outputter 1 and/or the second sound outputter 3, the processor 30 may perform down-mixing to reduce the number of channels of the sound data so that the number of channels corresponds to the total number of the first sound outputter 1 and/or the second sound outputter 3. When the sound source data is equal to the total number of output devices of the sound, that is, the first sound outputter 1 and/or the second sound outputter 3, the processor 30 may not perform the up-mixing and down-mixing.

Further, according to another embodiment, the processor 30 may perform additional sound processing after performing channel mapping or even if channel mapping is not performed. For example, the processor 30 may apply appropriate algorithms to the sound source data in consideration of the characteristics of the first sound outputter 1 and/or the second sound outputter 3 to perform sound processing. More particularly, among audio data of the plurality of channels, the processor 30 may perform the sound processing such as delaying the output of audio data of at least one channel, adding a reinforcement sound to audio data of at least one channel, or amplifying of audio data of at least one channel. The sound processing of the processor 30 may be performed for at least one of outputting a sound having the high immersive effect and outputting a natural sound. Processing for outputting the natural sound and processing for outputting the sound with the high immersive effect may be optional depending on predetermined settings or a user's operations or selections.

The processor 30 may be configured to execute a predetermined application (which may be referred to as a program or an App) to perform the above-described operations or selections.

The processor 30 may transmit sound source data without change or channel-mapped sound source data and/or additionally processed-sound source data to the first sound outputter 1 in the form of an electrical signal. The transmission of the sound source data can be implemented through a wire or a circuit.

In addition, the processor 30 may further perform various operations according to a user's operations, selections, or settings.

Referring to FIG. 1, depending on embodiments, the sound output apparatus 10 may further include the second sound outputter 3 separately provided from the first sound outputter 1 and configured to output a sound that is the same as or different from the sound output by the first sound outputter 1. In addition, the sound output apparatus 10 may further include at least one of a storage 41, a wireless communicator 43, a wired communicator 45, and an input interface 47. At least one of the second sound outputter 3, the storage 41, the wireless communicator 43, the wired communicator 45, and the input interface 47 may be omitted depending on design considerations.

The second sound outputter 3 may be configured to output sound to the outside to provide information to a user in a auditory manner. As needed, the sound output apparatus 10 may include one second sound outputter 3 or a plurality of second sound outputters 3. Depending on embodiments, the second sound outputter 3 may be included within the sound output apparatus 10 or may be provided independent of the sound output apparatus 10. For example, the second sound outputter 3 may be implemented using at least one speaker device.

The storage 41, the wireless communicator 43, the wired communicator 45 and/or the input interface 47 are operated together with each other or operated independently of each other so as to provide the sound data to the processor 30.

The storage 41 may temporarily or non-temporarily store the sound source data and may transmit the sound source data to the processor 30 in response to a request from the processor 30. In addition, the storage 41 may store various types of information required for calculation, processing or control operations of the processor 30 in an electronic form. For example, the storage 41 may store all or a part of various data, an application, a filter, or an algorithm, that are required for the operation of the processor 30. The application may be obtained through an electronic software distribution network that is accessible via the wireless communicator 43 or the wired communicator 45.

For example, the storage 41 may include at least one of a main memory and an auxiliary memory. The main memory may be implemented using a semiconductor storage medium such as ROM and/or RAM. For example, the ROM may include a conventional ROM, EPROM, EEPROM, and/or MASK-ROM. For example, the RAM may include DRAM and/or SRAM. The auxiliary memory may be implemented by using at least one storage medium capable of permanently or semi-permanently storing data. For example, the auxiliary memory may include a flash memory device, a secure digital (SD) card, a solid state drive (SSD), a hard disk drive (HDD), a magnetic drum, a compact disk (CD), a DVD or an optical disc, such as a laser disc, a magnetic tape, a magneto-optical disc, and/or a floppy disc.

The wireless communicator 43 may be configured to communicate with at least one of other external terminal apparatus and a server apparatus through a wireless communication network. The wireless communicator 43 may receive the sound source data from the other terminal apparatus or the server apparatus and transmit the received sound source data to the processor 30. The external terminal device may include a smart phone, a cellular phone, a tablet PC, a laptop computer, a desktop computer, a wearable device, or other various communication devices.

The wireless communicator 43 may be implemented using an antenna, a communication chip, or a substrate capable of transmitting an electromagnetic wave to the outside or receiving an electromagnetic wave transmitted from the outside.

The wireless communicator 43 may be configured to perform communication with at least one of an external terminal device and a server device using a short range communication technology or configured to perform communication with at least one of a terminal device and a server device at a remote location using a mobile communication technology.

For example, the short range communication technology may include Bluetooth, Bluetooth Low Energy, CAN communication, Wi-Fi, Wi-Fi Direct, WiMAX, ultra-wide band (UWB), zigbee, infrared data association (IrDA), near field communication (NFC), or the like.

The mobile communication technology may include a technology based on a mobile communication standard such as 3GPP, 3GPP2 or WiMAX series, wherein the mobile communication standard technology may include Global System for Mobile Communication (GSM), Enhanced Data GSM Environment (EDGE), Code Division Multiple Access (WCDMA), Code Division Multiple Access (CDMA), or (Time Division Multiple Access (TDMA).

The wired communicator 45 may be configured to perform communication with at least one of an external terminal device and a server device based on a wired communication network. The wired communicator 45 may receive sound source data from other terminal apparatuses or server apparatuses and transmit the received sound source data to the processor 30. The wired communication network may perform communications through a cable such as a pair cable, a coaxial cable, an optical fiber cable, or an Ethernet cable.

The input interface 47 may be connectable with other devices provided separately from the sound output apparatus 10 such as an external storage device. The input interface 47 may receive the sound source data from other devices and transmit the received sound source data to the processor 30.

For example, the input interface 47 may include a universal serial bus (USB) terminal, and may also include at least one interface terminals among a variety of terminals for the interface such as a High Definition Multimedia Interface (HDMI) terminal, or a Thunderbolt terminal.

Hereinafter the first sound outputter 1 will be described in more detail with reference to FIGS. 2 to 14.

Figure 2:
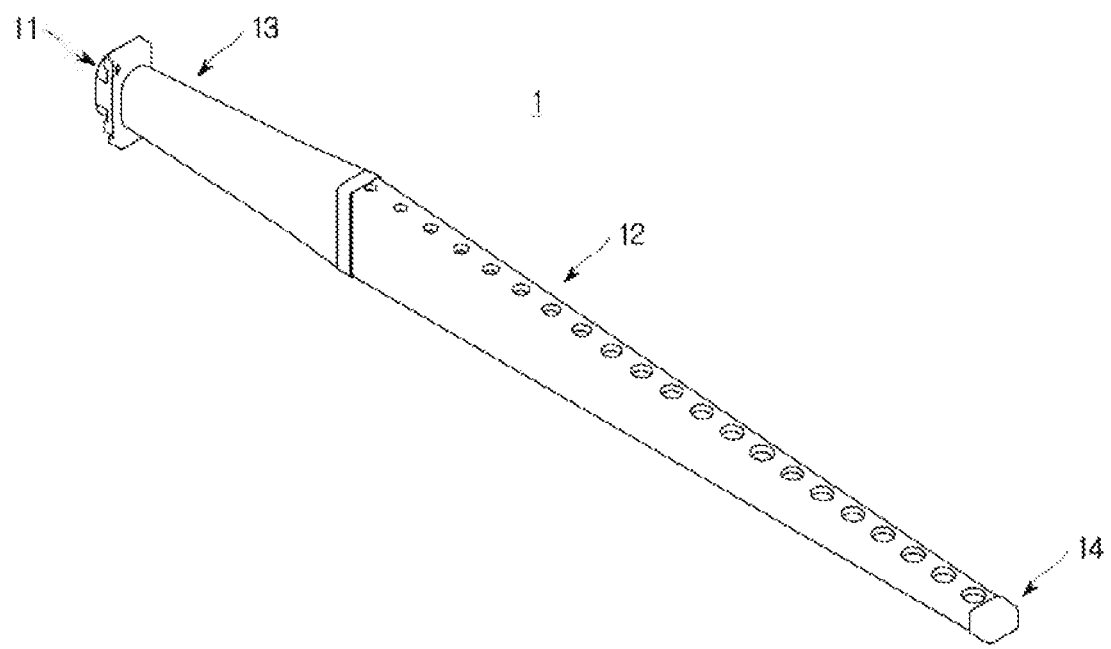
FIG. 2 is a perspective view of a first sound outputter according to a first embodiment.
Figure 3:
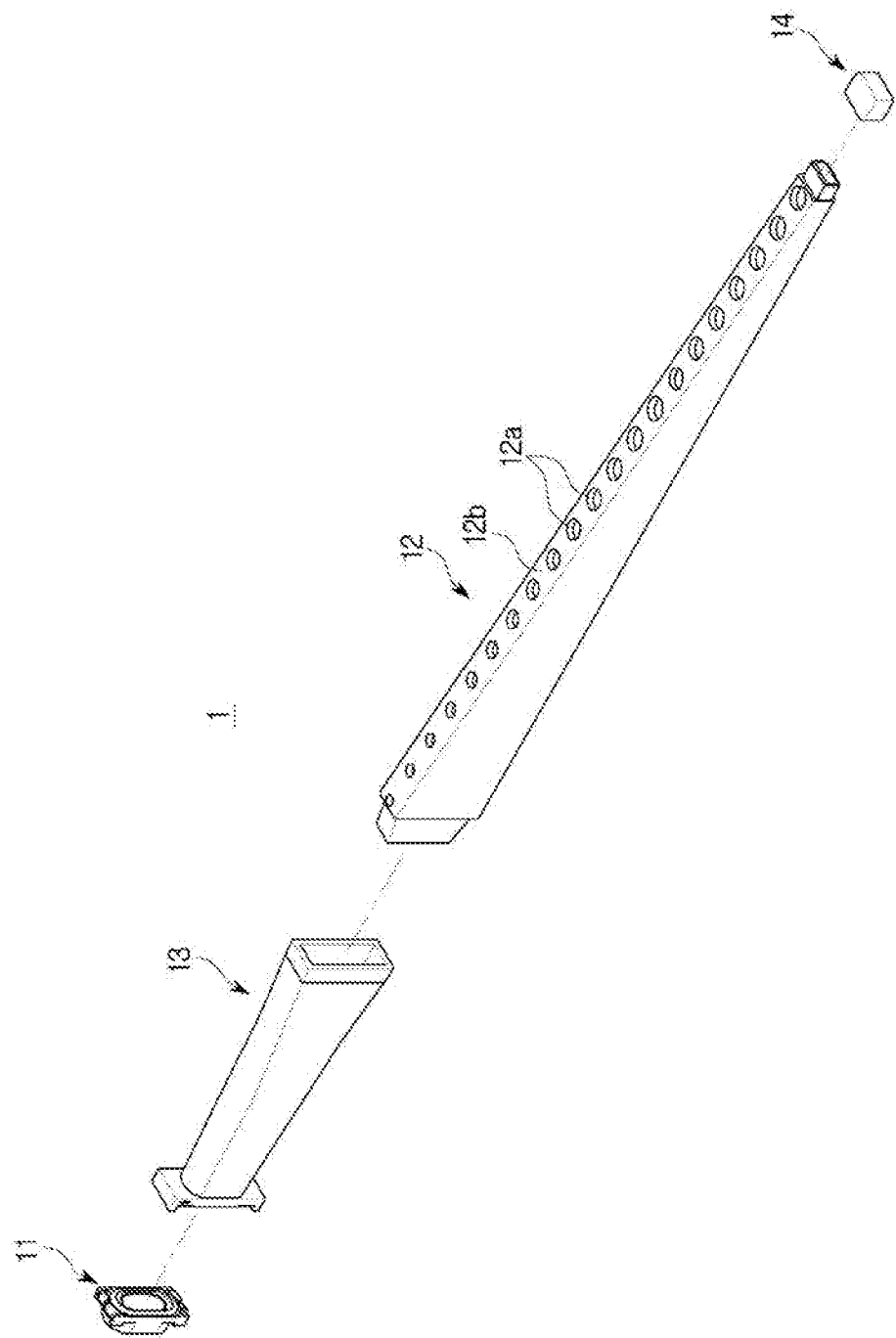
FIG. 3 is an exploded perspective view of the first sound outputter according to the first embodiment.
Figure 4:
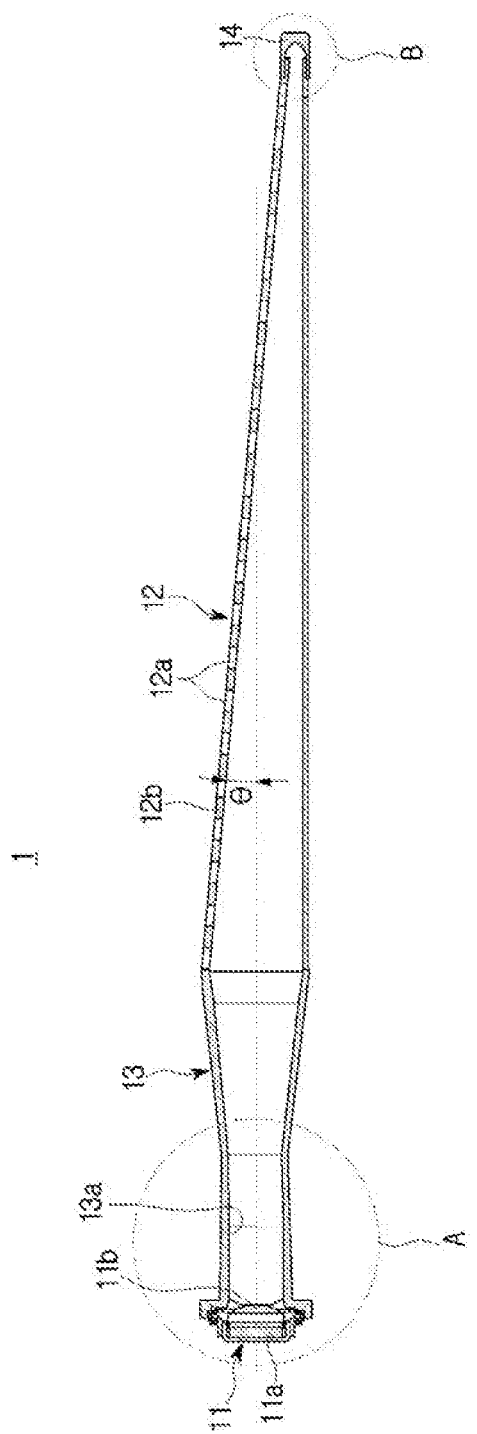
FIG. 4 is a cross-sectional view of the first sound outputter according to the first embodiment.
Figure 5:
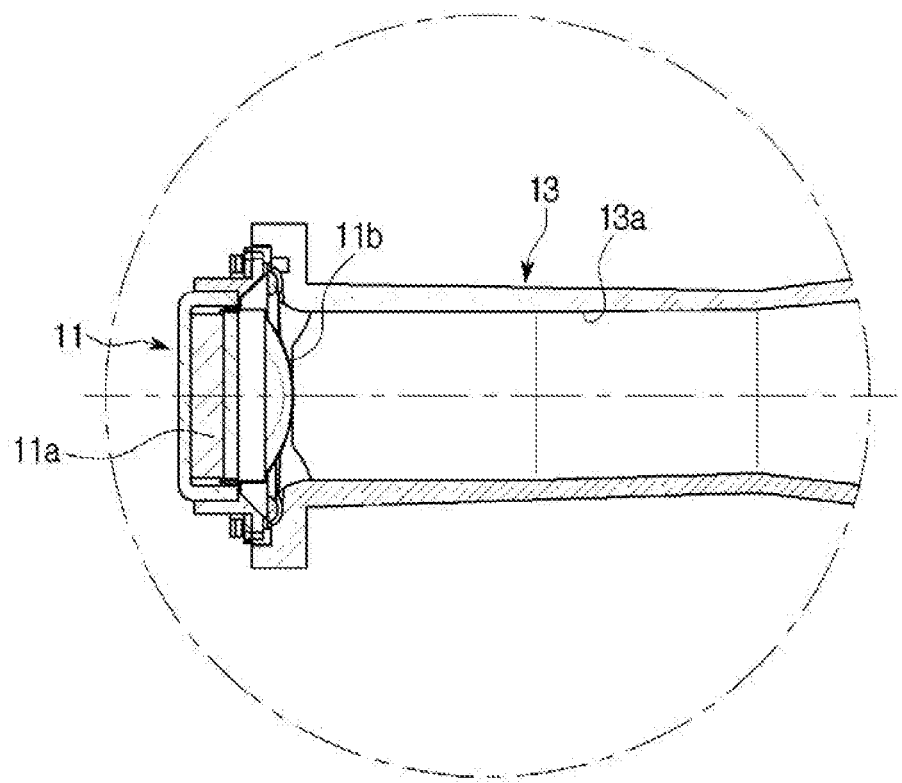
FIG. 5 is an enlarged view of an example of a region A in FIG. 4.
Figure 6:
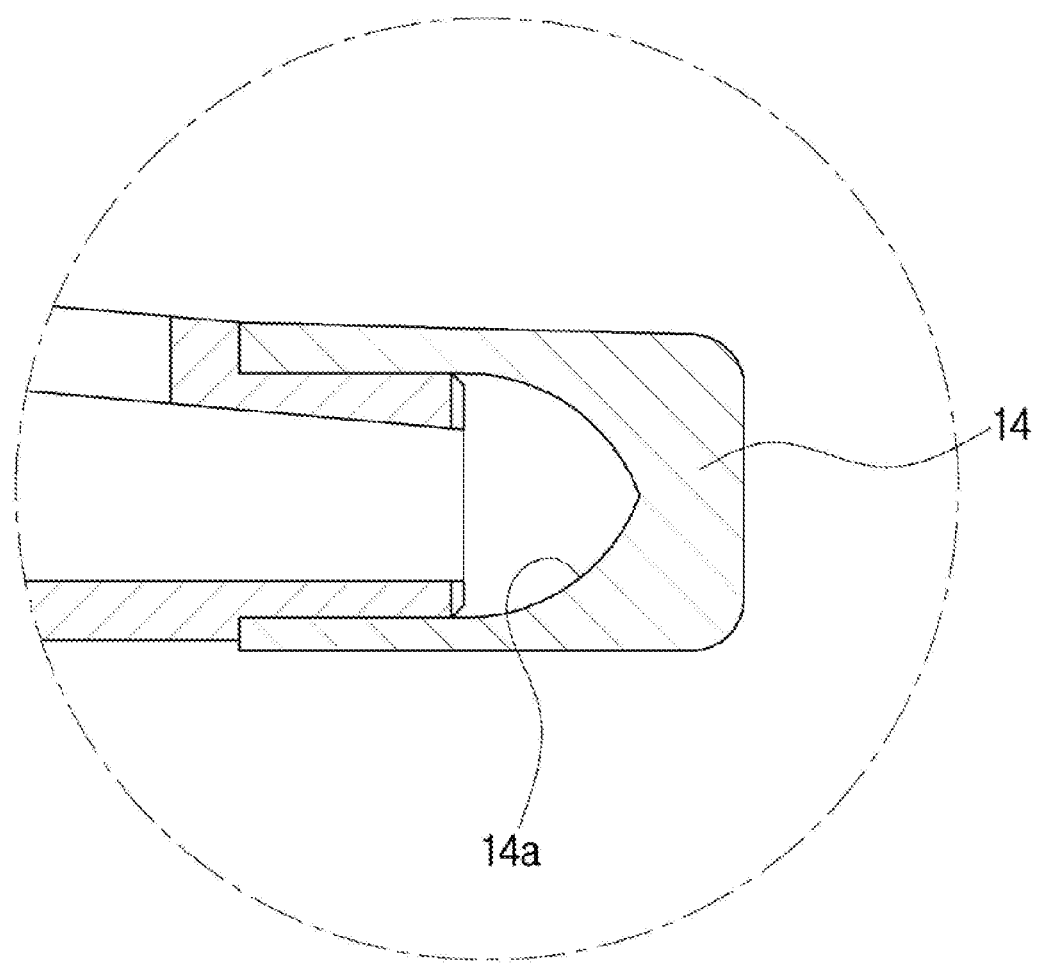
FIG. 6 is an enlarged view of an example of a region B in FIG. 4.

FIG. 2 is a perspective view of a first sound outputter according to a first embodiment, FIG. 3 is an exploded perspective view of the first sound outputter according to the first embodiment, FIG. 4 is a cross-sectional view of the first sound outputter according to the first embodiment, FIG. 5 is an enlarged view of an example of a region A in FIG. 4, and FIG. 6 is an enlarged view of an example of a region B in FIG. 4.

As shown in FIGS. 2 and 4, the first sound outputter 1 according to an embodiment may include a sound generator (or driver) 11 configured to generate a sound, a guide tube 12 having a hollow tube shape and configured to guide the sound transmitted from the side of the sound generator 11, to output the sound to the outside, a throat tube 13 disposed between the sound generator 11 and the guide tube 12 in such a manner that the sound generator 11 is installed at one side of the throat tube 13 and one end of the guide tube 12 is connected to the other side of the throat tube 13, and a cap 14 configured to cover the other open end of the guide tube 12.

The sound generator 11 includes an electromagnet 11a generating a magnetic force according to a received electric signal and a diaphragm 11b is caused to vibrate by the electromagnet 11a to generate sound as shown in FIG. 4.

The throat tube 13 has a hollow tube shape, and the inside of the throat tube 13 has a width or cross section that gradually increases (e.g., toward the guide tube 12). Therefore, the throat tube 13 guides the sound generated by the sound generator 11 to the guide tube 12, while also reducing the noise that can be generated due to a sudden pressure change.

As shown in FIGS. 3 and 4, the guide tube 12 may include a plurality of radiation apertures 12a (i.e., sound radiation apertures) provided in a row along at least one side surface of the guide tube 12 in a longitudinal direction, to allow the sound to be radiated to the outside. The plurality of radiation apertures 12a may be formed in at least one side surface of the guide tube 12 at equal intervals.

Each of the radiation apertures 12a may be formed as a circular hole, an elliptical hole, a polygonal hole (e.g., a square or a pentagon or other polygons) or a variety of hole shapes that may be designed.

According to an embodiment, the radiation apertures 12a may have sizes that gradually increase from a first end of the guide tube 12 on the side of the sound generator 11 to a second end on the opposite side. This allows a large amount of sound to be radiated through the radiation aperture 12a at the second end of the guide tube 12 so that the directivity of the sound generated in the direction corresponding to the longitudinal direction of the guide tube 12 may be further increased.

As shown in FIGS. 2 to 4, the plurality of radiation apertures 12a may be arranged in a row on one side of the guide tube 12. However, depending on embodiments, the plurality of radiation apertures 12a may be arranged in a plurality of rows on one side of the guide tube 12. Alternatively, the plurality of radiation apertures 12a may be arranged in a single row or a plurality of rows on a plurality of sides of the guide tube 12.

The hollow guide tube 12 may be formed to have a substantially rectangular cross-section. However, it is merely an example and depending on embodiments, the guide tube 12 may be formed to have cross-sections corresponding to other shapes such as a circle or a triangle.

The hollow guide tube 12 is configured such that a surface, on which the radiation apertures 12a are disposed, forms a radiation surface 12b from which the sound is radiated.

As described above, when the radiation apertures 12a are arranged in a row on the radiation surface 12b of the guide tube 12, a portion of the sound transmitted through the throat tube 13 may be radiated to the outside through each of radiation apertures 12a as the sound passes through the guide tube 12.

Since a sound corresponds to a sound wave transmitted by a pressure change with air as a medium, the sounds, which are radiated through the radiation apertures 12a provided in a row in the guide tube 12 with the time difference, perform extinction interference and constructive interference with each other. While the sounds interfere with each other, the sounds have a directivity in a direction corresponding to the longitudinal direction of the guide tube 12. Accordingly, the first sound outputter 1 may operate as a directional speaker due to the structure of the guide tube 12 provided with the above-described radiation apertures 12a.

According to an embodiment, the inside of the guide tube 12, having a hollow tube shape, may have the same cross-sectional area or have a cross-sectional area gradually changes from the first end connected to the throat tube 13 to the second end on the opposite side (i.e., at the end where the cap 14 is located). In this case, the gradual change in the cross-sectional area may be a gradual decrease in the cross-sectional area or a gradual increase in the cross-sectional area. Depending on embodiments, this may include repeating the reduction and increase of the cross-sectional area.

The sound transmitted to the guide tube 12 is sequentially radiated through the radiation apertures 12a in the process of passing through the guide tube 12. Accordingly, although the sound pressure gradually decreases in the process of passing through the guide tube 12 when an inner cross-sectional area of the guide tube 12 is gradually reduced, the radiation apertures 12a adjacent to the other end of the guide tube 12 may radiate the sound at the same level as that of the other radiation apertures 12a.

When the inner cross-sectional area of the guide tube 12 is gradually reduced from the first end of the guide tube 12 to the second end thereof, most of the sound passing through the guide tube 12 may be radiated to the outside by passing through the radiation apertures 12a and thus the sound generated in the sound generator 11 is more efficiently radiated to the outside. In addition, as the sound radiated to the outside through the radiation apertures 12a increases, the sound transmitted to the cap 14 placed at the second end of the guide tube 12 may decrease. In other words, by reducing the inner cross-sectional area of the guide tube 12, it may be possible to reduce the noise generated when the sound arriving at the cap 14 is reflected back to the sound generator 11 side.

The radiation surface 12b may extend to form an acute angle relative to the longitudinal direction of the guide tube 12 as shown. Since the radiation apertures 12a are provided on the radiation surface 12b as described above, the sound is guided and radiated by the radiation surface 12b.

The radiation surface 12b of the first sound outputter 1 may have a predetermined angle $\theta$ with respect to the longitudinal direction of the guide tube 12. The sound is guided and radiated by the radiation surface 12b and thus the directivity of the first sound outputter 1 changes based on the angle θ between the longitudinal direction of the guide tube 12 and the radiation surface 12b. Particularly, as the angle θ between the longitudinal direction of the guide tube 12 and the radiation surface 12b increases, the directivity of the first sound outputter 1 increases corresponding with the increase of the angle θ.

As shown in FIG. 5, the throat tube 13 is formed or provided in a hollow tube shape. In the inside of the throat tube 13, a throat portion 13a having a uniform cross-section that is smaller than other portions of the throat tube 13 may be formed in the portion adjacent to the sound generator, before the cross-section of the of the throat tube 13 gradually increases (e.g., toward the guide tube 12).

As shown in FIG. 6, the cap 14 is installed at the second end of the open guide tube 12 to close the second end of the guide tube 12. An inner surface of the cap 14 opposite to the second end of the guide tube 12 is has a width that is gradually decreased to zero (0) in an upper and lower side so as to form a groove 14a in a substantially V shape. Accordingly, the sound reaching the cap 14 may perform the extinction interference by being reflected by the inner surface of the cap 14, and it may be possible to further reduce the noise that is generated when the sound reaching the second end of the guide tube 12 is reflected toward the sound generator 11 side (i.e., toward the first end of the guide tube 12). Furthermore, a sound absorbing material, such as a sponge, may be disposed at the inner surface of the cap 14 to further reduce noise.

Figure 7:
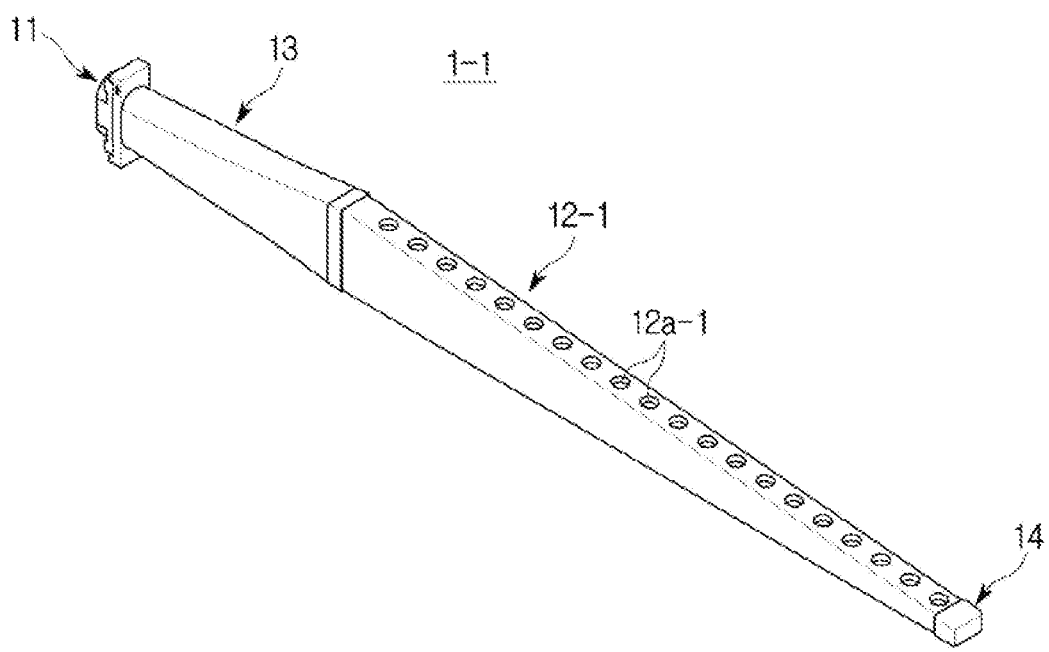
FIG. 7 is a perspective view of a first sound outputter according to a second embodiment.
Figure 8:
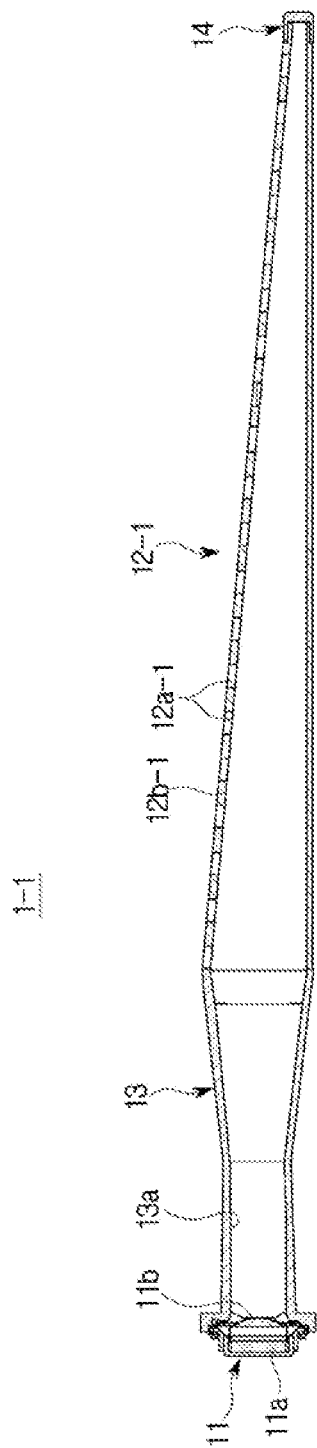
FIG. 8 is a cross-sectional view of the first sound outputter according to the second embodiment.
Figure 9:
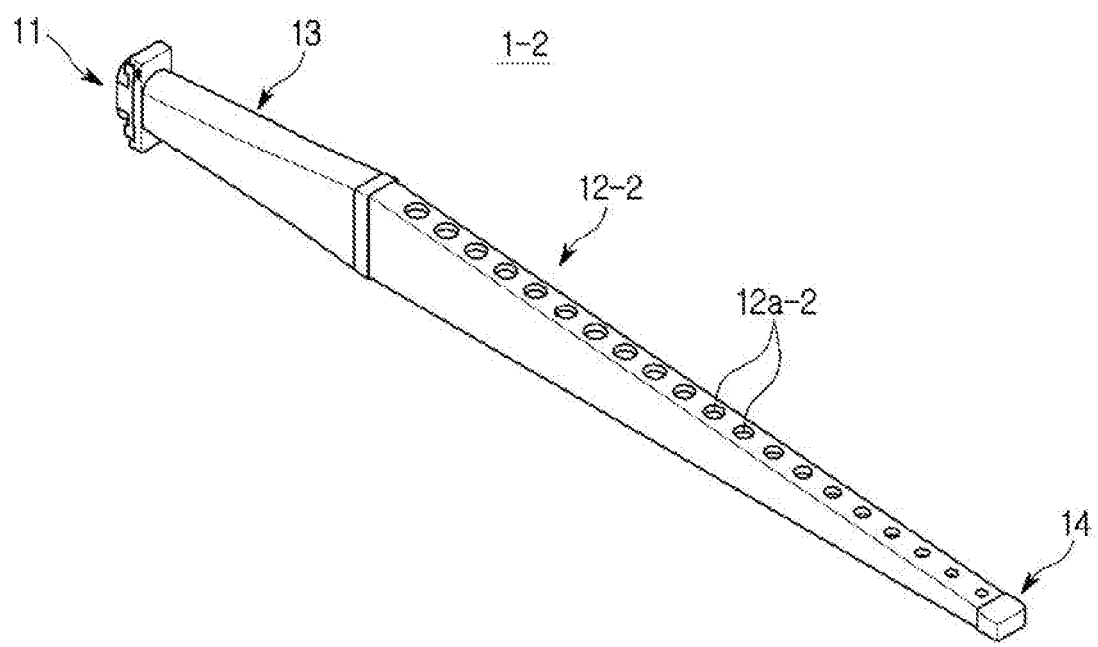
FIG. 9 is a perspective view of a first sound outputter according to a third embodiment.

FIG. 7 is a perspective view of a first sound outputter according to a second embodiment, FIG. 8 is a cross-sectional view of a first sound outputter according to the second embodiment, and FIG. 9 is a perspective view of a first sound outputter according to a third embodiment.

As shown in FIG. 7, a first sound outputter 1-1 includes a guide tube 12-1 having radiation apertures 12a-1 having the same size. In this case, the directivity of the sound generated in the first sound outputter 1-1 is relatively reduced compared with the first sound outputter 1 of the first embodiment. In addition, depending on embodiments, the intervals between the radiation apertures 12a-1 in a radiation surface 12b-1 may be equal to each other, as shown in FIG. 8.

As shown in FIG. 9, according to a third embodiment, a first sound outputter 1-2 includes a guide tube 12-2 having radiation apertures 12a-2 having a size that is gradually reduced from the first end of the guide tube 12-2 on the side of the sound generator 11 to the second end of the guide tube 12-2 on the opposite side. When the size of the radiation aperture 12a-2 is gradually reduced from the first end of the guide tube 12-2 toward the second end of the guide tube 12-2, the directivity of the sound generated by the first sound outputter 10-2 may be further reduced.

Therefore, as described above, by changing the size of the radiation aperture, the degree of directivity of the sound generated in the directional speaker can be determined and designed.

Figure 10:
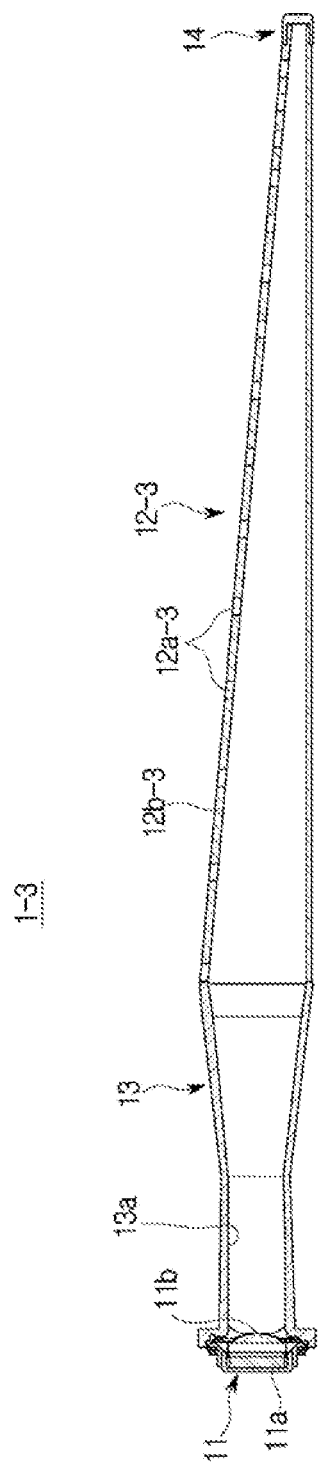
FIG. 10 is a cross-sectional view of a first sound outputter according to a fourth embodiment.
Figure 11:
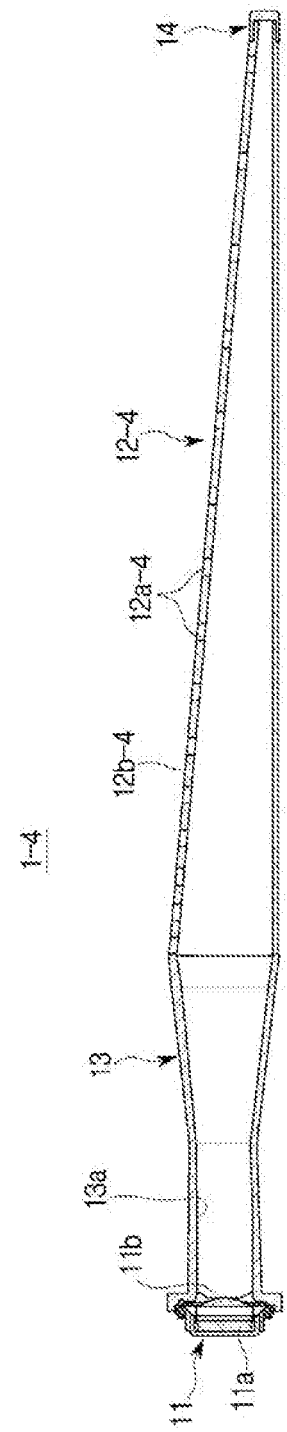
FIG. 11 is a cross-sectional view of a first sound outputter according to a fifth embodiment.

FIG. 10 is a cross-sectional view of a first sound outputter according to a fourth embodiment, and FIG. 11 is a cross-sectional view of a first sound outputter according to a fifth embodiment.

Depending on embodiments, it is also possible that only some of the plurality of radiation apertures 12a are spaced apart from each other at different intervals or all of the plurality of radiation apertures 12a are spaced apart from each other at different intervals.

For example, as shown in FIG. 10, according to the fourth embodiment, a first sound outputter 1-3 includes a guide tube 12-3 in which the interval between a plurality of radiation apertures 12a-3 in a radiation surface 12-b3 is set such that the intervals between the radiation apertures 12a-3 decrease from the first end at the side of the sound generator 11 to the second end. In other words, the interval between the radiation apertures 12a-3 formed in the vicinity the first end at the side of the sound generator 11 may be larger than the interval between the radiation apertures 12a-3 formed in the vicinity of the second end at the side of the cap 14. The sizes of the plurality of radiation apertures 12a-3 may be different from each other, or may be substantially the same with each other.

When the intervals are reduced, the number of radiation apertures 12a-3 provided on the second end side of the guide tube 12-3 is greater than the number of radiation apertures 12a-3 on the first end side of the guide tube 12-3. Therefore, a larger amount of sound is radiated through the second end side of the guide tube 12-3 and thus the directivity of the sound formed in the direction corresponding to the longitudinal direction of the guide tube 12-3 may be further increased.

As another example, according to the fifth embodiment, a first sound outputter 1-4 includes a guide tube 12-4 in which the intervals between a plurality of radiation apertures 12a-4 in a radiation surface 12b-4 increase from a first end at the side of the sound generator 11 to the second end, as illustrated in FIG. 11. In other words, the interval between the radiation apertures 12a-4 formed in the vicinity of the sound generator 11 may be less than the interval between the radiation apertures 12a-4 formed in the vicinity of the cap 14. The sizes of the plurality of radiation apertures 12a-4 may be the same, or substantially the same as each other.

The directivity of the first sound outputter is relatively reduced when the intervals are increased as mentioned above.

Therefore, as shown in FIGS. 10 and 11, the degree of directivity of the sound generated by the first sound outputter 1 can be selectively set by adjusting the intervals between the radiation apertures 12a.

Figure 12:
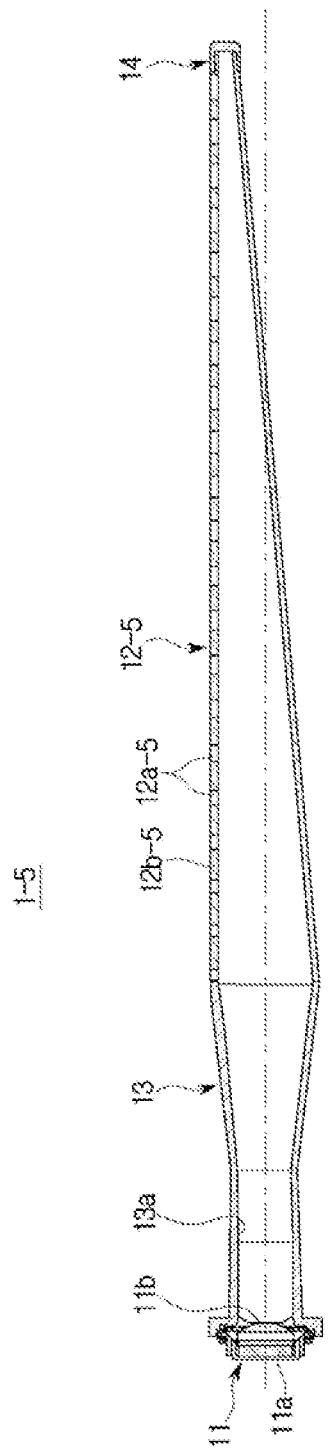
FIG. 12 is a cross-sectional view of a first sound outputter according to a sixth embodiment.
Figure 13:
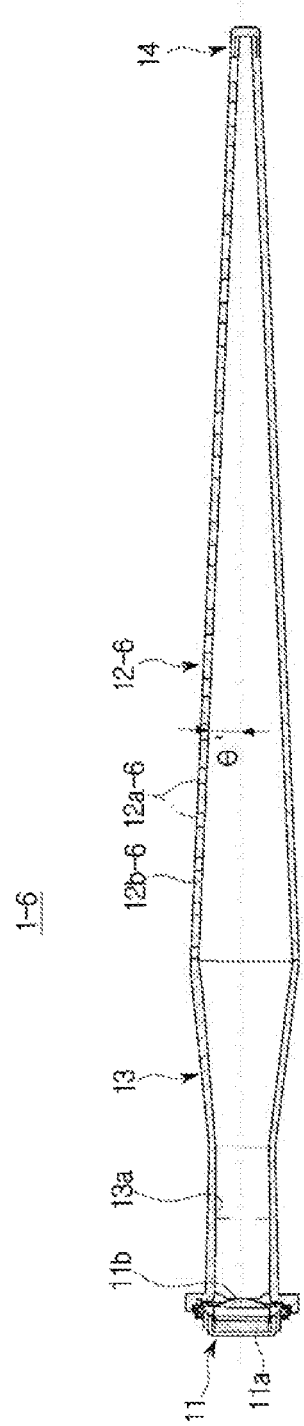
FIG. 13 is a cross-sectional view of a first sound outputter according to a seventh embodiment.

FIG. 12 is a cross-sectional view of a first sound outputter according to a sixth embodiment, and FIG. 13 is a cross-sectional view of a first sound outputter according to a seventh embodiment.

According to the sixth embodiment shown in FIG. 12, a first sound outputter 1-5 includes a guide tube 12-5 having a radiation surface 12b-5 that has a plurality of radiation apertures 12a-5 and extends in a direction parallel to the longitudinal direction of the guide tube 12-5. In other words, the directivity of the first outputter 1-5 is relatively low because the angle θ between the longitudinal direction of the guide tube 12 and the radiation surface 12b shown in FIG. 4 is 0 (zero).

According to the seventh embodiment shown in FIG. 13, a first sound outputter 1-6 includes a guide tube 12-6 having a radiation surface 12b-6 that has a plurality of radiation apertures 12a-6 extends in a direction having a relatively small angle θ' with respect to the longitudinal direction of the guide tube 12-6. Thus, it may be possible to appropriately reduce the directivity of the first sound outputter 1-6 in a relative manner.

Therefore, as described above, by adjusting the angle θ between the longitudinal direction of the guide tube 12 and the radiation surface 12b generated in the sound generator 11, the degree of the directivity of the sound generated by the first sound outputter 1 can be selectively set.

Figure 14:
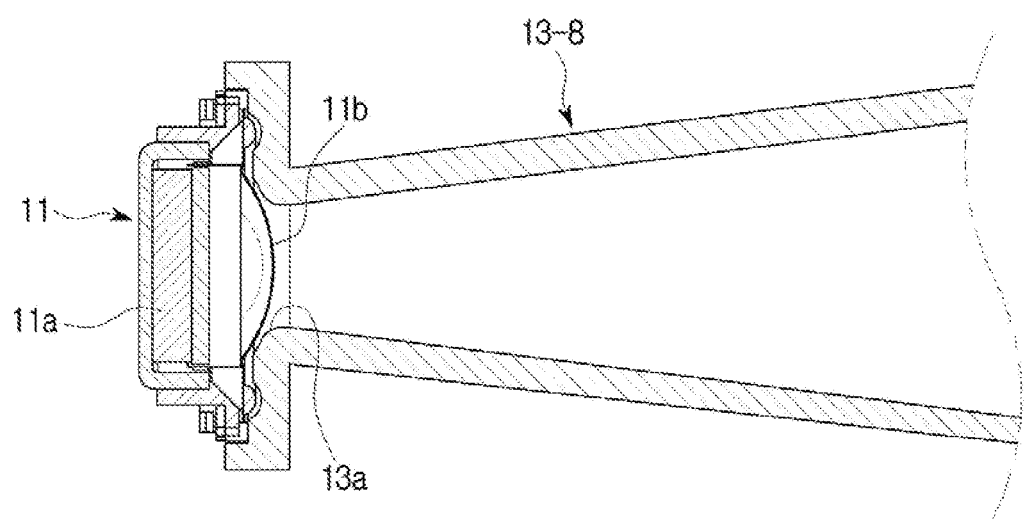
FIG. 14 is a cross-sectional view of a sound generator and a throat tube according to an eighth embodiment.

FIG. 14 is a cross-sectional view of a sound generator and a throat tube according to an eighth embodiment.

Referring to FIG. 14, in the inner space of a throat tube 13-8, a throat portion 13a having a relatively smaller width than both adjacent portions may be formed in a portion adjacent to the sound generator 11.

As mentioned above, the first sound outputter 1 applied to the display apparatus 2 according to the disclosure may be configured to variably adjust the directivity of the sound transmitted from the first sound outputter 1 by adjusting the size of the radiation apertures 12a provided in the guide tube 12, the interval between the radiation apertures 12a and the angle θ of the radiation surface 12b.

Hereinafter, various embodiments of a display apparatus (100) will be described with reference to FIGS. 15 to 38B as an example of a sound output apparatus in which a first sound outputter (101) is installed. However, these are merely examples, and the sound output apparatus 1 is not limited to being installing in a display apparatus. The first sound outputter is applicable to other devices that output sound, as well as the display apparatus.

Figure 15:
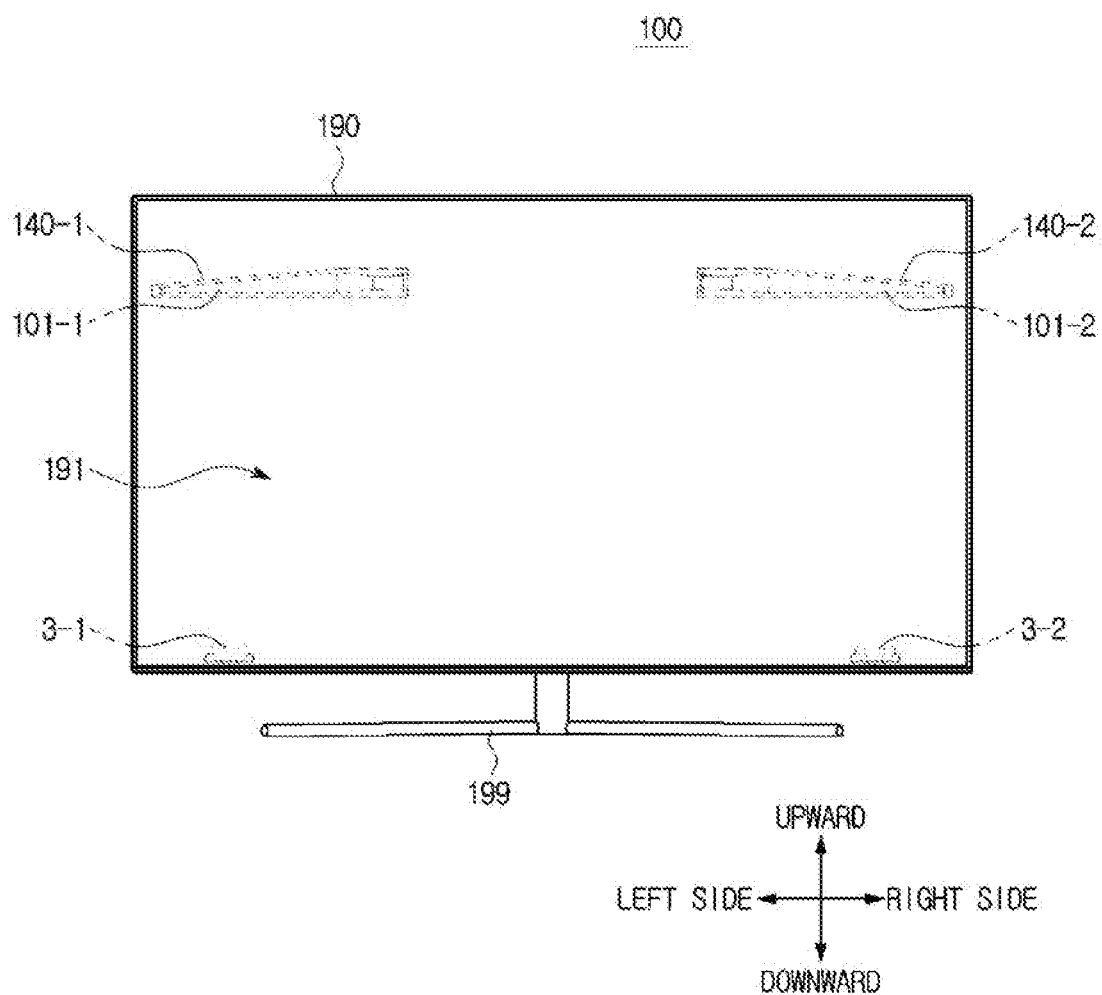
FIG. 15 is a front view illustrating a first embodiment of a display apparatus provided with the first sound outputter.
Figure 16:
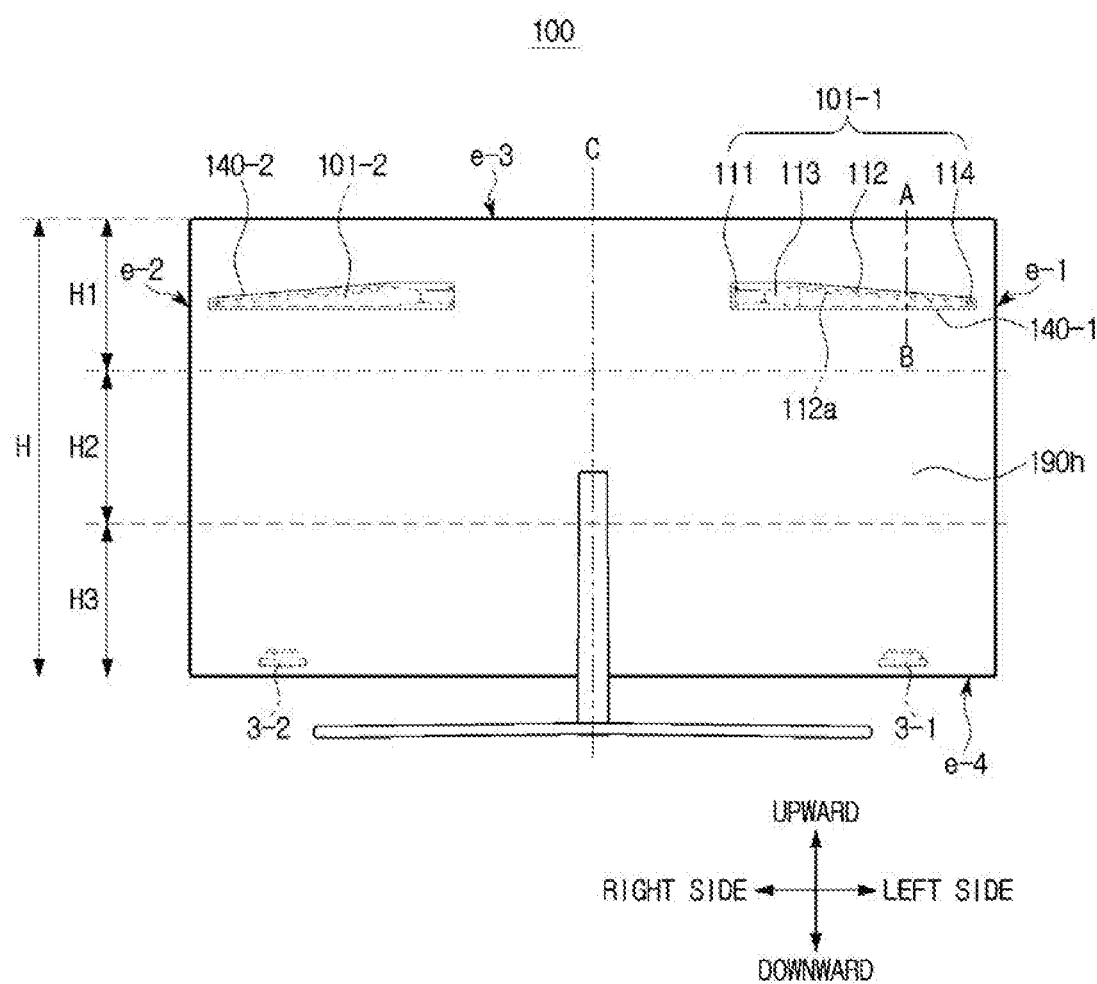
FIG. 16 is a rear view illustrating the first embodiment of the display apparatus provided with the first sound outputter.
Figure 17:
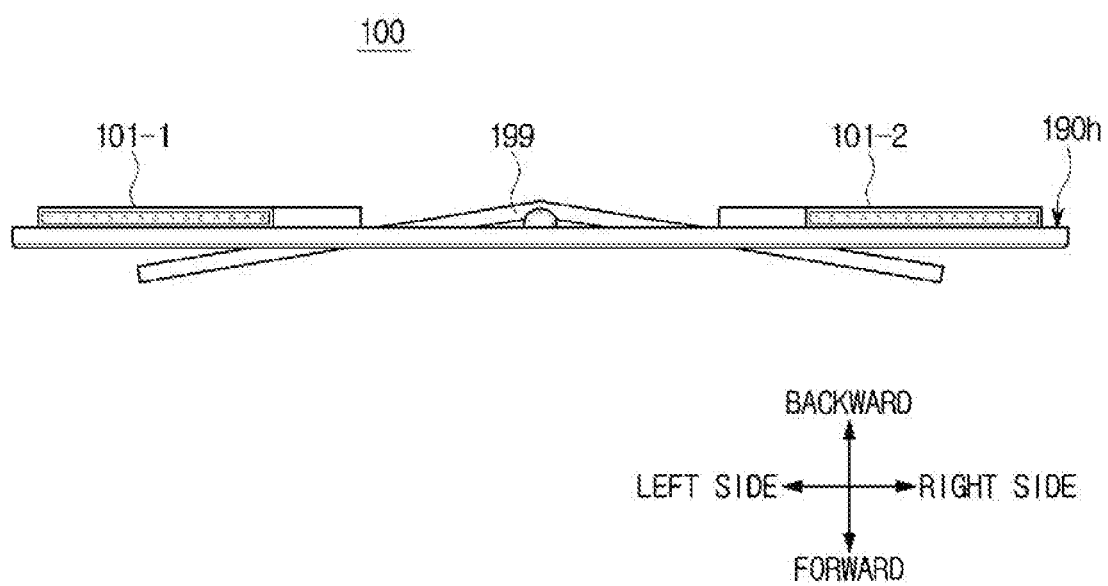
FIG. 17 is a plan view illustrating the first embodiment of the display apparatus provided with the first sound outputter.

FIG. 15 is a front view illustrating a first embodiment of a display apparatus provided with the first sound outputter, FIG. 16 is a rear view illustrating the first embodiment of the display apparatus provided with the first sound outputter and FIG. 17 is a plan view illustrating the first embodiment of the display apparatus provided with the first sound outputter. For convenience of illustration, as shown in FIGS. 15 to 17, based on a case where a display apparatus 100 is installed in a conventional manner, a portion contacting the bottom surface is defined as a downward direction. A direction opposite to the downward direction is defined as an upward direction. Further, a direction in which a display panel 191 is installed is defined as a forward direction, and a direction opposite to the forward direction is defined as a backward direction. In addition, any one of directions orthogonal to the upward direction, the downward direction, the backward direction, and the forward direction is defined as a right direction, and a direction opposite to the right direction is defined as a left direction. However, this is merely an example and the directions can be arbitrarily defined depending on the design.

The display apparatus 100 refers to an apparatus capable of displaying an image externally. For example, the display apparatus 100 may include a digital television apparatus, a monitor apparatus, a laptop computer, a smart phone, a tablet PC, a portable game machine, a navigation device or an indoor/outdoor billboard, but is not limited thereto.

As illustrated in FIG. 15, the display apparatus 100 may include the display panel 191 and a housing 190 in which the display panel 191 and various components related to operation of the display apparatus 10 are installed.

The display panel 191 displays an image and provides the image to a user. The display panel 191 may include a liquid crystal display (LCD) using a liquid crystal, a display panel using a light emitting diode (LED) that emit light itself, a display panel using an organic light emitting diode (OLED) or an active-matrix organic light-emitting diode (OLED).

The display apparatus 100 may further include a backlight unit (BLU) supplying light to the display panel 191, as needed. The backlight unit may be installed in the housing 190.

Depending on embodiments, the display panel 191 may be a rigid display panel or a flexible display panel.

With respect to the housing 190, the display panel 191 may be exposed to the front side, and at least one first sound outputter 101-1 and 101-2, may be installed on a rear surface 190h, as illustrated in FIGS. 16 and 17.

The housing 190 may be implemented by a combination of a front frame, configured to allow the display panel 191 to be exposed to the outside and a rear frame configured to allow various components to be mounted. The housing 190 may be formed by integrating the front frame and the rear frame.

Depending on embodiments, the housing 190 may further include a stand 199 supporting the display apparatus 100. The stand 199 may be provided at an appropriate position such as the bottom surface or the rear surface 190h of the display apparatus 100. The stand 199 may be omitted when the display apparatus 100 is mounted on the wall. In this case, a rear surface 100e of the display apparatus 100 may further include parts needed for wall mounting.

The first sound outputter 101 may be installed at a position on the rear surface 190h of the housing 190. The first sound outputter 101-1 may include a sound generator 111, a guide tube 112, a throat tube 113, and a cap 114.

The rear surface 190h of the housing 190 may be virtually or practically divided into an upper portion H1, a middle portion H2 and a lower portion H3. The first sound outputter 101 may be installed in at least one of the upper portion H1, the middle portion H2, and the lower portion H3. The upper portion H1 is defined to include a region from an upper end boundary e-3 to one third (⅓) point of the entire length H, wherein the entire length H is from the upper end boundary e-3 of the rear surface 190h of the housing 190 to a lower end boundary e-4. The middle portion H2 is defined to include a region from one third (⅓) point of the entire length H, wherein the entire length H is from the upper end boundary e-3 of the rear surface 190h of the housing 190 to the lower end boundary e-4, to two third (⅔) point of the entire length H, wherein the entire length H is in the direction from the upper end boundary e-3 of the rear surface 190h of the housing 190 to the lower end boundary e-4. The lower portion H3 is defined to include a region from two third (⅔) point of the entire length H, wherein the entire length H is from the upper end boundary e-3 of the rear surface 190h of the housing 190 to the lower end boundary e-4, to the lower end boundary e-4. However, such a definition may be arbitrarily changed depending on the design. Details of the installation position and operation of the first sound outputter 101 will be described later.

The display apparatus 100 may further include second sound outputters 3-1 and 3-2. The second sound outputters 3-1 and 3-2 may be implemented using a conventional speaker apparatus. Depending on embodiments, the display apparatus 100 may include a single second sound outputter 3-1 or 3-2, or as shown in FIGS. 15 and 16, the display apparatus 100 may include two second sound output outputters 3-1 and 3-2. Alternatively, the display apparatus 100 may include three or more second sound outputters 3-1 and 3-2 according to the design.

The second sound outputters 3-1 and 3-2 may be installed in the housing 190. According to an embodiment, the second sound outputters 3-1 and 3-2 may be installed inside the housing 190 to output the sound to the outside through holes provided in the housing 190 or may be installed directly on the outer surface of the housing 190 to output the sound to the outside.

As shown in FIGS. 15 and 16, the second sound outputters 3-1 and 3-2 may be installed at the lower portion H3 of the housing 190. However, the installation positions of the second sound outputters 3-1 and 3-2 are not limited thereto. For example, the second sound outputters 3-1 and 3-2 may be provided adjacent to the left and/or right boundaries of the housing 190, wherein the second sound outputters 3-1 and 3-2 may be provided in substantially parallel to the left and/or right boundaries of the housing 190. Alternatively, at least one second sound outputter 3-1 and 3-2 may be installed in at least one position that may be selected for a particular design.

According to an embodiment, the first sound outputters 101-1 and 101-2 are symmetrically disposed at the rear surface 190h of the housing 190. Particularly, the first sound outputters 101-1 and 101-2 may be disposed at the upper portion H1 of the rear surface 190h, as shown in FIG. 16. In this case, the first sound outputters 101-1 and 101-2 may be disposed in contact with or adjacent to the upper end of the upper portion H1, that is, the upper end boundary e-3, or the first sound outputters 101-1 and 101-2 may be disposed in contact with or adjacent to the lower end of the upper portion H1. Alternatively, the first sound outputters 101-1 and 101-2 may be disposed in a middle line of the upper portion H1.

According to the selection of the design, the first sound outputters 101-1 and 101-2 may be installed in such a manner that the sound generator 111 faces the center line c and the cap 114 faces the left or right boundary e-1 or e-2. The center line c indicates an imaginary line extending in the vertical direction and passing through the center of the rear surface 190h of the housing 190. In this case, the first sound outputters 101-1 and 101-2 may be installed on the rear surface 190h parallel to or substantially parallel to the upper end boundary e-3. Alternatively, the first sound outputters 101-1 and 101-2 may be installed on the rear surface 190h at a predetermined angle with respect to the upper end boundary e-3.

In this case, the first sound outputters 101-1 and 101-2 may be installed in such a manner that one end thereof corresponding to the one end to which the cap 114 is mounted, is in contact with or adjacent to the left or right boundary e-1 or e-2. In addition, the first sound outputters 101-1 and 101-2 may be installed in such a manner that the other end of the first sound outputters 101-1 and 101-2 corresponding to the end to which the sound generator 111 is mounted, is in contact with the center line c, adjacent to the center line c or spaced apart from the center line c by a predetermined distance. For example, the predetermined distance may include an approximately half of the length of the first sound outputters 101-1 and 101-2.

According to another embodiment, the first sound outputters 101-1 and 101-2 may be installed in such a manner that the sound generator 111 faces the left or right boundary e-1 or e-2 and the cap 114 faces the center line c. One first sound outputter 101-1 may be installed in such a manner that the sound generator 111 faces the left or right boundary e-1 or e-2 and the cap 114 faces the center line c, and the other first sound outputter 101-2 may be installed in such a manner that the sound generator 111 faces the center line c and the cap 114 faces the left or right boundary e-1 or e-2. Alternatively, the first sound outputters 101-1 and 101-2 may be installed in reverse to the method described above.

The first sound outputters 101-1 and 101-2 may be installed in first accommodation portions 140-1 and 140-2 provided on the rear surface 190h, and then installed on the rear surface 190h of the housing 190. In this case, depending on embodiments, a single first accommodation portion 140-1 or 140-2 may be installed on the rear surface 190h of the housing 190, or two or more first accommodation portions 140-1 and 140-2 may be installed on the rear surface 190h of the housing 190. The number of the first accommodation portion 140-1 and 140-2 may correspond to the number of first sound outputters 101-1 and 101-2 to be installed.

Figure 18:
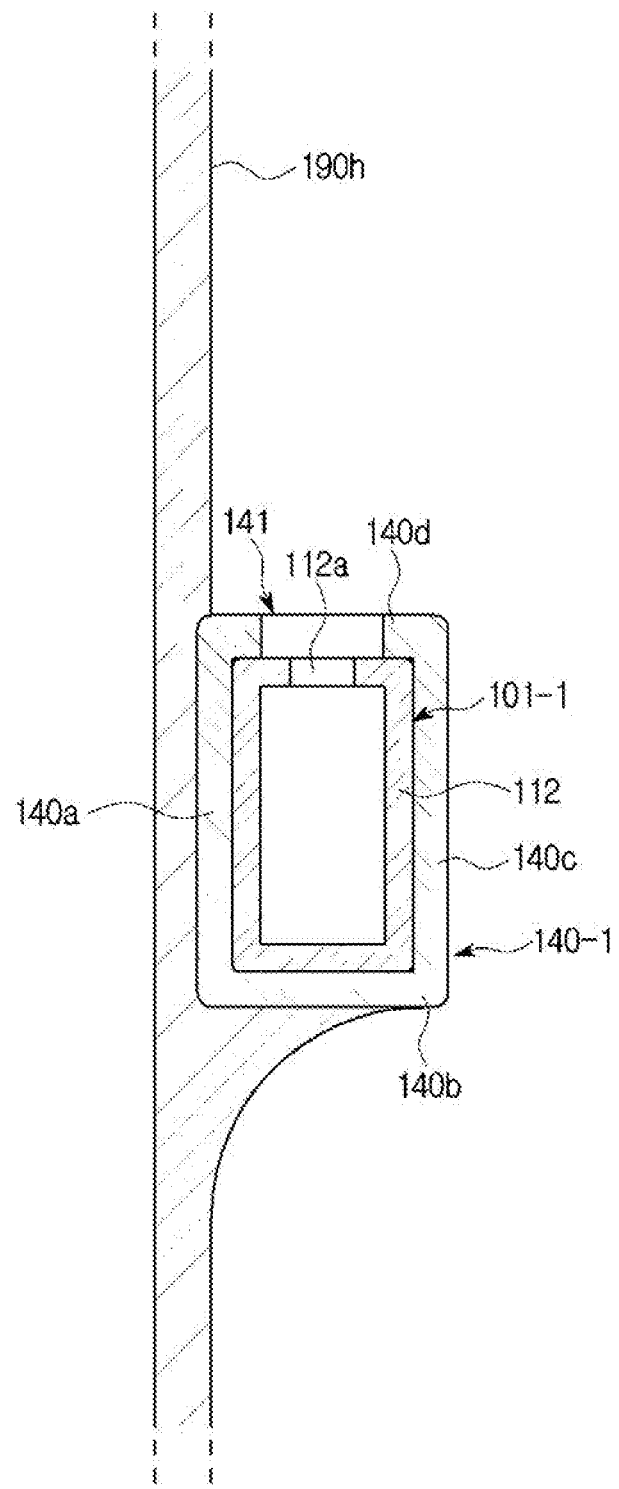
FIG. 18 is a cross-sectional view of a first accommodation portion.

FIG. 18 is a cross-sectional view of a first accommodation portion. Particularly, FIG. 18 is a cross-sectional view of the first accommodation portion 140-1, to which the first sound outputter 101-1 is mounted, taken along a line A-B.

Referring to FIGS. 16 to 18, the first accommodation portion 140-1 may protrude backward and then installed on the rear surface 190h. In other words, the first accommodation portion 140-1 may be exposed to the outside of the rear surface 190h. In this case, the first accommodation portion 140-1 may be installed in such a manner that one end thereof faces the center line c and the other end thereof face the left or right boundary e-1 or e-2, by corresponding to a structure in which the first sound outputter 101-1 is installed. For example, the first accommodation portion 140-1 may be installed in such a manner that one end thereof is in contact with or adjacent to the left or right boundary e-1 or e-2 and the other thereof is in contact with or adjacent to the center line c, or spaced apart from the center line c with a predetermined distance. In addition, the first accommodation portion 140-1 may be installed on the rear surface 190h parallel to or substantially parallel to the upper end boundary e-3, or the first accommodation portion 140-1 may be installed on the rear surface 190h at a predetermined angle with respect to the upper end boundary e-3

The first accommodation portion 140-1 is formed to have a shape corresponding to the shape of the first sound outputter 101-1.

A space in which the first sound outputter 101-1 can be mounted, that is, a first insertion groove is formed inside the first accommodation portion 140-1. Particularly, the first accommodation portion 140-1 includes a first partition 140a attached to the rear surface 190h, a second partition 140b bent at the end of the first partition 140a and extended in the backward direction, and a third partition 140c bent upwardly at the end of the second partition 140b and extended. The first insertion groove in which the first sound outputter 101-1 is placed is formed by the first partition 140a, the second partition 140b, and the third partition 140c. As needed, the first partition 140a may be omitted. In this case, the rear surface 190h of the housing 190 may serve as the first partition 140a.

In addition, in the upward direction of the first accommodation portion 140-1, an opening 141 radiating the sound generated by the first sound outputter 101-1 upward is formed. The opening 141 is formed between the first partition 140a and the third partition 140c. A fourth partition 140d protruding toward the rear surface 190h may be further provided at the end of the third partition 140c, wherein the opening 141 may be disposed between the first partition 140a and the fourth partition 140d.

The first to fourth partition 140a to 140d may be integrally formed or separately formed.

The opening 141 may extend in the longitudinal direction in the upward direction of the first accommodation portion 140-1 in correspondence with radiation apertures 112a formed along the outer surface of a guide tube 112.

The first sound outputter 101-1 may be inserted into the first accommodation portion 140-1 so that the radiation apertures 112a, which are provided in the outer surface of the guide tube 112 of the first sound outputter 101-1, corresponds to the opening 141. In other words, the first sound outputter 101-1 may be installed in the first accommodation portion 140-1 so that the radiation apertures 112*a* are exposed to the upward direction through the opening 141.

Hereinbefore, an embodiment in which a first accommodation groove of the first accommodation portion 140-1 is in the upward direction has been described, but it may be possible to install the first accommodation groove of the first accommodation portion 140-1 to face the downward direction opposite to the above configuration discussed above. Alternatively, the first accommodation portion 140-1 may be installed to allow the first accommodation groove to face the backward direction, wherein the first accommodation portion 140-1 may be installed at the rear surface 190*h* at about 90 degrees.

Figure 19:
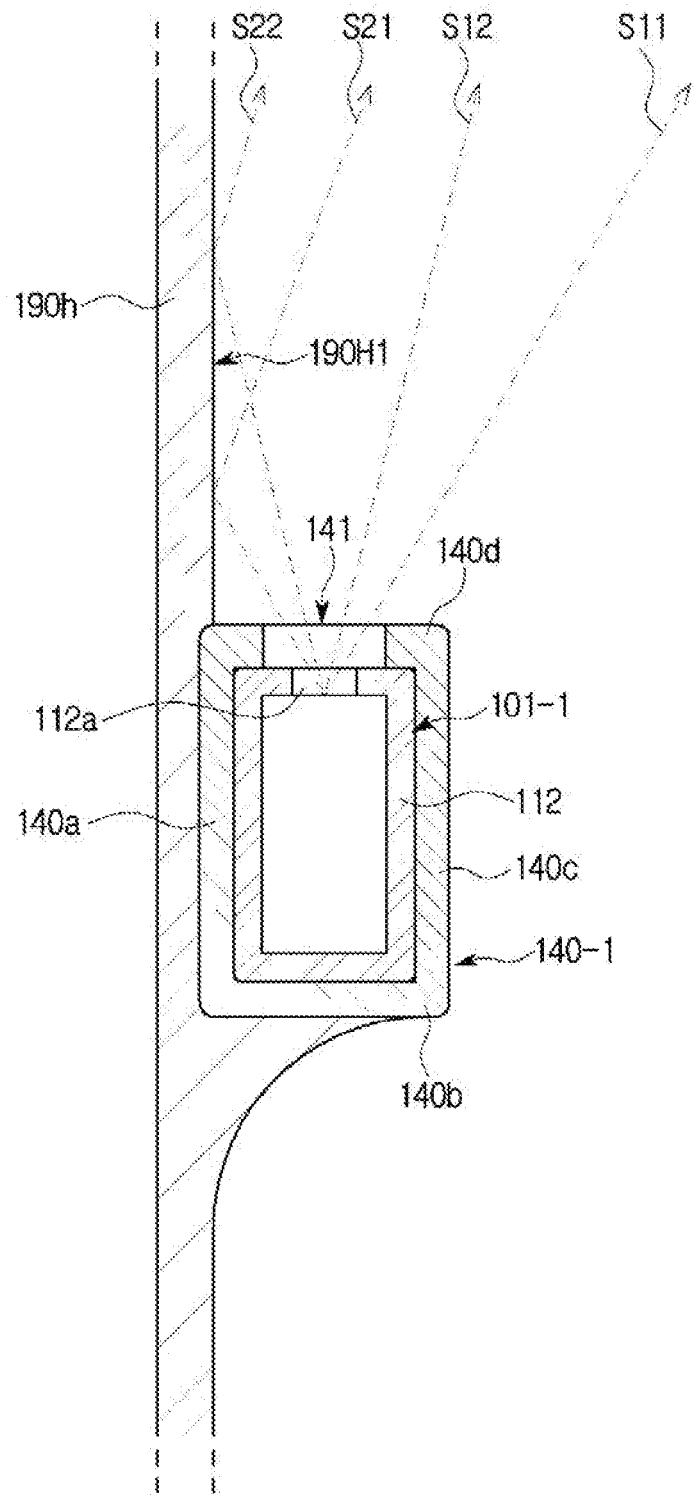
FIG. 19 is a first view illustrating the radiation characteristics when a sound reflector is provided on a rear surface of the display apparatus.
Figure 20:
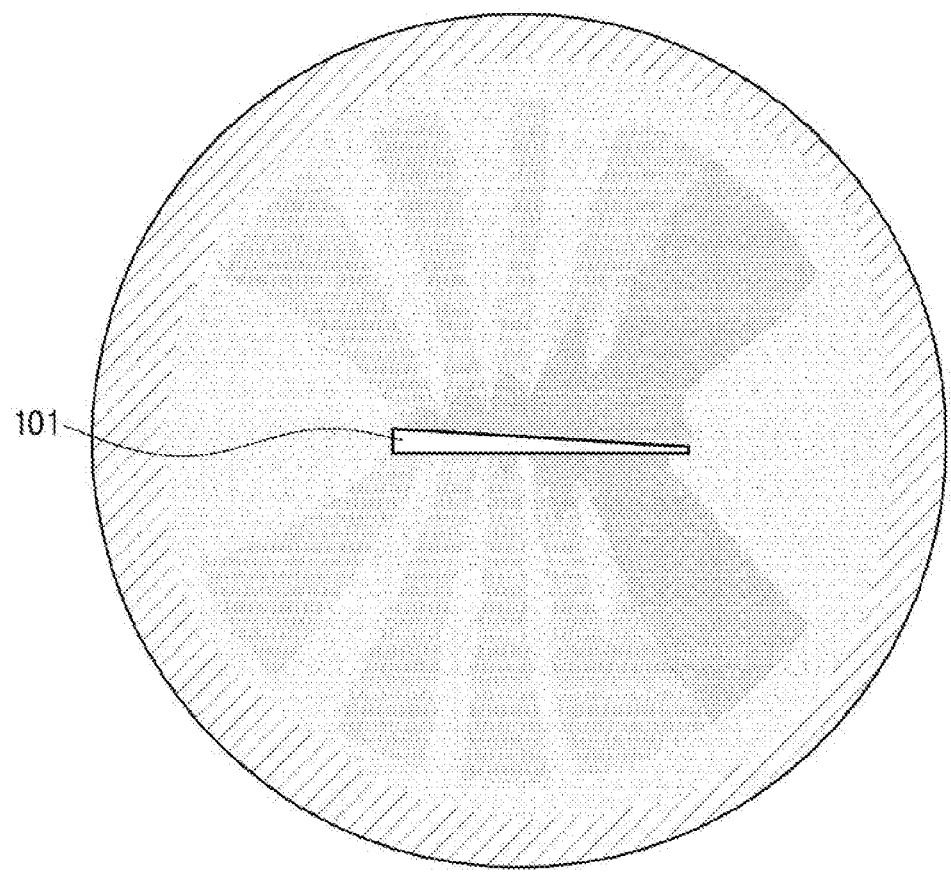
FIG. 20 is a view illustrating the radiation characteristics when the sound reflector is solely provided.
Figure 21:
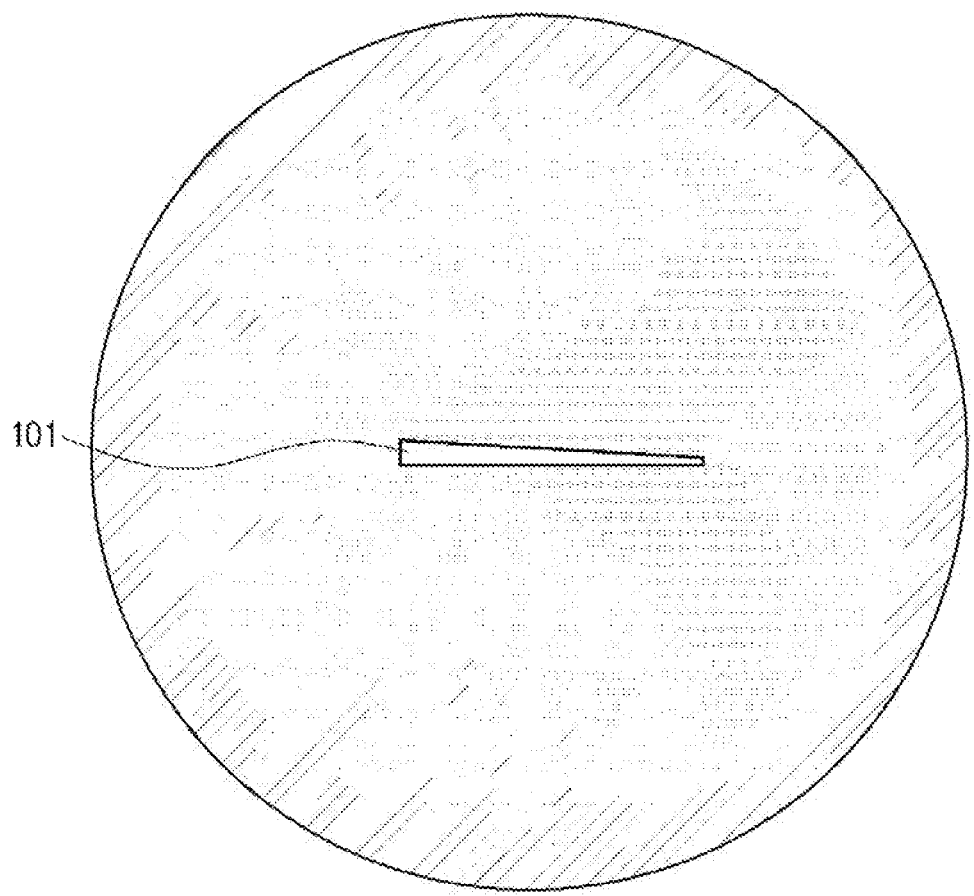
FIG. 21 is a second view illustrating the radiation characteristics when the sound reflector is provided on the rear surface of the display apparatus.

FIG. 19 is a first view illustrating the radiation characteristics when a sound reflector is provided on a rear surface of the display apparatus, and FIG. 20 is a view illustrating the radiation characteristics when the sound reflector is solely provided. FIG. 21 is a second view illustrating the radiation characteristics when the sound reflector is provided on the rear surface of the display apparatus. In FIGS. 20 and 21, a relatively darker portion refers to a portion to which the sound is mainly or strongly transmitted (i.e., the superior portion), and a relatively lighter portion refers to a portion to which the sound is relatively weakly transmitted (i.e., the inferior portion).

As illustrated in FIG. 19, when the first sound outputter 101 (e.g., 101-1) is installed on one side of the display apparatus 100, such as the rear surface 190*h*, a part s11 and s12 of the sound, which is radiated from the first sound outputter 101 to the outside, may be radiated directly to the backward direction of the display apparatus 100. Other part s21 and s22 of the sound, which is radiated to the rear surface 190*h* of the display apparatus 100, may be reflected from the rear surface 190*h*, and then directed to the backward direction. In other words, the sounds s21 and s22 directed in the forward direction may be transmitted to the backward direction together with the sounds s11 and s12.

As mentioned above, when the first sound outputter 101 is installed on the rear surface 190*h* of the display apparatus 100, the directivity is relatively high in comparison with the case where the first sound outputter 101 is independently installed without being installed on the rear surface 190*h* of the display apparatus 100. Particularly, as illustrated in FIG. 20, since there is no reflector in the vicinity of the first sound outputter 101 when the first sound outputter 101 is provided alone, the sound is relatively more radiated and distributed in other areas than a certain direction (i.e., the upper right direction or lower right direction in FIG. 20). On the other hand, when the first sound outputter 101 is installed on the rear surface 190*h* of the display apparatus 100, the sound output from the first sound outputter 101 may be relatively more focused to the upper right end or the lower right end, according to the reflection, while relatively less sound is radiated and distributed in other areas than the certain direction (i.e., the upper right direction or lower right direction in FIG. 20), as illustrated in FIG. 21.

Therefore, when the first sound outputter 101 is installed on one side of the display apparatus 100 such as the rear surface 190*h*, it may be possible to further enhance the directivity of the first sound outputter 101.

Figure 22A:
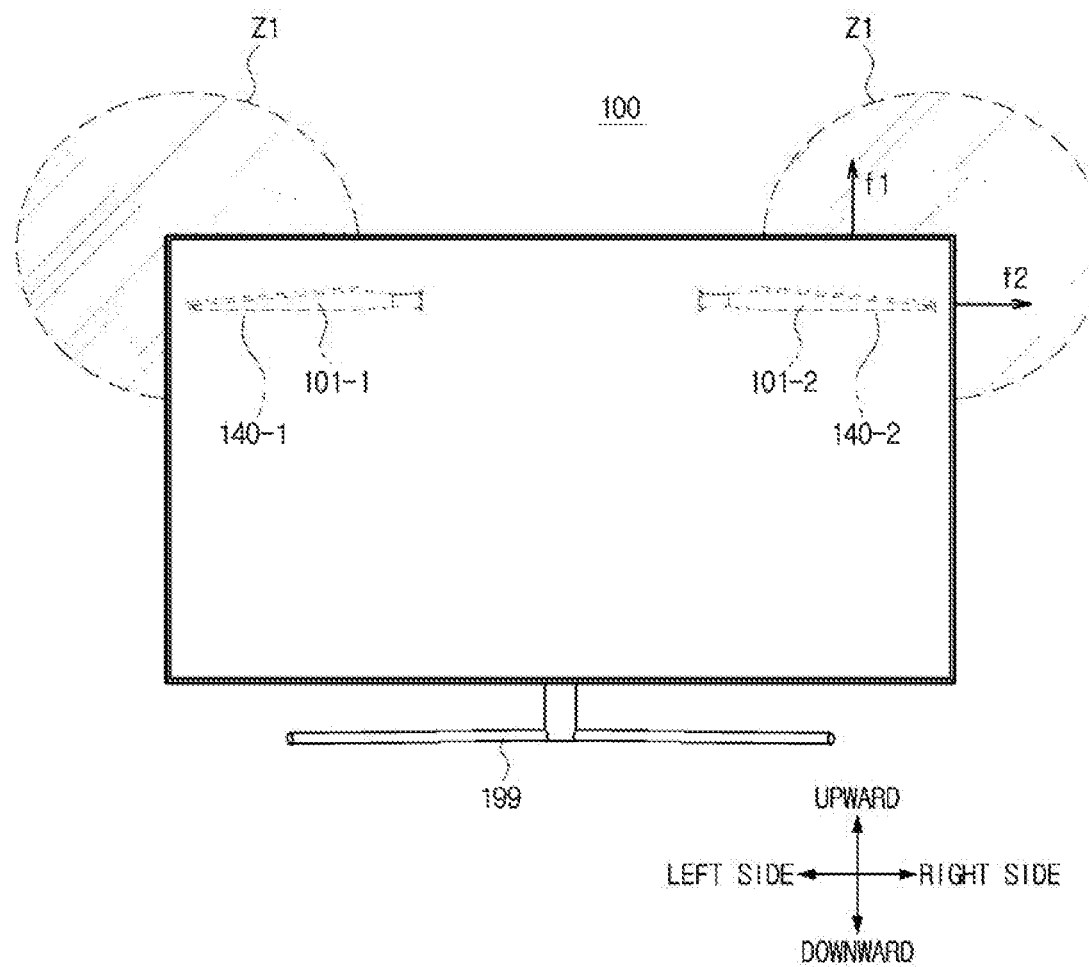
FIGS. 22A and 22B are third views illustrating the radiation characteristics when the sound reflector is provided on the rear surface of the display apparatus.
Figure 22B:
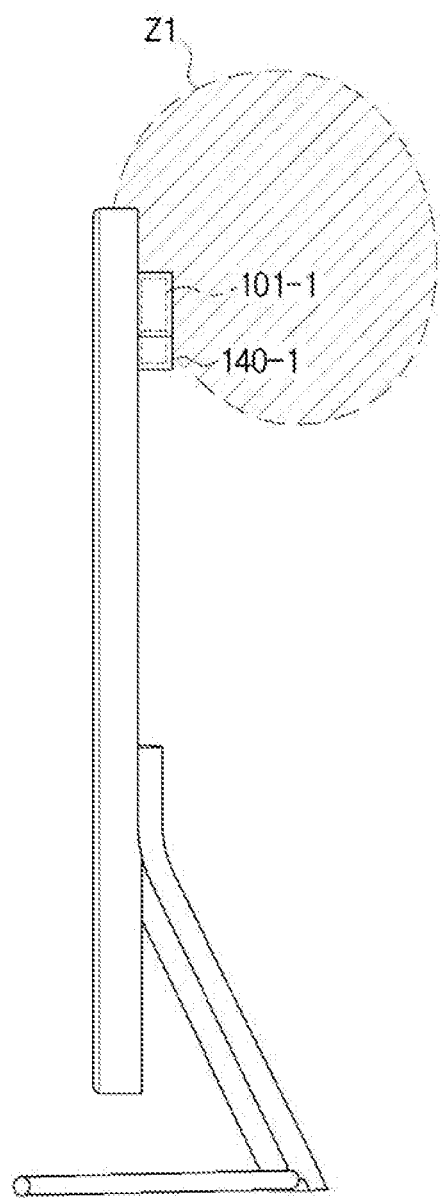

FIGS. 22A and 22B are third and fourth views illustrating the radiation characteristics when the sound reflector is provided on the rear surface of the display apparatus.

As described above, the first sound outputters 101-1 and 101-2 are installed in the first accommodation portions 140-1 and 140-2 in the vicinity of the boundaries e-1 and e-2 of the upper portion H1 of the rear surface 190*h* so that the radiation apertures 112*a* are exposed upwardly. Accordingly, the sound radiated from the first sound outputters 101-1 and 101-2 may be distributed in a range z1 including the upward direction, the lateral direction and the backward direction around the upper corner of the display apparatus 100, as illustrated in FIGS. 22A and 22B. In this case, as shown in FIG. 21, since the sound radiation patterns of the first sound outputters 101-1 and 101-2 are directed in a certain direction (the upper right direction and lower left direction), the sound having a relatively low frequency f1 is radiated in the upward direction and the sound having a relatively high frequency f2 is radiated in the lateral direction.

Figure 23:
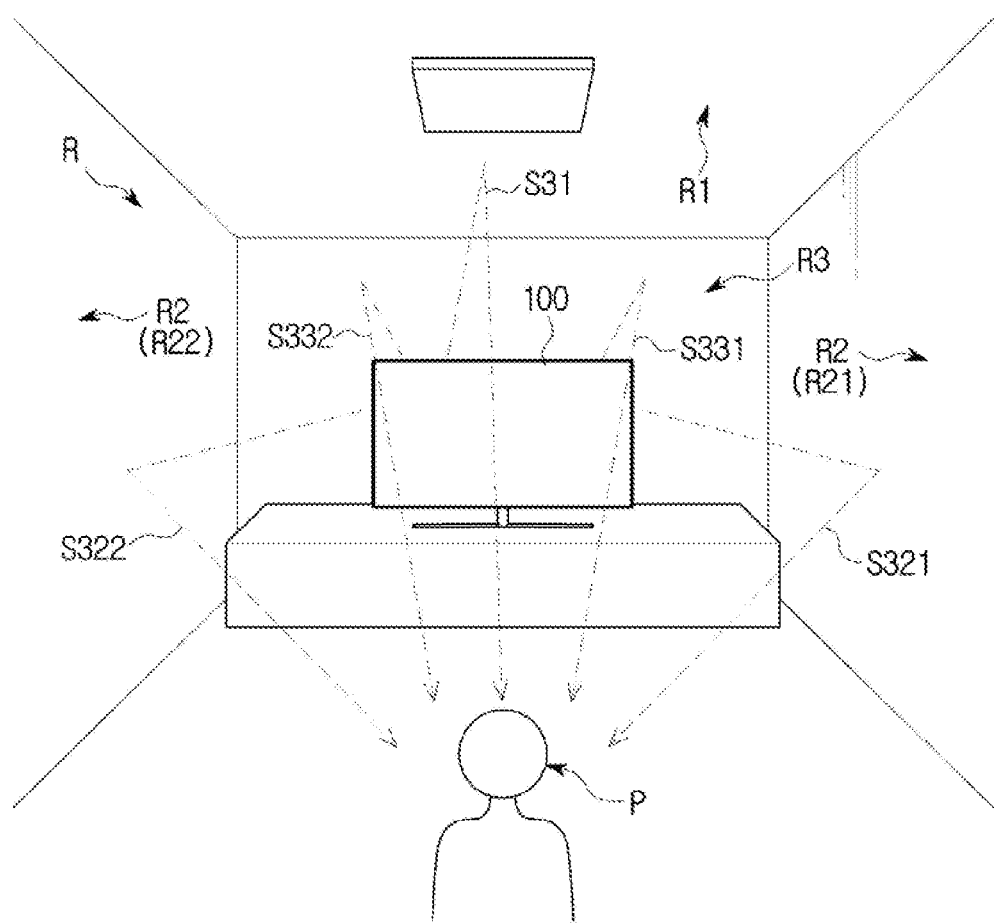
FIG. 23 is a view illustrating an example of a sound radiation direction when the display apparatus is installed in a room.
Figure 24A:
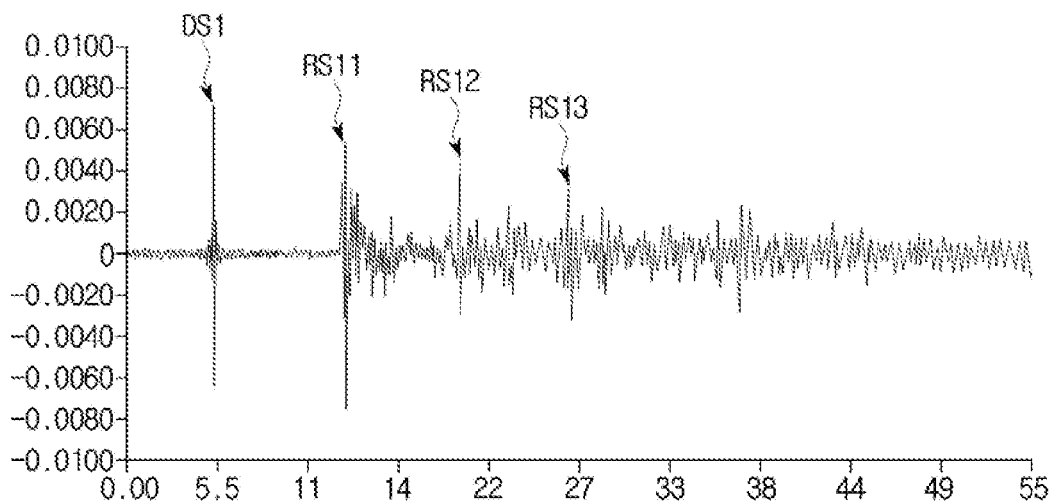
FIGS. 24A to 24C are diagrams illustrating changes in intensity of sound received at one position in a room.
Figure 24B:
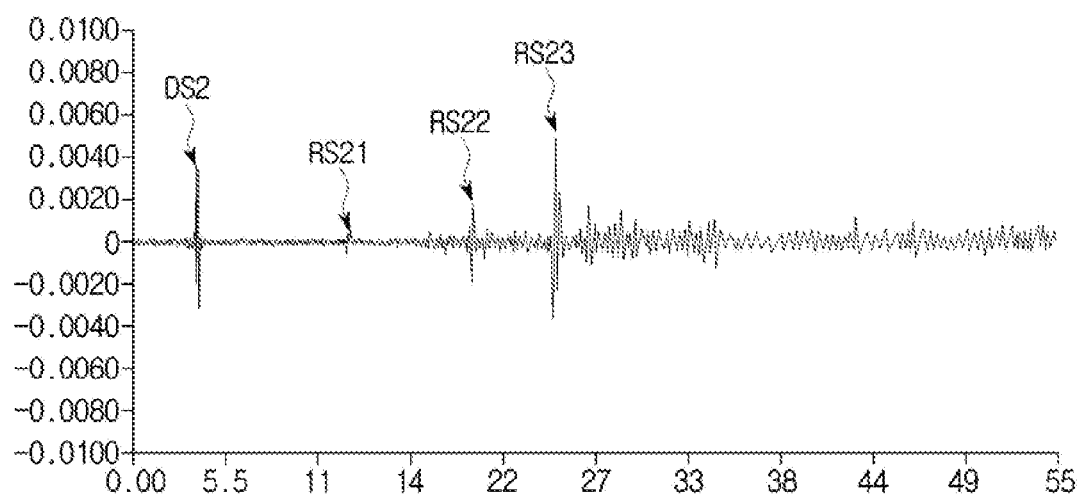
Figure 24C:
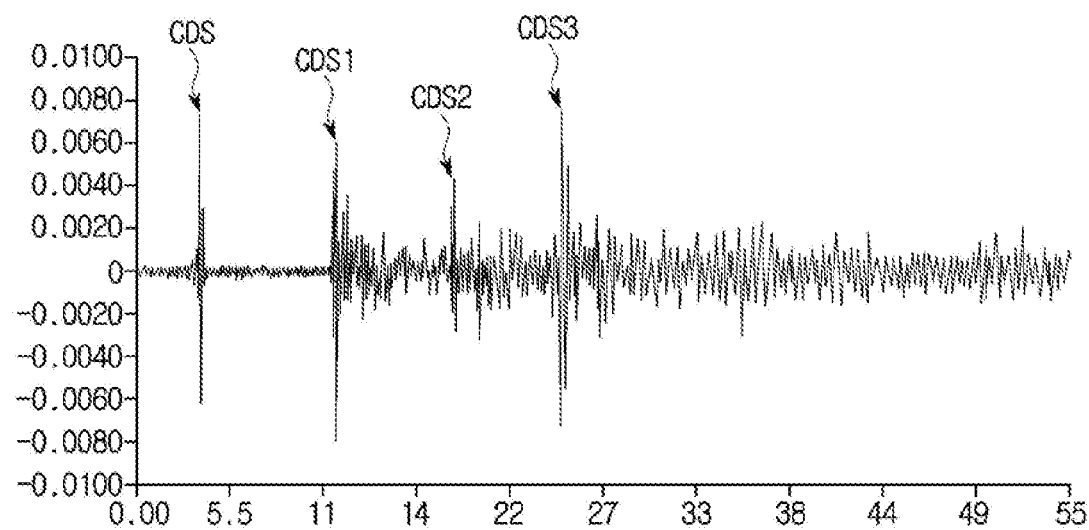
Figure 24D:
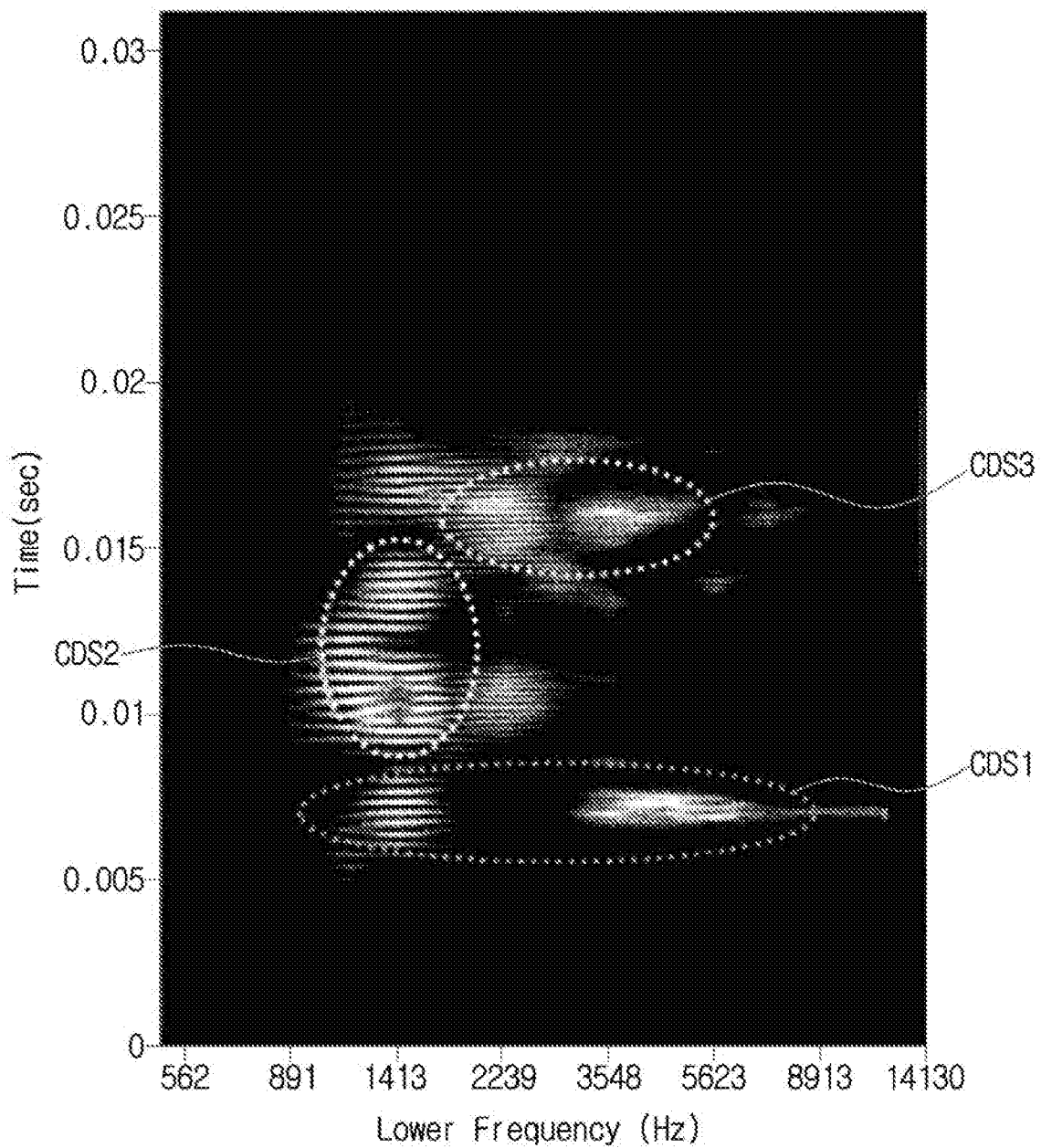
FIG. 24D is a diagram illustrating frequency characteristics with respect to time at one position in a room.

FIG. 23 is a view illustrating an example of a sound radiation direction when the display apparatus is installed in a room, and FIGS. 24A to 24C are diagrams illustrating changes in intensity of sound received at one position in a room. FIG. 24D is a diagram illustrating frequency characteristics with respect to time at one position in a room. In FIGS. 24A to 24C, the x-axis represents time and the y-axis represents the intensity of the wave. In FIG. 24D, the x-axis represents frequency and the y-axis represents time.

When the display apparatus 100 is disposed in a certain indoor space R as shown in FIG. 23, and the first sound outputters 101-1 and 101-2 radiate sounds as illustrated in FIGS. 22A and 22B, the sound S31, S321, S322, S331, and S332 radiated from the first sound outputters 101-1 and 101-2 may be transmitted to at least one of a ceiling R1, a side wall R2, and a rear wall R3. The sound S31 transmitted to the ceiling R1 is reflected on the ceiling R1 and then transmitted to a position P (e.g., a position of the viewer). The sounds S321 and S322 transmitted to the side wall R2 that is at least one of the left and right walls R21 and R22, may be reflected on at least one of the right wall R21 and the left wall R22 and then transmitted to the one position P. The sound S331 and S332 transmitted to the rear wall R3 may be reflected on the rear wall R3 and transmitted to the one position P. In addition, some of the sound radiated from the first sound outputters 101-1 and 101-2 may be directly transmitted to a certain position P.

When the second sound outputters 3-1 and 3-2 output a sound, the sound may be directly or reflectively transmitted to one position P according to the sound output of the second sound outputters 3-1 and 3-2. In this case, as shown in FIG. 24A, a first direct sound DS1, a first reflection sound RS11, a second reflection sound RS12 and a third reflection sound RS13 may be sequentially transmitted to the one position P. The first direct sound DS1 represents a sound directly transmitted, and the first to third reflection sounds RS11 to RS13 each represents a sound reflected by the adjacent reflector. For example, the reflector may include the rear wall R3, the side wall R2, and/or the ceiling R3, but is not limited thereto. Therefore, the reflector may include a variety of objects according to a structure of a space (e.g., an indoor space) in which the display apparatus 100 is installed.

On the other hand, when the first sound outputters 101-1 and 101-2 output a sound, the sound may be directly or reflectively transmitted to one position P according to the sound output of the first sound outputters 101-1 and 101-2. In this case, as shown in FIG. 24B, a second direct sound DS2, a fourth reflection sound RS21, a fifth reflection sound RS22 and a sixth reflection sound RS23 may be sequentially transmitted to the one position P. The second direct sound DS2 represents a sound directly transmitted, and the fourth to sixth reflection sounds RS21 to RS23 each represents a sound reflected by the surrounding reflector. For example, the reflector may include the rear wall R3, the side wall R2, and/or the ceiling R3. As mentioned above, since the first sound outputters 101-1 and 101-2 have high directivity, the reflection characteristic of the sound radiated by the first sound outputters 101-1 and 101-2 may be improved. Accordingly, at least one of the fourth to sixth reflection sounds RS21 to RS23 may be relatively stronger than the first to third reflection sounds RS11 to RS13 according to the indoor structure. The sound DS2, which is directly transmitted to the position P of the viewer among the sounds radiated from the first sound outputters 101-1 and 101-2, may be less directly transmitted to the user in comparison with the sound radiated from the second sound outputters 3-1 and 3-2.

The sound output from the first sound outputters 101-1 and 101-2 and the second sound outputters 3-1 and 3-2 are combined and then transmitted to the one position P as shown in FIGS. 24C and 24D. Accordingly, a first combination sound CDS in which the first direct sound DS1 and the second direct sound DS2 are combined, a second combination sound CDS1 in which the first reflection sound RS11 and the fourth reflection sound RS21 are combined, a third combination sound CDS2 in which the second reflection sound RS12 and the fifth reflection sound RS22 are combined, and a fourth combination sound CDS3 the third reflection sound RS13 and the sixth reflection sound RS23 are combined may be sequentially transmitted to the one position P.

In this case, the second combination sound CDS1 may be a combination of sounds reflected from the rear wall R3, and as shown in FIG. 24D, the second combination sound CDS1 may be a combination of a sound wave at a relatively low frequency band and a sound wave at a relatively high frequency band.

The third combination sound CDS2 may be a combination of sounds reflected from the ceiling R1. For example, the third combination sound CDS2 may be a combination of sound waves at the relatively low frequency band. The third combination sound CDS2 may be transmitted to the one point P after a long time delay since the transmission path of the sound is longer than the other combination sounds CDS, CDS1, and CDS3.

The fourth combination sound CDS3 may be a combination of sound reflected from the side wall R2 and may include a sound wave at a frequency band relatively higher than the third combination sound CDS2. For example, the fourth combination sound CDS3 may include sound waves in the intermediate frequency band.

Therefore, in comparison with the case in which the second sound outputters 3-1 and 3-2 output sound (see FIG. 23A), it may be possible to transmit relatively strong reflection sounds CDS2 and CDS3 to the one position P with a more varied frequency for more varied period of times. Accordingly, when the enhanced sound CDS2 and CDS3 is transmitted to the user, the user can feel a wider sound field, and the user can view more vivid and realistic images. In other words, the immersive effect can be emphasized and improved. In addition, the surround sound effect may also be obtained since the enhanced sound CDS2 and CDS3 is reflected and transmitted at various positions R1, R2 and R3.

Figure 25:
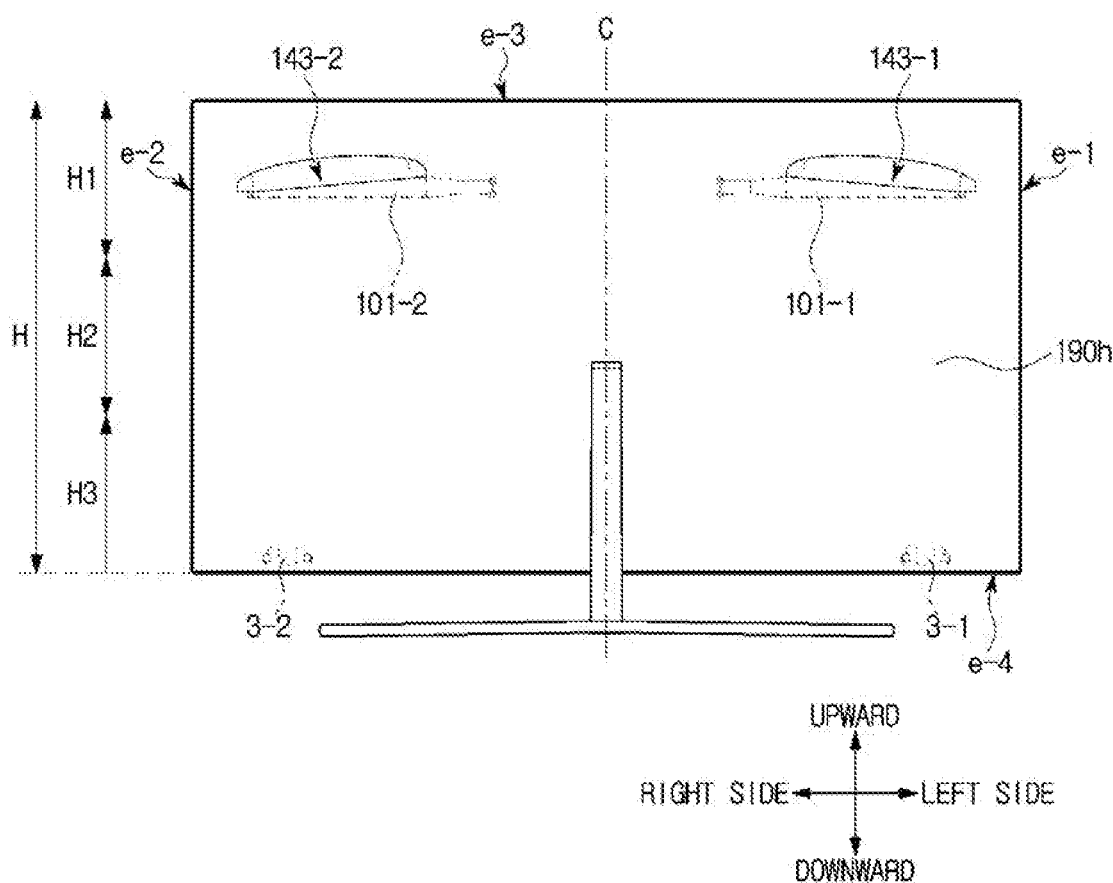
FIG. 25 is a view illustrating an example of a rear surface of the display apparatus provided with a second accommodation portion.
Figure 26A:
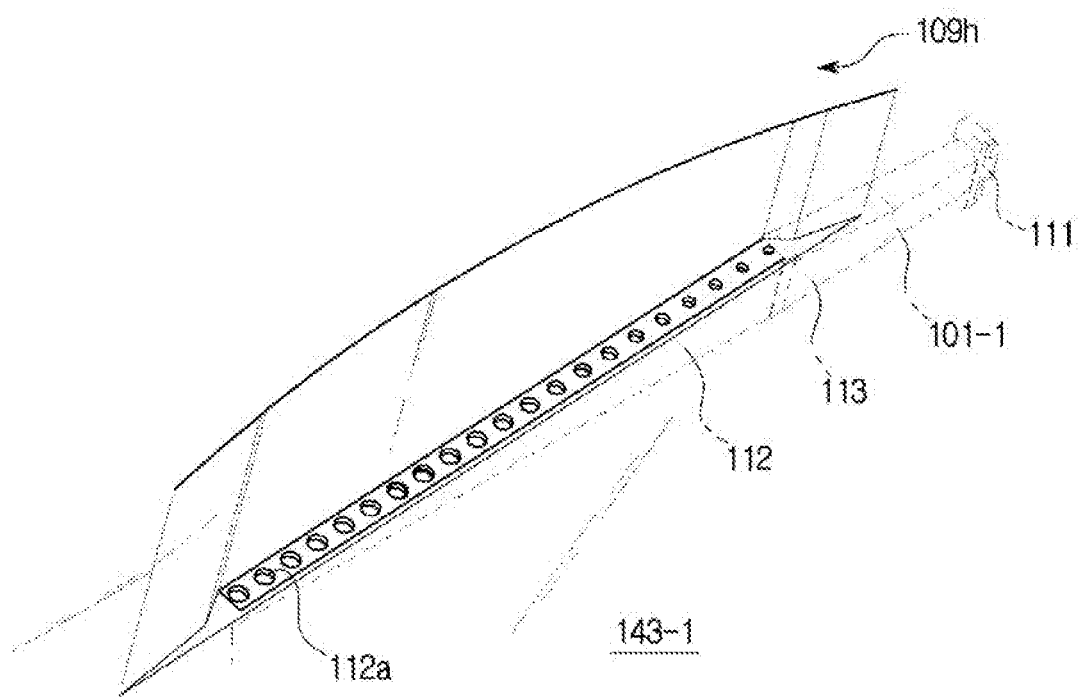
FIG. 26A is another view illustrating an example of the rear surface of the display apparatus provided with the second accommodation portion.
Figure 26B:
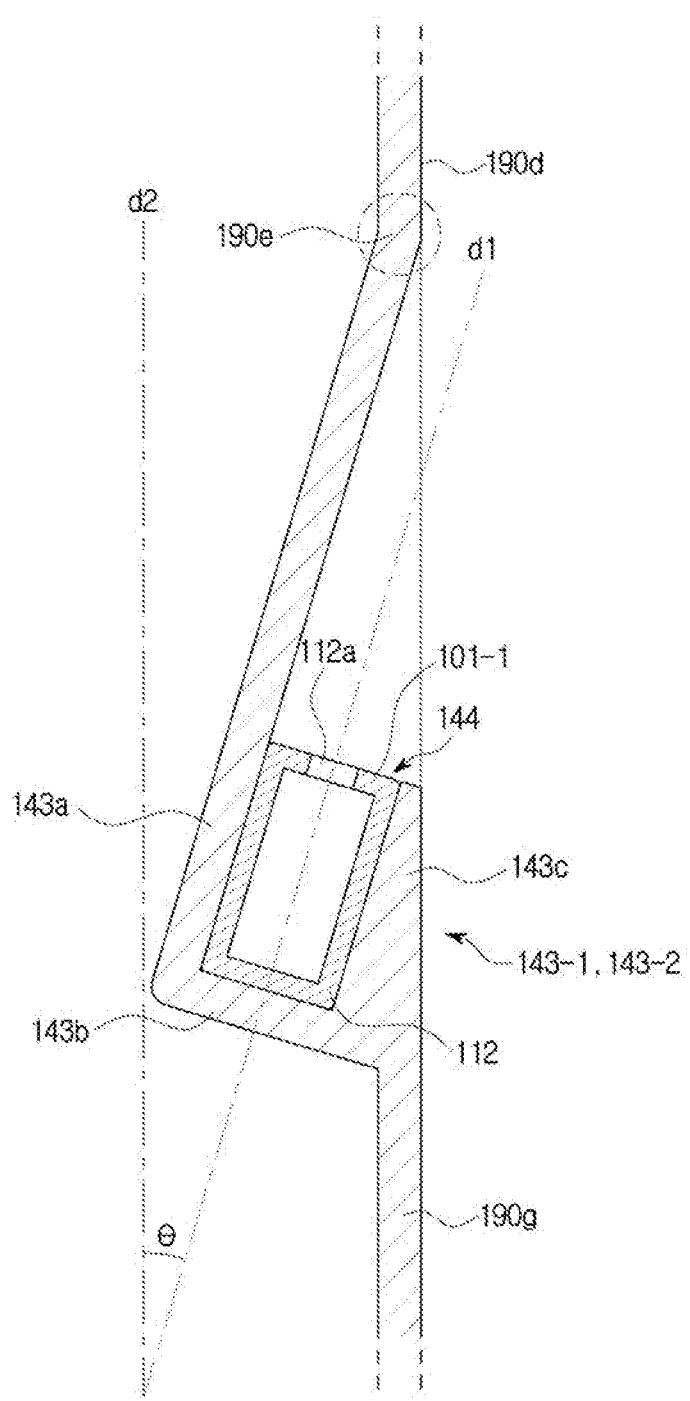
FIG. 26B is a sectional view of the second accommodation portion.
Figure 27A:
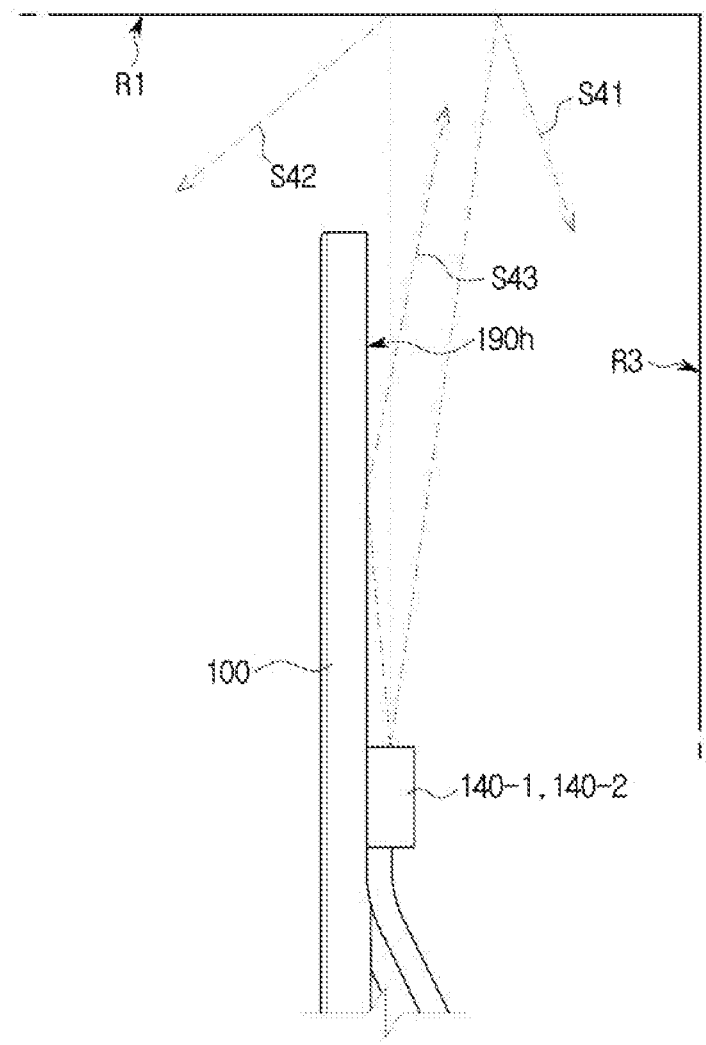
FIGS. 27A and 27B are diagrams illustrating the difference in the reflection characteristic of sound between the first sound outputter provided in the first accommodation portion and the first sound outputter provided in the second accommodation portion.
Figure 27B:
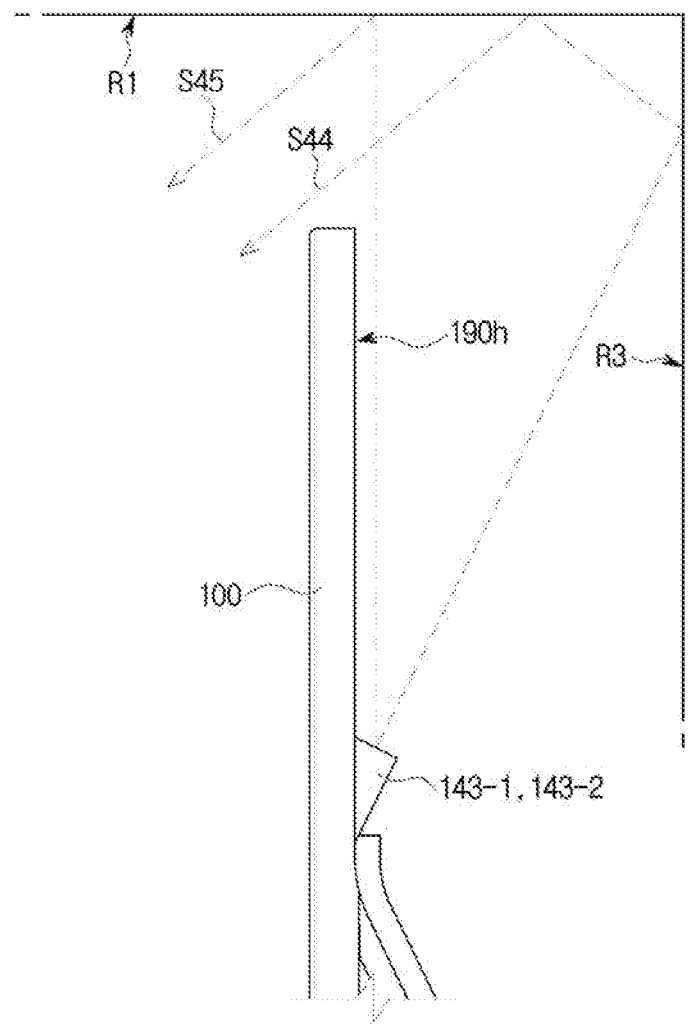

FIG. 25 is a view illustrating an example of a rear surface of the display apparatus provided with a second accommodation portion, and FIG. 26A is another view illustrating an example of the rear surface of the display apparatus provided with the second accommodation portion. FIG. 26B is a cross-sectional view of the second accommodation portion. FIGS. 27A and 27B are diagrams illustrating the difference in the reflection characteristic of sound between the first sound outputter provided in the first accommodation portion and the first sound outputter provided in the second accommodation portion.

Referring to FIGS. 25 and 26A, the first sound outputters 101-1 and 101-2 are respectively mounted on the second accommodation portions 143-1 and 143-2 provided on the rear surface 190h and then installed on the rear surface 190h of the housing 190. Depending on embodiments, a single second accommodation portion 143-1 or 143-2 may be provided on the rear surface 190h of the housing 190 or two or more second accommodation portions 143-1 and 143-2 may be provided on the rear surface 190h of the housing 190. The number of the second accommodation portions 143-1 and 143-2 may correspond to the number of the first sound outputters 101-1 and 101-2.

Referring to FIGS. 25, 26A and 26B, the second accommodation portions 143-1 and 143-2 may be formed to be recessed in the inward direction (e.g., the forward direction, the downward direction, and the direction between the forward direction and the downward direction), on the rear surface 190h of the display apparatus 100. In this case, by corresponding to the structure in which the first sound outputters 101-1 and 101-2 are installed, the second accommodation portions 143-1 and 143-2 may be installed in such a manner that one end thereof faces the center line c and the other end thereof faces the left or right boundaries e-1 or e-2. In addition, in this case, the second accommodation portions 143-1 and 143-2 may be installed in parallel to or in substantially parallel to the upper end boundary e-3. Alternatively, the second accommodation portions 143-1 and 143-2 may be installed at a predetermined angle with respect to the upper end boundary e-3.

The second accommodation portions 143-1 and 143-2 may include a second insertion groove formed to extend from one end to the other end by corresponding to the shape of the first sound outputter 101-1.

For example, referring to FIG. 26B, a portion 190d of the rear surface 190h of the display apparatus 100 is connected to a fifth partition 143a of the second accommodation portions 143-1 and 143-2. In this case, a bending point 190e may be disposed between the portion 190d of the rear surface 190h and the fifth partition 143a. One end of the fifth partition 143a is connected to the portion 190d of the rear surface 190h, and the other end is bent and connected to a sixth partition 143b. The fifth partition 143a is placed inward relative to the other partition 143b and 143c. In this case, as shown in FIG. 26B, the fifth partition 143a may be inclined with respect to the rear surface 190h so that the openings 144 of the second accommodation portions 143-1 and 143-2 are inclined at a predetermined angle θ with respect to the rear surface 190h. Alternatively, the fifth partition 143a may be formed in parallel to the rear surface 190h so that the fifth partition 143a is horizontal with the rear surface 190h (i.e., the predetermined angle θ is 0 (zero) or a value close to 0 (zero)). The sixth partition 143b extends in the backward direction or the downward direction in such a manner that one end thereof is connected to the fifth partition 143a and the other thereof is connected to the seventh partition 143c disposed in the outside. The seventh partition 143c may be extended in such a manner that a portion of the seventh partition 143c is directed to the upward direction or the upper-backward direction and the other portion of the seventh partition 143c is directed to the downward direction or the lower-forward direction. As mentioned above, the seventh partition 143c may be formed inclined with respect to the rear surface 190h so that the opening 144 is inclined at a predetermined angle θ With respect to the rear surface 190h. Alternatively, the opening 144 may be installed in parallel to or in substantially parallel to the rear surface 190h. A space corresponding to the second insertion groove is formed on the inner side by the fifth partition 143a, the sixth partition 143b and the seventh partition 143c. The opening 144 may be provided between one end of the portion of the seventh partition 143c and the portion 190d of the rear surface 190h, or between one end of the portion of the seventh partition 143c and the fifth partition 143a. The opening 144 may extend in the longitudinal direction in the upward direction of the second accommodation portions 143-1 and 143-2 by corresponding to the radiation apertures 112a formed along the outer surface of the guide tube 112. In addition, other portion of the seventh partition 143c is connected to other portion 190g of the rear surface 190h. In this case, a bending point (not shown) may be provided between one end of other portion of the seventh partition 143c and the other portion 190g of the rear surface 190h.

As described above, when the second accommodation portions 143-1 and 143-2 are formed to be inclined with respect to the rear surface 190h, the first sound outputters 101-1 and 101-2 may be mounted to the second accommodation portions 143-1 and 143-2 at the predetermined angle θ with respect to the rear surface 190h. In this case, since the radiation apertures 112a of the first sound outputters 101-1 and 101-2 are inserted and installed to be exposed to the outside through the opening 144, the radiation apertures 112a is inclined at the predetermined angle θ with respect to the rear surface 190h and the radiation direction of the sound is inclined with respect to the rear surface 190h.

When the second accommodation portions 143-1 and 143-2 are formed in parallel with the rear surface 190h, the first sound outputters 101-1 and 101-2 may be mounted in perpendicular to the normal of the rear surface 190h. In other words, the angle between the sound output directions of the first sound outputters 101-1 and 101-2 with respect to the rear surface 190h is set to 0 (zero) or a value close thereto. In this case, the radiation aperture 112a may be directed substantially upward.

When the second accommodation portions 143-1 and 143-2 have the above-described structure, the sound output from the first sound outputters 101-1 and 101-2 mounted to the second accommodation portions 143-1 and 143-2, may be reflected more strongly on the ceiling R1 and then directed to the forward direction, in comparison with the first sound outputters 101-1 and 101-2 mounted to the first accommodation portions 140-1 and 140-2.

Particularly, as shown in FIG. 27A, sounds S41 to S43 radiated from the sound outputters 101-1 and 101-2 mounted on the first accommodation portions 140-1 and 140-2 may be directed to the upward direction with being reflected by the display apparatus 100 or without being reflected. Accordingly, some sounds S43 may be reflected from the ceiling R1 and directed in the direction of the rear wall R3. Therefore, the reflected sound transmitted from the ceiling R1 may be relatively weakened and thus a sufficient reflected sound may not be transmitted to the user.

On the other hand, as shown in FIG. 27B, the sounds S44 and S45 radiated from the sound outputters 101-1 and 101-2 mounted on the second accommodation portions 143-1 and 143-2 may be transmitted to the upward direction or the upper-backward direction. In this case, some sound may be reflected on the display apparatus 100, but are reflected less than a case in which the sound outputters 101-1 and 101-2 are installed in the first accommodation portions 140-1 and 140-2. The sound S45 and some sounds S 44 transmitted in the upper-backward direction may be sequentially reflected on the rear wall R3 and the ceiling R1 and then directed to the forward direction. Therefore, a relatively many reflection sound S44 and S45 may be transmitted to a user from the ceiling R2. Accordingly, when the sound outputters 101-1 and 101-2 are mounted in the second accommodation portions 143-1 and 143-2, the height effect (of the sound) can be further emphasized.

The height effect may vary according to the angle θ at which the first sound outputters 101-1 and 101-2 are inclined with respect to the rear surface 190h. For example, when the angle is between 0 and 45 degrees, the height effect may be emphasized. However, when the angle is 45 degrees or more, the reflection sound reflected from the ceiling R1 may decrease and thus the height effect may be relatively reduced.

Figure 28:
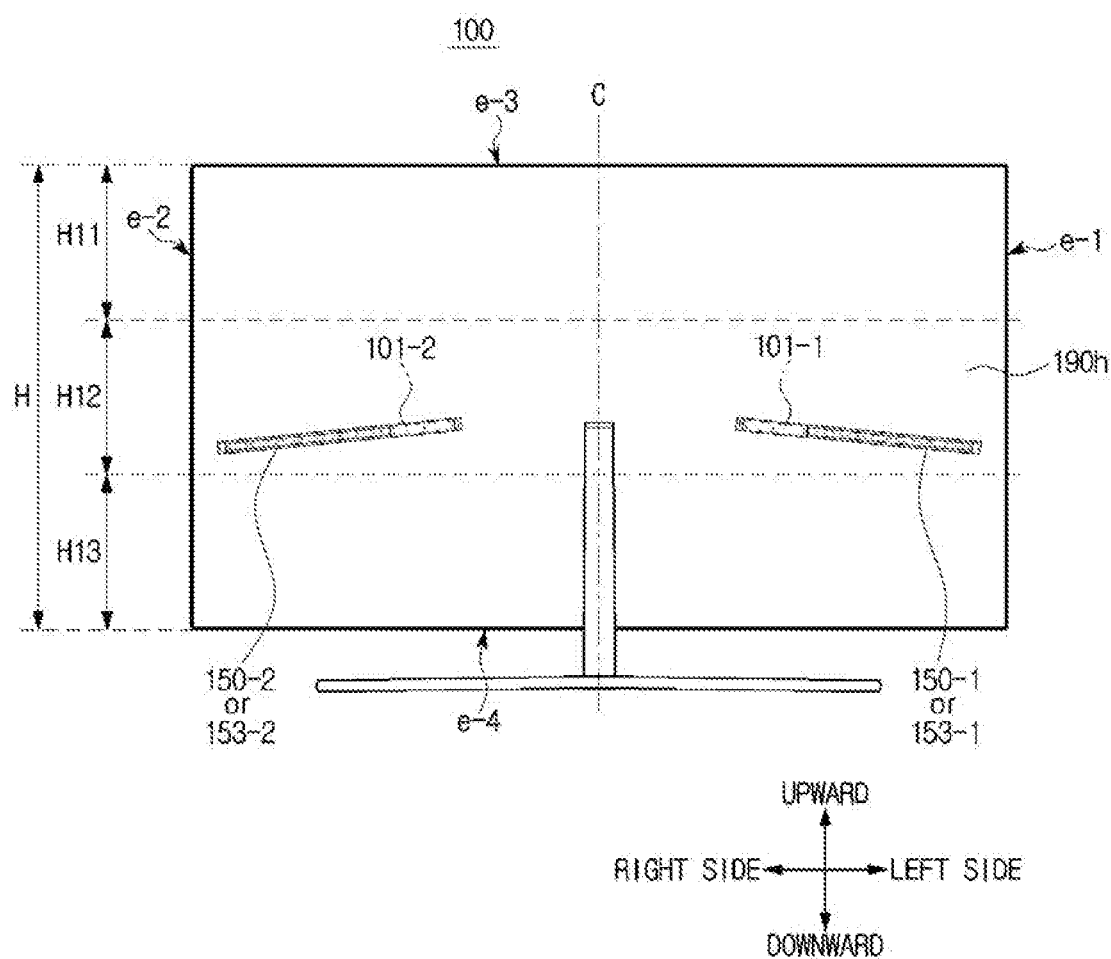
FIG. 28 is a rear view illustrating a second embodiment of the display apparatus provided with the first sound outputter.

FIG. 28 is a rear view illustrating a second embodiment of the display apparatus provided with the first sound outputter.

According to another embodiment, the first sound outputters 101-1 and 101-2 are provided on the rear surface 190h of the housing 190, particularly, the first sound outputters 101-1 and 101-2 are disposed in the middle portion H2 of the rear surface 190h, as illustrated in FIG. 28. In this case, the first sound outputters 101-1 and 101-2 may be disposed in contact with or adjacent to the upper end of the middle portion H2. Alternatively, the first sound outputters 101-1 and 101-2 may be disposed at the lower end of the middle portion H2 or the first sound outputters 101-1 and 101-2 may be disposed at the middle or adjacent to the middle of the middle portion H2.

In the same manner as the first embodiment, the first sound outputters 101-1 and 101-2 may be installed in such a manner that the sound generator 111 faces the center line c and the cap 114 faces the left or right boundary e-1 or e-2. In this case, the first sound outputters 101-1 and 101-2 may be installed on the rear surface 190h parallel to or substantially parallel to the upper end boundary e-3. Alternatively, the first sound outputters 101-1 and 101-2 may be installed on the rear surface 190h at a predetermined angle with respect to the upper end boundary e-3.

In addition, the first sound outputters 101-1 and 101-2 may be installed in such a manner that one end, to which the cap 114 is mounted, is in contact with and/or adjacent to the left or right boundary e-1 or e-2 and one end, to which the sound generator 111, is mounted is in contact with or adjacent to the center line c, or spaced apart from the center line c with a predetermined distance.

Depending on embodiments, the first sound outputters 101-1 and 101-2 may be installed in such a manner that the sound generator 111 faces the left or right boundary e-1 or e-2 and the cap 114 faces the center line c. Particularly, one first sound outputter 101-1 may be installed in such a manner that the cap 114 faces the center line c, and the other first sound outputter 101-2 may be installed in such a manner that the cap 114 faces the left or right boundary e-1 or e-2.

The first sound outputters 101-1 and 101-2 may output a sound in at least one of the upward direction, the backward direction, the lateral direction, and the downward direction.

According to an embodiment, third accommodation portions 150-1 and 150-2 and/or fourth accommodation portions 153-1 and 153-2 may be formed on the rear surface 190h of the housing 190. The first sound outputters 101-1 and 101-2 may be mounted on the third accommodation portions 150-1 and 150-2 and/or the fourth accommodation portions 153-1 and 153-2, and then installed on the rear surface 190h of the housing 190.

Depending on embodiments, a single third accommodation portion 150-1 or 150-2 may be installed, a plurality of third accommodation portions 150-1 and 150-2 may be installed, a single fourth accommodation portions 153-1 or 153-2 may be installed, and/or a plurality of fourth accommodation portions 153-1 and 153-2 may be installed. In the same manner as the first embodiment, the number of the third accommodation portions 150-1 and 150-2 and/or the fourth accommodation portions 153-1 and 153-2 correspond to the number of the first sound outputters 101-1 and 101-2 to be installed.

Each of the third accommodation portions 150-1 and 150-2 and/or the fourth accommodation portions 153-1 and 153-2 may be formed in a hollow tube shape that extends from the left or right boundary e-1 or e-2 to the center line c by corresponding to the structure of the first sound outputters 101-1 and 101-2. Therefore, the third accommodation portions 150-1 and 150-2 and/or the fourth accommodation portions 153-1 and 153-2 may be installed in such a manner that one end thereof is in contact with and/or adjacent to the left or right boundary e-1 or e-2 and the other end thereof is in contact with or adjacent to the center line c or spaced apart from the center line c with a predetermined distance. In addition, in this case, the third accommodation portions 150-1 and 150-2 and/or the fourth accommodation portions 153-1 and 153-2 may be installed on the rear surface 190h parallel to or substantially parallel to the upper end boundary e-3. Alternatively, the third accommodation portions 150-1 and 150-2 and/or the fourth accommodation portions 153-1 and 153-2 may be installed on the rear surface 190h at a predetermined angle with respect to the upper end boundary e-3.

According to an embodiment, the third accommodation portions 150-1 and 150-2 and/or the fourth accommodation portions 153-1 and 153-2 may be installed in the middle portion H2 of the rear surface 190h. In this case, the third accommodation portions 150-1 and 150-2 and/or the fourth accommodation portions 153-1 and 153-2 may be installed in a variety of position of the middle portion H2 such as an upper end of the middle portion H2, a lower end of the middle portion H2, a middle of the middle portion H2, or a vicinity thereof.

Figure 29:
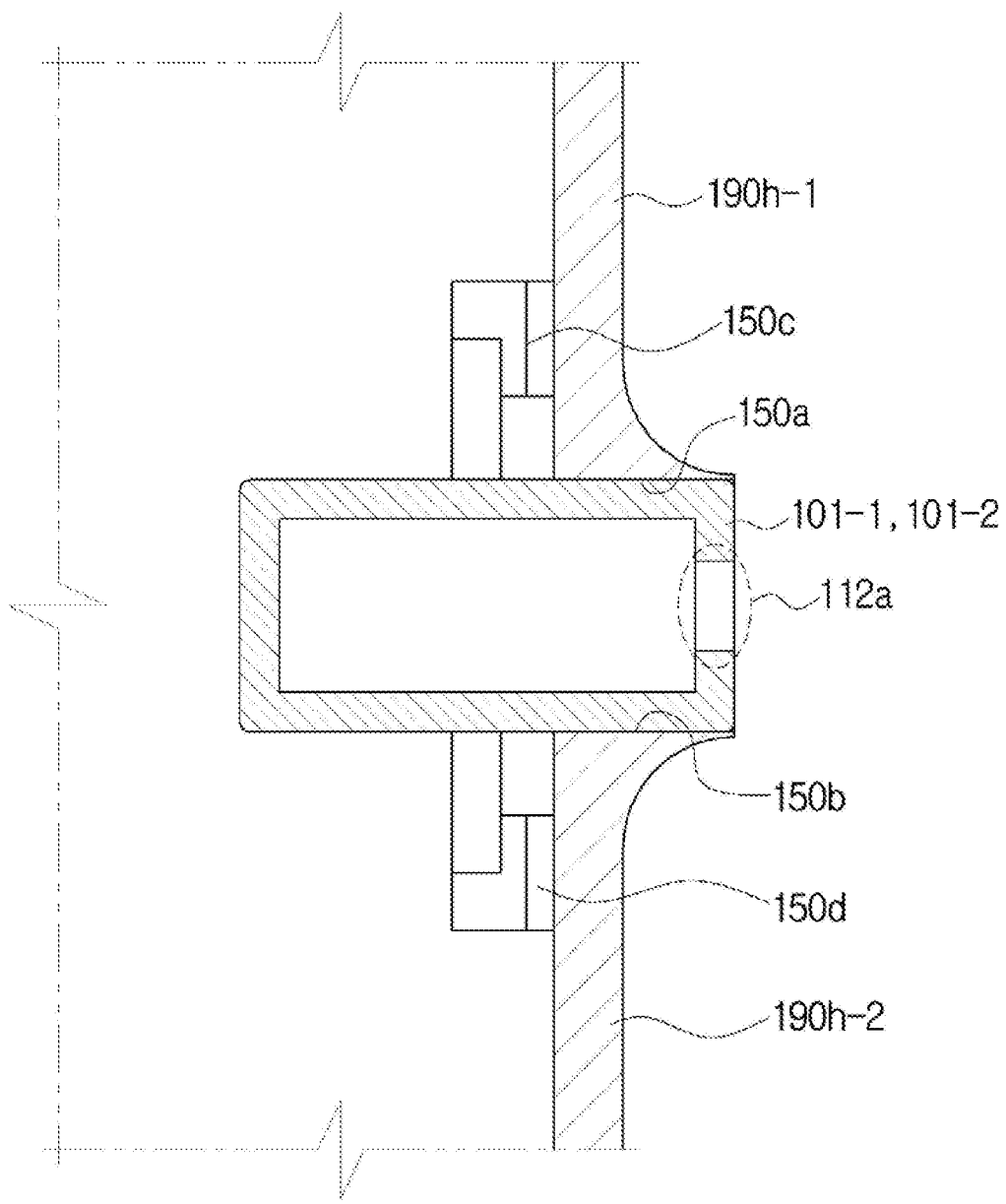
FIG. 29 is a cross-sectional view illustrating an embodiment of a third accommodation portion.

FIG. 29 is a cross-sectional view illustrating an embodiment of a third accommodation portion.

Referring to FIG. 29, the third accommodation portions 150-1 and 150-2 may be embedded in the rear surface 190h of the housing 190. In other words, the third accommodation portions 150-1 and 150-2 are inserted into the rear surface 190h of the housing 190 to form a space in which the first sound outputter 101-1 is mounted.

Particularly, the third accommodation portions 150-1 and 150-2 may include an upper end portion 150a formed at an end of an upper end 190h-1 of the rear surface 190h of the housing 190, and a lower portion end 150b formed at a lower end of a lower end 190h-2 of the rear surface 190h of the housing 190. The upper end portion 150a and the lower end portion 150b may form a third insertion groove in which the first sound outputters 101-1 and 101-2 are mounted. The upper end portion 150a and the lower end portion 150b may be formed to be substantially perpendicular to the rear surface 190h of the housing 190. The third accommodation portions 150-1 and 150-2 may include fixers 150c and 150d fixing the first sound outputters 101-1 and 101-2. The fixers 150c and 150d may be mounted and fixed to the first sound outputters 101-1 and 101-2 respectively in the up and down directions of the first sound outputters 101-1 and 101-2. In addition, the fixers 150c and 150d may be fixed to the upper end 190h-1 and the lower end 190h-2 of the rear surface 190h of the housing 190, thereby preventing the first sound outputters 101-1 and 101-2 from being detached from the rear surface 190h of the housing 190.

When the sounds of the first sound outputters 101-1 and 101-2 mounted on the third accommodation portions 150-1 and 150-2 are radiated backward, a low frequency sound may be in substantially parallel to the ground surface and thus the height effect may be relatively reduced, and the surround effect may be emphasized relatively. In addition, since a high frequency sound is transmitted to the lateral side, the sound may be transmitted to the one position P by being reflected by the side wall R2 and thus it may be possible to obtain the surround effect.

Figure 30:
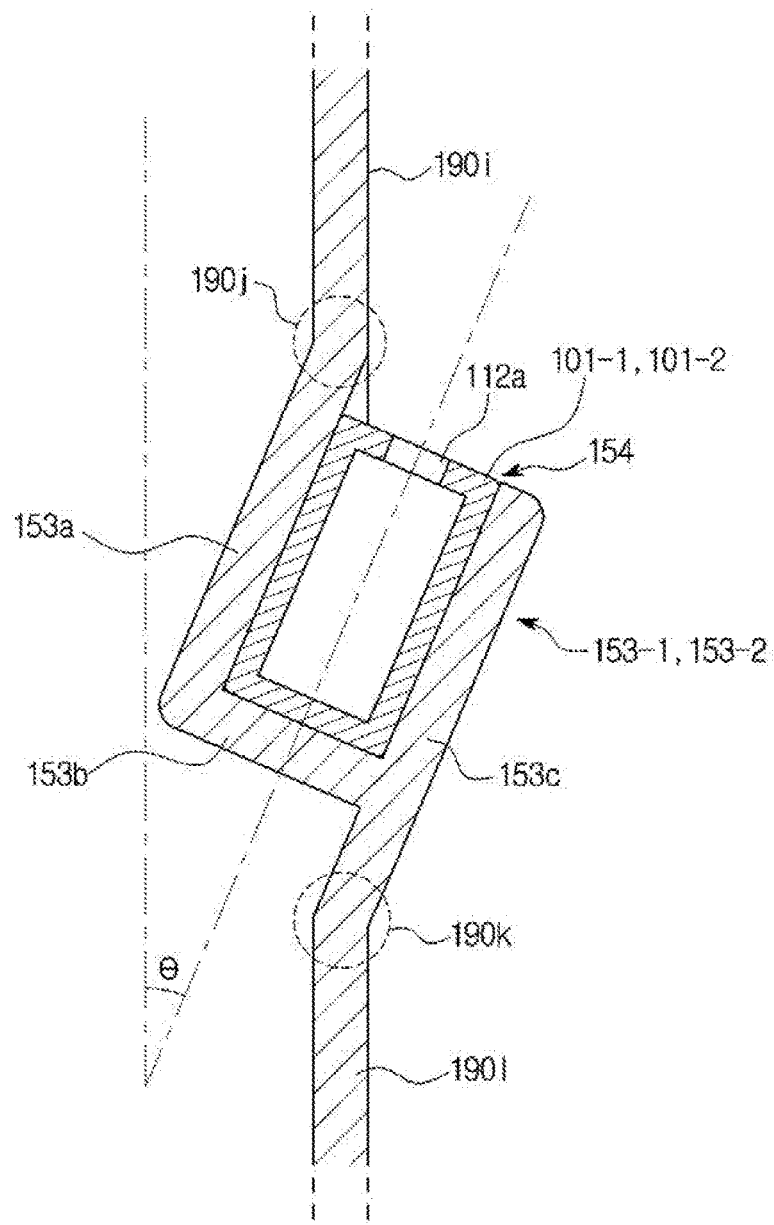
FIG. 30 is a cross-sectional view illustrating an embodiment of a fourth accommodation portion.
Figure 31:
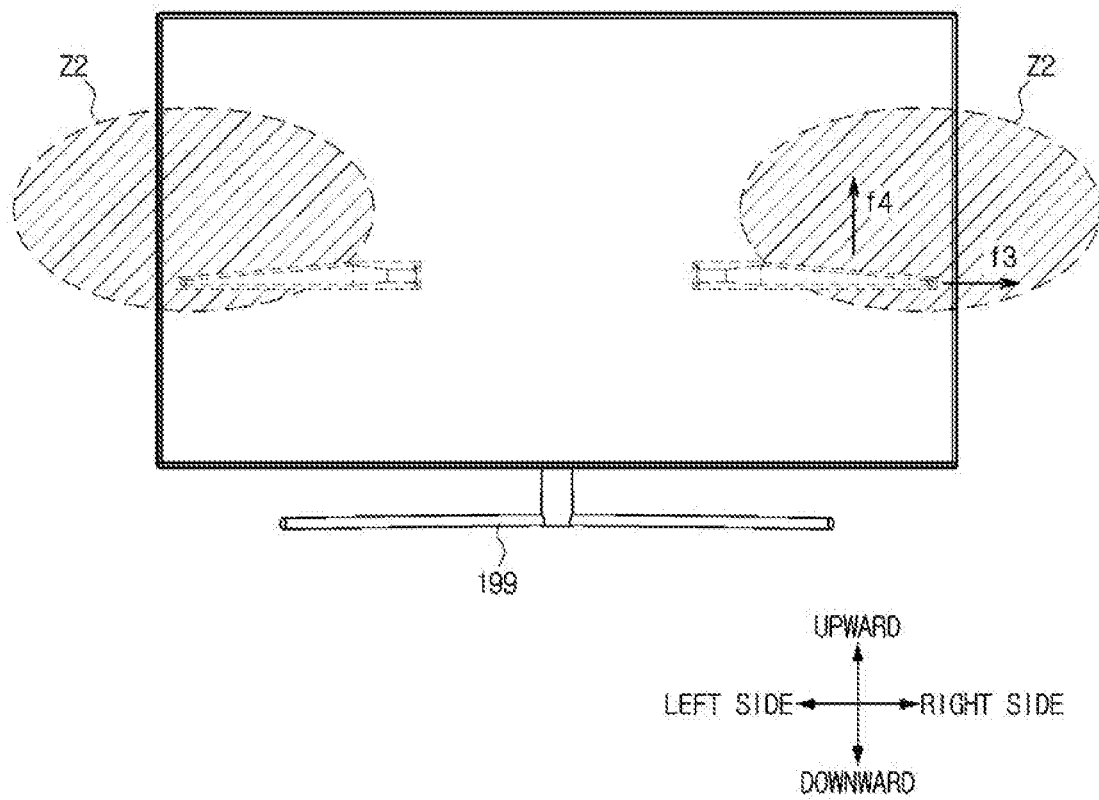
FIG. 31 is a view illustrating the radiation characteristics when the sound reflector is provided on the rear surface of the display apparatus according to the second embodiment.

FIG. 30 is a cross-sectional view illustrating an embodiment of a fourth accommodation portion, and FIG. 31 is a view illustrating the radiation characteristics when the sound reflector is provided on the rear surface of the display apparatus according to the second embodiment.

As illustrated in FIG. 30, the fourth accommodation portions 153-1 and 153-2 may be formed to be recessed in the inward direction (e.g., the forward direction, the downward direction, and the direction between the forward direction and the downward direction), on the rear surface 190h of the display apparatus 100, in the same manner as the second accommodation portions 143-1 and 143-2.

The fourth accommodation portions 153-1 and 153-2 may include a fourth insertion groove formed to extend from one end to the other end by corresponding to the shape of the first sound outputter 101-1.

Particularly, the fourth accommodation portions 153-1 and 153-2 may include an eighth partition 153a provided in such a manner that one end thereof is connected to a portion 190i of the rear surface 190h of the display apparatus 100 and the other end thereof is provided with a bending portion, wherein the eight partition is placed relatively inner side with respect other partitions 153b and 153c, a ninth partition 153b provided in such a manner that one end thereof is connected to the bending portion of the eighth partition 153a and the other end thereof is provided with a bending portion, and a tenth partition 153c connected to the bending portion of the ninth partition 153b and disposed in the outside. In this case, a bending point 190j may be disposed between the portion 190i of the rear surface 190h and the eighth partition 153a. The eighth partition 153a, the ninth partition 153b, and the tenth partition 153c may be inclined in an appropriate direction with respect to the rear surface 190h so that an opening 154 of the fourth accommodation portions 153-1 and 153-2 is inclined at a predetermined angle θ with respect to the rear surface 190h. The tenth partition 153c may be extended in such a manner that a portion of the tenth partition 153c is directed to the upward direction or the upper-backward direction and the other portion of the tenth partition 153c is directed to the downward direction or the lower-forward direction. The other portion of the tenth partition 153c may be connected to other portion 190l of the rear surface 190h. A bending portion 190k may be provided between the other portion of the tenth partition 153c and the other portion 190l of the rear surface 190h.

In the inside of the fourth accommodation portions 153-1 and 153-2, a fourth insertion groove may be formed by a portion of the tenth partition 153c and the eighth partition 153a and the ninth partition 153b. The opening 154 may be provided between one end of the portion of the tenth partition 153c and a portion 190d of the rear surface 190h, or between one end of the portion of the tenth partition 153c and the eighth partition 153a. As mentioned above, the opening 154 may extend in the longitudinal direction in the upward direction of the fourth accommodation portions 153-1 and 153-2 by corresponding to the radiation apertures 112a formed along the outer surface of the guide tube 112.

Since the fourth accommodation portions 153-1 and 153-2 are formed at the predetermined angle θ with respect to the rear surface 190h, the first sound outputters 101-1 and 101-2 may be also inclined and mounted. In this case, since the radiation apertures 112a is exposed to the outside through the opening 154, the radiation direction of the sound of the first sound outputters 101-1 and 101-2 is inclined at the predetermined angle with respect to the rear surface 190h.

When the first sound outputters 101-1 and 101-2 are mounted on the fourth accommodation portions 153-1 and 153-2, a high frequency sound f3 is radiated in the lateral direction, and a low frequency sound f4 may be radiated in the upward direction. As illustrated in FIG. 31, the sound may be substantially radiated to a range z2 in which the lateral direction (e.g., the sidewall direction) is dominant. Accordingly, in comparison with a case in which the first sound outputters 101-1 and 101-2 are mounted on the first accommodation portions 140-1 and 140-2 or the second accommodation portions 143-1 and 143-2, the height effect may be relatively reduced, but the surround effect in the lateral direction may be enhanced.

Figure 32:
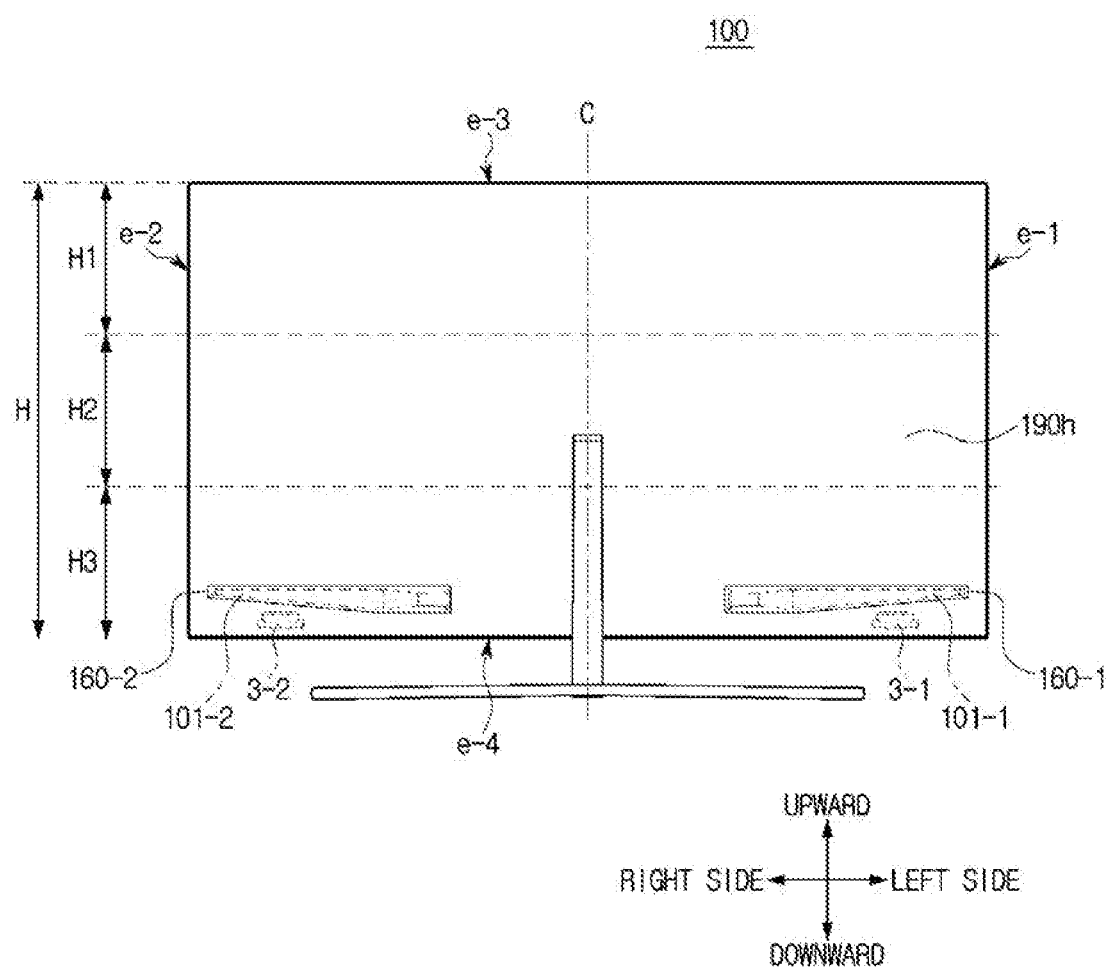
FIG. 32 is a rear view illustrating a third embodiment of the display apparatus provided with the first sound outputter.

FIG. 32 is a rear view illustrating a third embodiment of the display apparatus provided with the first sound outputter.

According to another embodiment, the first sound outputters 101-1 and 101-2 are provided on the rear surface 190h of the housing 190, particularly, the first sound outputters 101-1 and 101-2 are disposed in the lower portion H3 of the rear surface 190h, as illustrated in FIG. 32. In this case, the first sound outputters 101-1 and 101-2 may be disposed in contact with or adjacent to the upper end of the lower portion H3. Alternatively, the first sound outputters 101-1 and 101-2 may be disposed in contact with or adjacent to a lower end of the lower portion H3 that is the lower end boundary e-4. In addition, the first sound outputters 101-1 and 101-2 may be disposed at the middle or adjacent to the middle of the lower portion H3.

In this case, the first sound outputters 101-1 and 101-2 may substantially output a sound in at least one of the upward direction, the backward direction, the lateral direction, and the downward direction. For example, the first sound outputters 101-1 and 101-2 may output the sound in the downward direction in the same manner as the second sound outputters 3-1 and 3-2.

According to the embodiment, the first sound outputters 101-1 and 101-2 may be installed in such a manner that the sound generator 111 faces the center line c and the cap 114 faces the left or right boundary e-1 or e-2, in the same manner as the first and second embodiments. In this case, the first sound outputters 101-1 and 101-2 may be installed on the rear surface 190h parallel to or substantially parallel to the upper end boundary e-3. Alternatively, the first sound outputters 101-1 and 101-2 may be installed on the rear surface 190h at a predetermined angle with respect to the upper end boundary e-3. In addition, the first sound outputters 101-1 and 101-2 may be installed in such a manner that one end to which the cap 114 is mounted is in contact with and/or adjacent to the left or right boundary e-1 or e-2 and one end to which the sound generator 111 is mounted is in contact with or adjacent to the center line c, or spaced apart from the center line c with a predetermined distance. Depending on embodiments, the first sound outputters 101-1 and 101-2 may be installed in such a manner that the sound generator 111 faces the left or right boundary e-1 or e-2 and the cap 114 faces the center line c. Particularly, one first sound outputter 101-1 may be installed in such a manner that the cap 114 faces the center line c, and the other first sound outputter 101-2 may be installed in such a manner that the cap 114 faces the left or right boundary e-1 or e-2.

Figure 33:
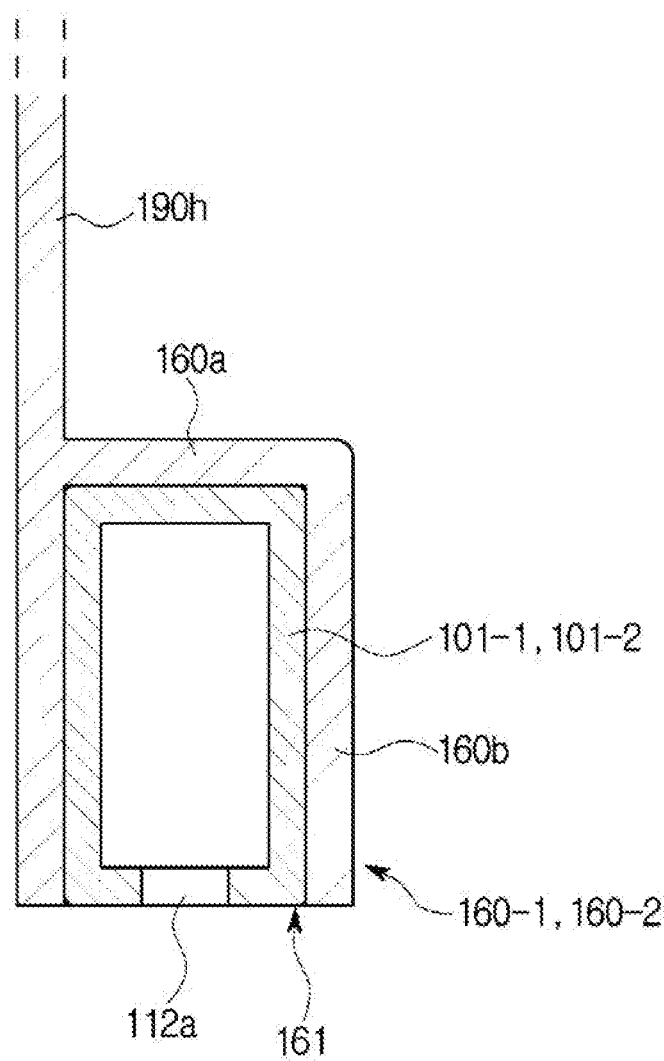
FIG. 33 is a cross-sectional view illustrating an embodiment of a fifth accommodation portion.
Figure 34:
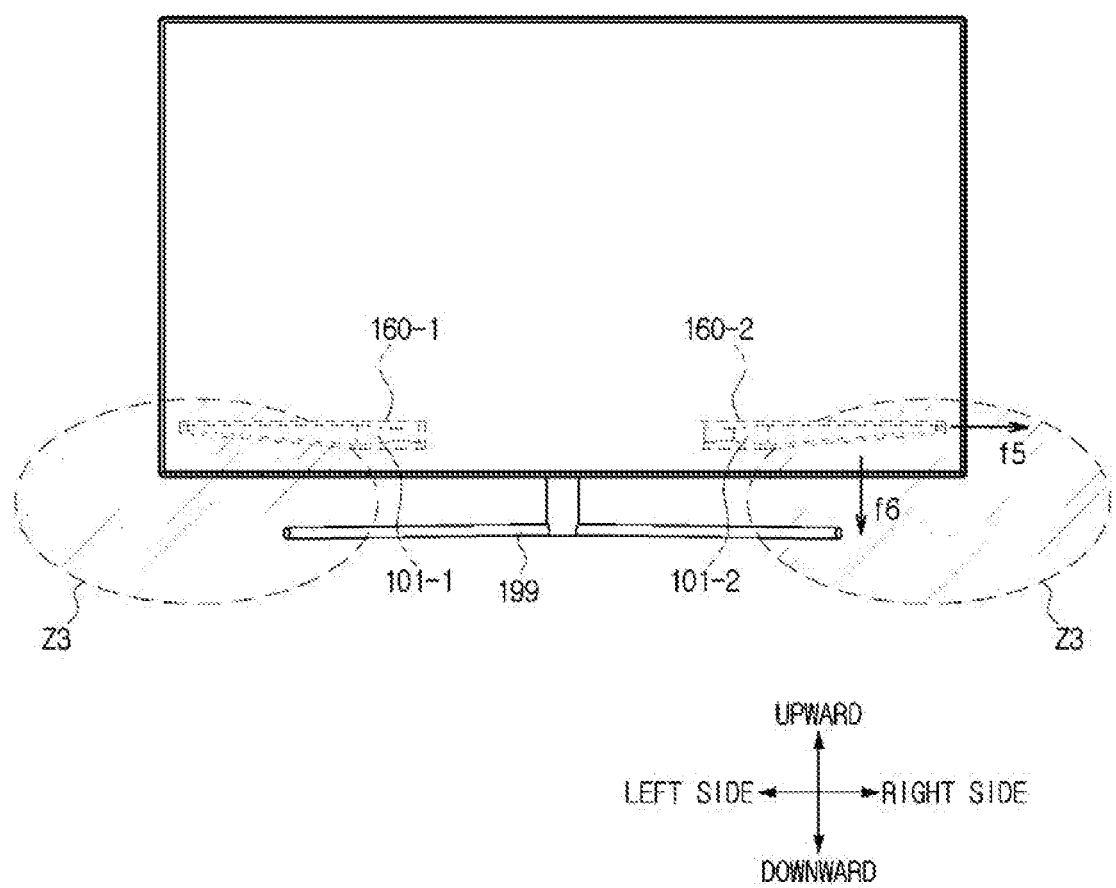
FIG. 34 is a view illustrating the radiation characteristics when the sound reflector is provided on the rear surface of the display apparatus according to the third embodiment.

FIG. 33 is a cross-sectional view illustrating an embodiment of a fifth accommodation portion, and FIG. 34 is a view illustrating the radiation characteristics when the sound reflector is provided on the rear surface of the display apparatus according to the third embodiment.

Fifth accommodation portions 160-1 and 160-2 may be formed on the rear surface 190H of the housing 190. The fifth accommodation portions 160-1 and 160-2 are configured to accommodate the first sound outputters 101-1 and 101-2. One or more the fifth accommodation portions 160-1 and 160-2 may be installed on the rear surface 190H of the housing 190. The number of the fifth accommodation portions 160-1 and 160-2 may correspond to the number of the first sound outputters 101-1 and 101-2 to be installed.

Referring to FIG. 33, the fifth accommodation portions 160-1 and 160-2 may include an eleventh partition 160a formed in such a manner that one end thereof is in contact with a position, which is adjacent to a lower end of the rear surface of 190H, at a right angle and the other end thereof is provided with a bending portion, and a twelfth partition 160b configured to be in contact with the bending portion of the eleventh partition 160a and extended to the downward direction. The eleventh partition 160a, the twelfth partition 160b and the vicinity of the lower end of the rear surface 190h may form a fifth accommodation groove. Between the twelfth partition 160b and the vicinity of the lower end of the rear surface 190h, an opening 161 may be disposed to face the downward direction. As described above, the opening 161 are formed to extend in the longitudinal direction at the lower ends of the fifth accommodation portions 160-1 and 160-2 by corresponding to the radiation apertures 112a formed along the outer surface of the guide tube 112.

The first sound outputters 101-1 and 101-2 are mounted to the fifth accommodation groove of the fifth accommodation portions 160-1 and 160-2 in such a manner that the radiation apertures 112a are directed downward by corresponding to the direction in which the opening 161 of the fifth accommodation portions 160-1 and 160-2 are formed.

Therefore, as shown in FIG. 34, the first sound outputters 101-1 and 101-2 mounted on the fifth accommodation portions 160-1 and 160-2 generally output sounds in the downward direction. Accordingly, the sound may be radiated in the range z3 including the downward direction, the lateral direction and the backward direction in the vicinity of the lower corner of both sides. In this case, a high frequency sound f5 is directed to the lateral direction and a low frequency sound f6 is directed to the downward direction. When the sound radiated from the first sound outputters 101-1 and 101-2 is directed to the downward direction, the ambient sound may be more emphasized. However, the height effect may become relatively weak.

Figure 35:
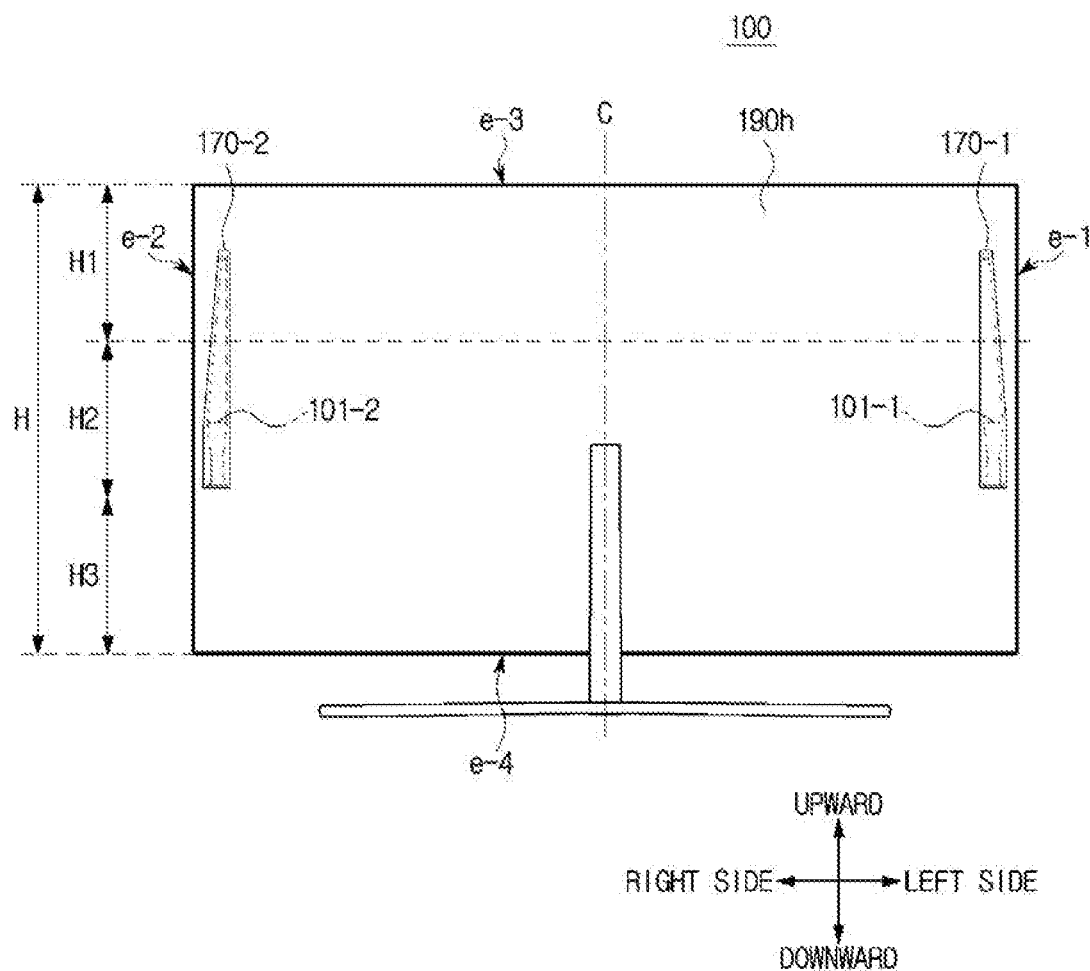
FIG. 35 is a rear view illustrating a fourth embodiment of the display apparatus provided with the first sound outputter.
Figure 36:
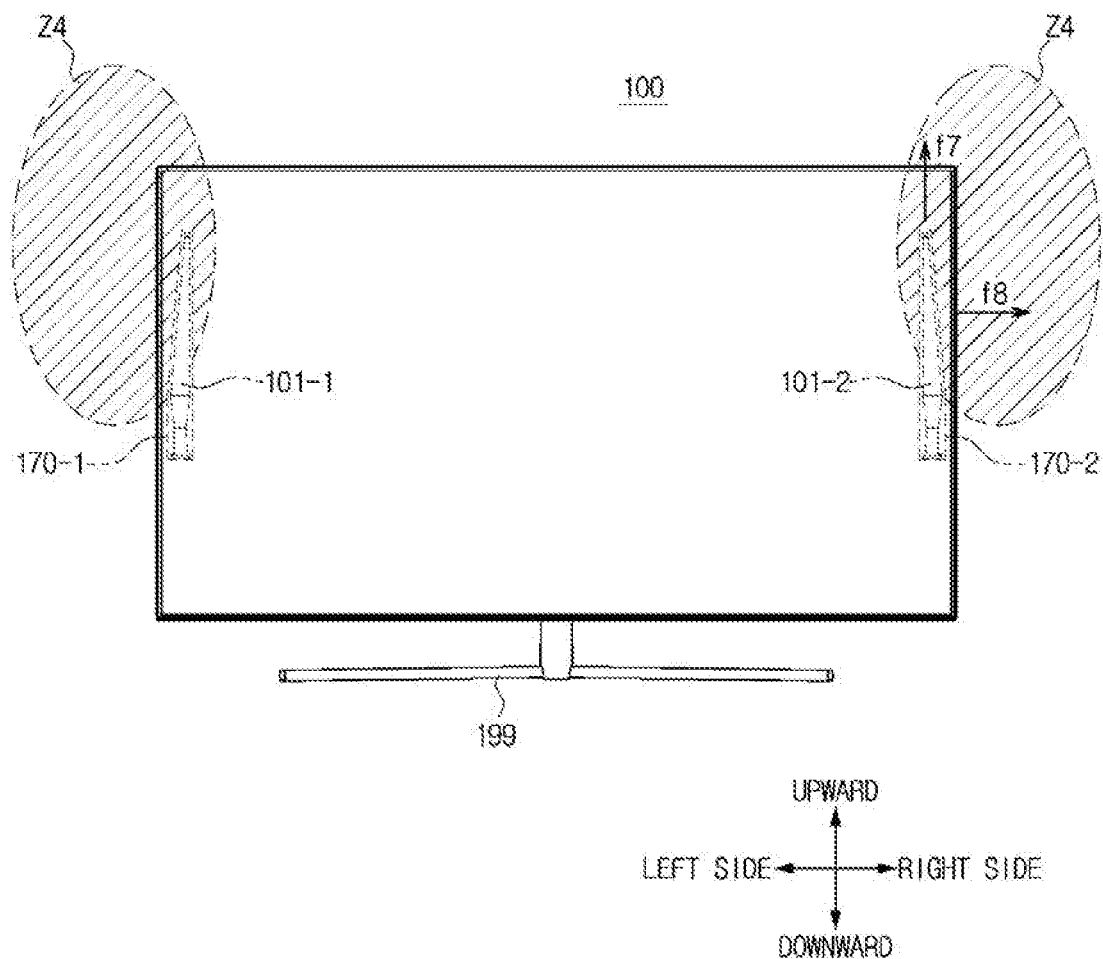
FIG. 36 is a view illustrating the radiation characteristics when the sound reflector is provided on the rear surface of the display apparatus according to the fourth embodiment.

FIG. 35 is a rear view illustrating a fourth embodiment of the display apparatus provided with the first sound outputter, and FIG. 36 is a view illustrating the radiation characteristics when the sound reflector is provided on the rear surface of the display apparatus according to the fourth embodiment.

As illustrated in FIG. 35, the first sound outputters 101-1 and 101-2 may be installed in contact with or adjacent to opposite boundaries e-1 and e-2 of the rear surface 190h of the display apparatus 100. Particularly, the first sound outputters 101-1 and 101-2 are installed in parallel to or in substantially parallel to the opposite boundaries e-1 and e-2 of the rear surface 190h. Alternatively, the first sound outputters 101-1 and 101-2 are installed adjacent to the opposite boundaries e-1 and e-2 of the rear surface 190h at a predetermined angle. Accordingly, the longitudinal direction of the first sound outputters 101-1 and 101-2 may be installed along the up and down direction (e.g., a vertical direction with respect to the ground). Depending on embodiments, the first sound outputters 101-1 and 101-2 are installed on any one of the upper portion H1, the middle portion H2, and the lower portion H3. Alternatively, the first sound outputters 101-1 and 101-2 are installed on at least two of the upper portion H1, the middle portion H2, and the lower portion H3. Depending on embodiments, the first sound outputters 101-1 and 101-2 may be vertically installed on the center line c, the vicinity of the center line c, or a position that may be designed.

According to an embodiment, the first sound outputters 101-1 and 101-2 may be installed in such a manner that one end thereof to which the cap 114 is mounted, is in contact with or adjacent to the upper end boundary e-3. In addition, the first sound outputters 101-1 and 101-2 may be installed in such a manner that one end thereof to which the cap 114 is mounted, is in contact with or adjacent to the lower end boundary e-4.

In order to accommodate the first sound outputters 101-1 and 101-2, sixth accommodation portions 170-1 and 170-2 may be further installed on the opposite boundaries e-1 and e-2 of a rear surface 190h of the display apparatus 100 or on the vicinity of the opposite boundaries e-1 and e-2 along the opposite boundaries e-1 and e-2. For example, the sixth accommodation portions 170-1 and 170-2 may be implemented in such a manner that the first accommodation portions 140-1 and 140-2, the second accommodation portions 143-1 and 143-2, the third accommodation portions 150-1 and 150-2, the fourth accommodation portions 153-1 and 153-2 and/or the fifth accommodation portions 160-1 and 160-2 are installed in the up and down direction.

When the first sound outputters 101-1 and 101-2 are installed on the rear surface 190h of the display apparatus 100 in such a manner that one end thereof to which the cap 114 is mounted, is in contact with or adjacent to the upper end boundary e-3, the sound is substantially radiated to a range z4 including the upper left direction or the upper right direction, as shown in FIG. 36. In this case, a high frequency sound f7 is transmitted substantially in the upward direction and a low frequency sound f8 is transmitted substantially in the lateral direction. Accordingly, when the first sound outputters 101-1 and 101-2 output a sound, the user can listen to a sound in which the surround effect is relatively strong but the height effect is not relatively weak.

Figure 37:
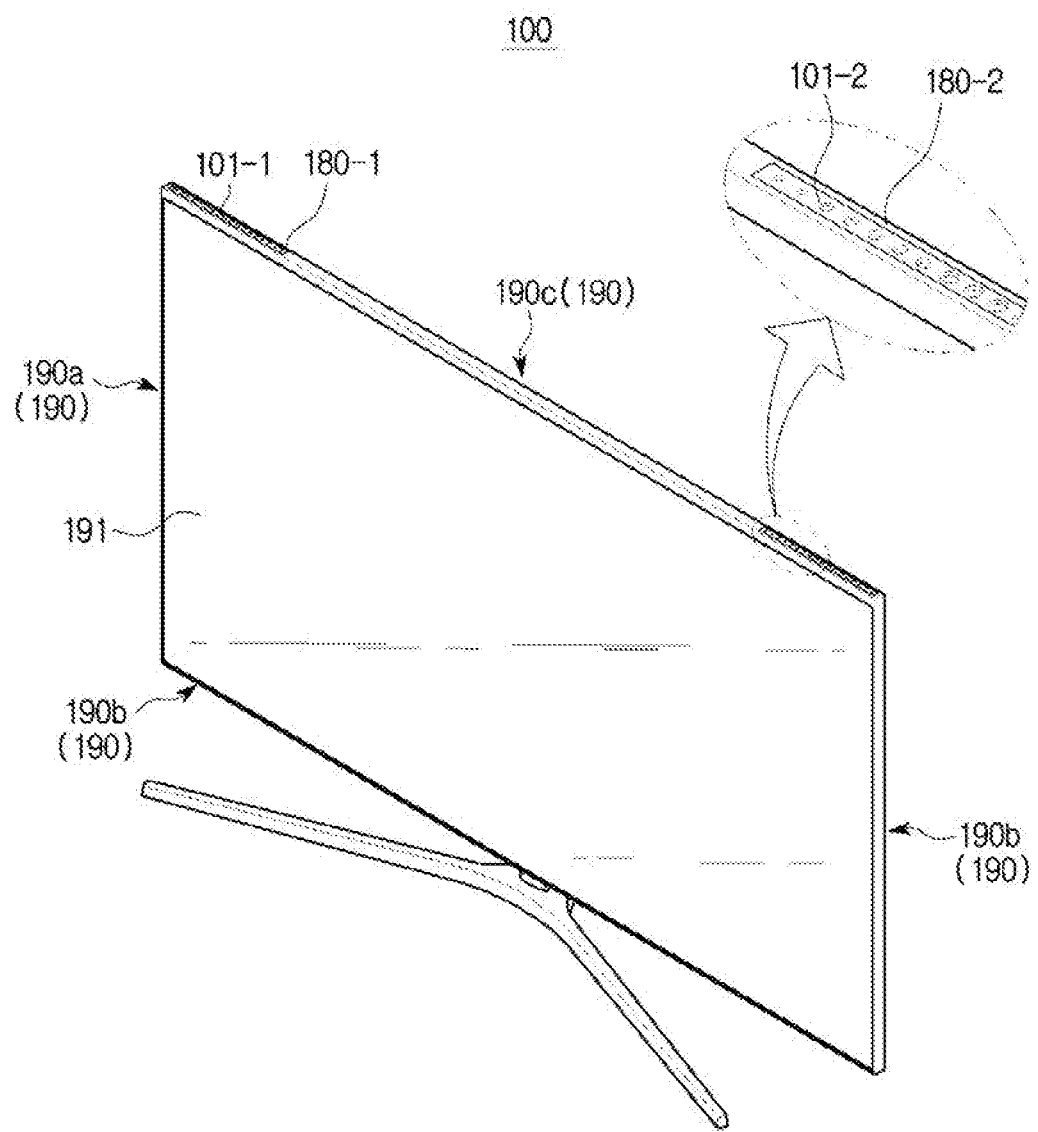
FIG. 37 is a perspective view illustrating a fifth embodiment of the display apparatus provided with the first sound outputter.

FIG. 37 is a perspective view illustrating a fifth embodiment of the display apparatus provided with the first sound outputter.

As illustrated in FIG. 37, the housing 190 of the display apparatus 100 may include a left side 190a, a right side 190b, and an upper side 190c. At least one of first sound outputters 101-1 and 101-2 may be mounted on at least one of the left side 190a, the right side 190b and the upper side 190c.

For example, as shown in FIG. 37, at least one first sound outputter 101-1 and 101-2 may be installed in such a manner that the radiation apertures 112a are positioned toward the upward direction on the upper side 190c. At least one sixth accommodation portion 180-1 and 180-2 may be provided on the upper side 190c so that at least one first sound outputter 101-1 and 101-2 may be stably mounted. The number of the sixth accommodation portions 180-1 and 180-2 corresponds to the number of the first sound outputters 101-1 and 101-2 to be mounted. The sixth accommodation portions 180-1 and 180-2 may include a recessed portion (i.e., a sixth accommodation portion) having a shape corresponding to the size and the shape of the first sound outputter 101-1 and 101-2. The first sound outputter 101-1 and 101-2 may be placed and installed in the sixth accommodation groove.

When at least one first sound outputter 101-1 and 101-2 is installed, a sound output from the at least one first sound outputter 101-1 and 101-2 may be transmitted to the ceiling R1, the side wall R2 and the rear wall R3 without the reflection caused by the display apparatus 100, and thus it may be possible to provide a user with a sound having the immersive effect, the height effect and/or the surround effect.

As described above, the at least one first sound outputter 101-1 or 101-2 may be installed on the right side 190b or the left side 190a in such a manner that the radiation apertures 112a face the right or left direction. For this installation, at least one accommodation groove may be provided on sides 190a and 190b. For emphasizing the ambient effect, at least one first sound outputter 101-1 and 101-2 may be mounted on the lower side.

Figure 38:
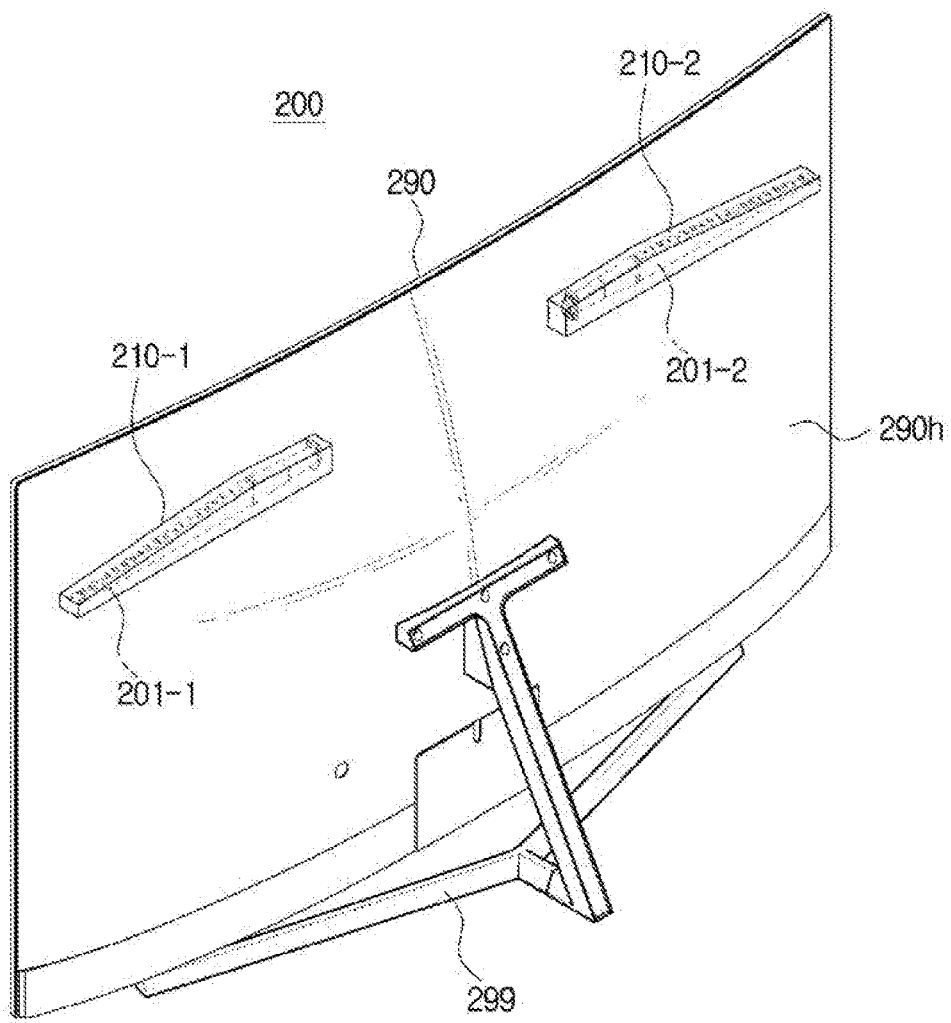
FIG. 38 is a view illustrating an example of a curved surface display apparatus and a first sound outputter installed thereon according to a sixth embodiment of the display apparatus.

FIG. 38 is a view illustrating an example of a curved surface display apparatus and a first sound outputter installed thereon as a sixth embodiment of the display apparatus.

Referring to FIG. 38, a display apparatus 200 may be a curved display apparatus. The curved display apparatus 200 may be implemented by mounting a curved display panel or a flexible display panel on a curved housing 290.

As described above, at least one first sound outputter 201-1 and 201-2 may be mounted on a rear surface 290h of the curved housing 290. At least one seventh accommodation portion 210-1 and 210-2 may be installed on the rear surface 290h of the curved housing 290 for the stable installation of the at least one first accommodation portions 201-1 and 201-2.

The at least one seventh accommodation portion 210-1 and 210-2 may be implemented by using at least one of the first accommodation portions 140-1 and 140-2, the second accommodation portions 143-1 and 143-2, the third accommodation portions 150-1 and 150-2, the fourth accommodation portions 153-1 and 153-2, the fifth accommodation portions 160-1 and 160-2, and the sixth accommodation portions 180-1 and 180-2. In other words, at least one of the first accommodation portions 140-1 and 140-2, the second accommodation portions 143-1 and 143-2, the third accommodation portions 150-1 and 150-2, the fourth accommodation portions 153-1 and 153-2, the fifth accommodation portions 160-1 and 160-2, and the sixth accommodation portions 180-1 and 180-2 may be applied to the curved display apparatus 200.

Even when the at least one first sound outputter 201-1 and 201-2 is mounted on the curved display apparatus 200, it may be possible to obtain the immersive effect, the height effect, the surround effect or the ambient effect, which is similar with or the same as the flat display apparatus 100.

Hereinafter, the control of the display apparatuses 100 and 200 will be described with reference to FIG. 39.

Figure 39:
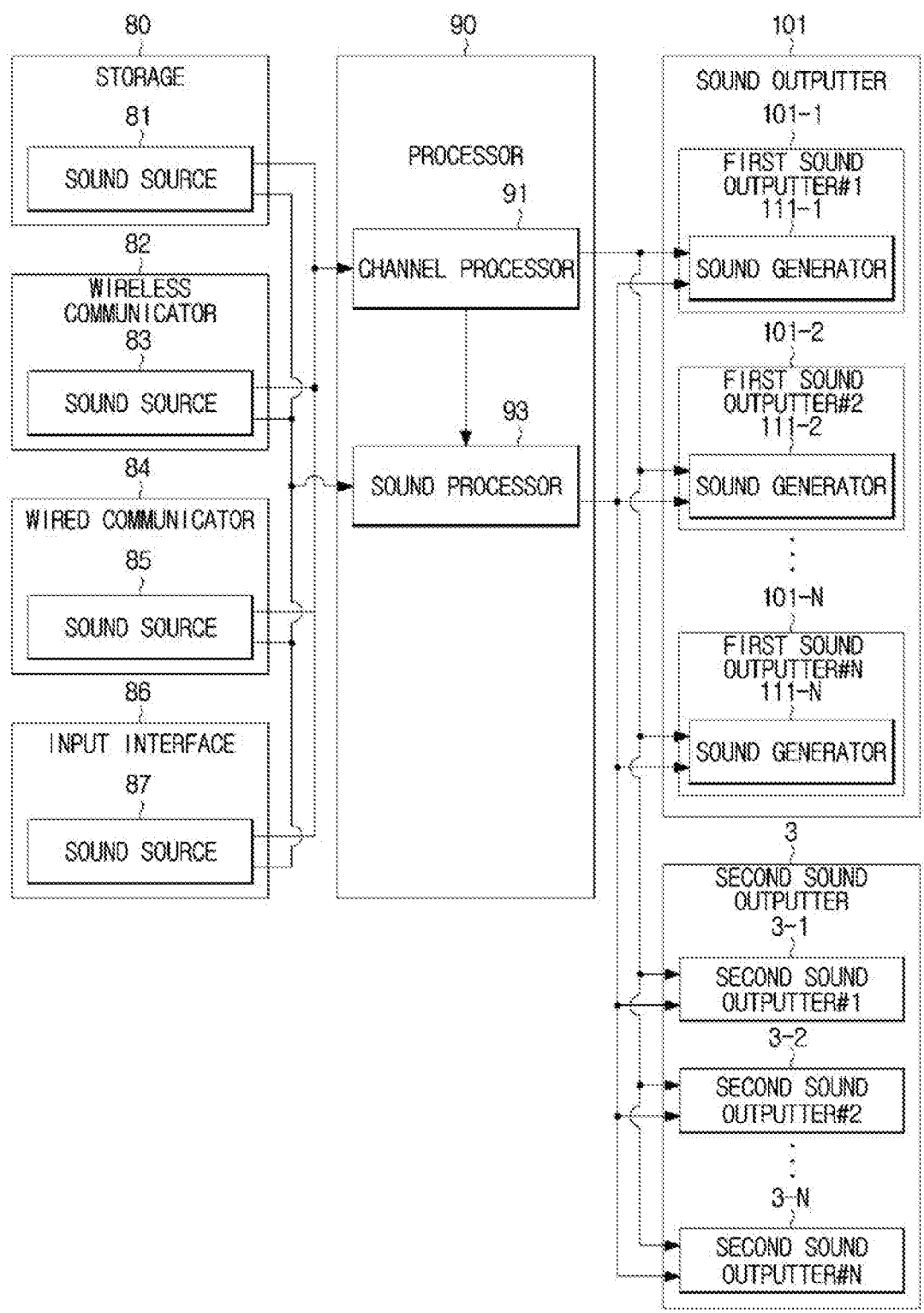
FIG. 39 is a control block diagram according to an embodiment of the display apparatus.

FIG. 39 is a control block diagram according to an embodiment of the display apparatus.

As illustrated in FIG. 39, the display apparatuses 100 and 200 may include a first sound outputter 101 and a processor 90. The display apparatuses 100 and 200 may further include a second sound outputter 3, a storage 80, a wireless communicator 82, a wired communicator 84, and an input interface 86, as needed. At least one of the second sound outputter 3, the storage 80, the wireless communicator 82, the wired communicator 84, and the input interface 86 may be omitted.

The first sound outputter 101, the processor 90, the second sound outputter 3, the storage 80, the wireless communicator 82, the wired communicator 84, and the input interface 86 may be mounted inside or outside the display apparatus 100, 200 according to the design.

The processor 90 may be configured to transmit and receive data to and from the first sound outputter 101, the second sound outputter 3, the storage 80, the wireless communicator 82, the wired communicator 84, and the input interface 86. The processor 90 may be implemented using at least one semiconductor chip embedded in the housing 190.

The first sound outputter 101, the processor 90, the second sound outputter 3, the storage 80, the wireless communicator 82, the wired communicator 84, and the input interface 86 have been described with reference to FIG. 1, and thus only control in the display apparatuses 100 and 200 will be described below.

The processor 90 may receive sound sources 81, 83, 85 and 87 (including audio data of at least one channel) from at least one of the storage 80, the wireless communicator 82, the wired communicator 84, and the input interface 86.

The sound sources 81, 83, 85, and 87 including the audio data of at least one channel may be transmitted to a channel processor 91 of the processor 90.

The channel processor 91 identifies the number of channels of the received sound sources 81, 83, 85, and 87. For example, the processor 90 may identify the number of main channels of the sound sources 81, 83, 85, and 87, whether a woofer is required, and whether an upward speaker is required. In addition, the channel processor 91 may identify whether the number of channels of the received sound sources 81, 83, 85 and 87 is identical to the number of sound output apparatus, that is, the number of the first sound outputter 101 and the number of the second sound outputter 3. The channel processor 91 may further perform the up-mixing or down-mixing based on the result of the identification.

For example, when the number of channels of the received sound sources 81, 83, 85, and 87 is smaller than the number of the sound output apparatuses, that is, the number of the first sound outputter 101 and the number of the second sound outputter 3, the channel processor 91 may increase the number of the channels of the received sound sources 81, 83, 85 and 87, that is, the up-mixing, by duplicating and/or dividing the audio data into a plurality of channels.

Conversely, when the number of channels of the received sound sources 81, 83, 85, and 87 is greater than the number of the sound output apparatuses, that is, the number of the first sound outputter 101 and the number of the second sound outputter 3, the channel processor 91 may reduce the number of the channel of the received sound sources 81, 83, 85, and 87, that is, the down-mixing, by combining and synthesizing audio data of at least two channels, and/or deleting audio data of at least one channel.

When the number of channels of the received sound sources 81, 83, 85, and 87 is the same as the number of the sound output apparatuses, that is, the number of the first sound outputter 101 and the number of the second sound outputter 3, the channel processor 91 may not perform the up-mixing or down-mixing.

Sequentially, the channel processor 91 may perform channel mapping. Particularly, the channel processor 91 may select audio data to be output through the first sound outputter 101 and the second sound outputter 3, by distributing each channel to the sound output apparatuses, that is, the first sound outputter 101 and the second sound outputter 3, wherein the audio data to be output through the first sound outputter 101 and the second sound outputter 3 corresponds to a channel distributed to the first sound outputter 101 and the second sound outputter 3. In this case, the channel processor 91 may distribute each channel to the first sound outputter 101 and the second sound outputter 3 based on metadata provided separately.

Accordingly, audio data to be output through the plurality of the first sound outputters 101-1, 101-2, . . . , and 101-N, and audio data to be output through the plurality of the second sound outputters 3-1, 3-2, . . . , and 3-N may be selected.

A sound processor 93 may apply a signal processing algorithm, which is to improve the immersive effect and the sound field, to sound sources 81, 83, 85, and 87 by considering the characteristics of the sound output apparatus, that is, at least one of the first sound outputter 101 and the second sound outputter 3. The signal processing algorithm may include applying a reinforcement signal to the audio data of each channel included in the sound sources 81, 83, 85, and 87, selectively delaying the output time of audio data of each channel, or amplifying audio data of each channel. In addition, the signal processing algorithm may further include at least one filter algorithm such as a filter configured to remove a signal having a certain frequency.

The sound processor 93 may apply the signal processing algorithm to the received sound sources 81, 83, 85, and 87 by further considering the reflection characteristics of the indoor space R and the directivity of the first sound outputter 101.

According to the processing operation of the sound processor 93, the user can listen to a more immersive sound from the display apparatuses 100 and 200.

Depending on embodiments, the sound processor 93 may not apply the signal processing algorithm to the received sound sources 81, 83, 85, and 87. In this case, a sound having a natural sound effect may be output by at least one of the first sound outputter 101 and the second sound outputter 3.

The channel processor 91 and the sound processor 93 may be physically separable or logically separable. When the channel processor 91 and the sound processor 93 are physically separable, the channel processor 91 and the sound processor 93 may be implemented using separate circuits or semiconductor chips, respectively. At least one of the channel processor 91 and the sound processor 93 may be omitted.

The processor 90 may transmit a control signal to at least one of the first sound outputters 101; 101-1, 101-2, . . . , and 101-N, and the second sound outputters 3; 3-1, 3-2, . . . , and 3-N, based on the processing result of the channel processor 91 and the sound processor 93. The sound generators 111-1, 111-2, . . . , and 111-3 of the first sound outputters 101; 101-1, 101-2, . . . , and 101-N may generate a sound wave corresponding to an audio signal, according to the transmitted control signal, and the generated sound waves may be radiated to the outside through the radiation apertures 112*a*. Accordingly, the first sound outputter 101; 101-1, 101-2, . . . , 101-N may output a sound corresponding to an audio signal in a predetermined channel.

Hereinbefore, various embodiments of the display apparatuses 100 and 200 provided with the first sound outputter 1 have been described, but the first sound outputter 1 may be provided at various positions in various ways according to the design.

The above-described display apparatuses 100 and 200 may be applied to other sound output apparatuses, such as a smart phone, a laptop computer, or an audio device without changes or with modifications.

Hereinafter, a control method of the sound output apparatus will be described with reference to FIG. 40.

Figure 40:
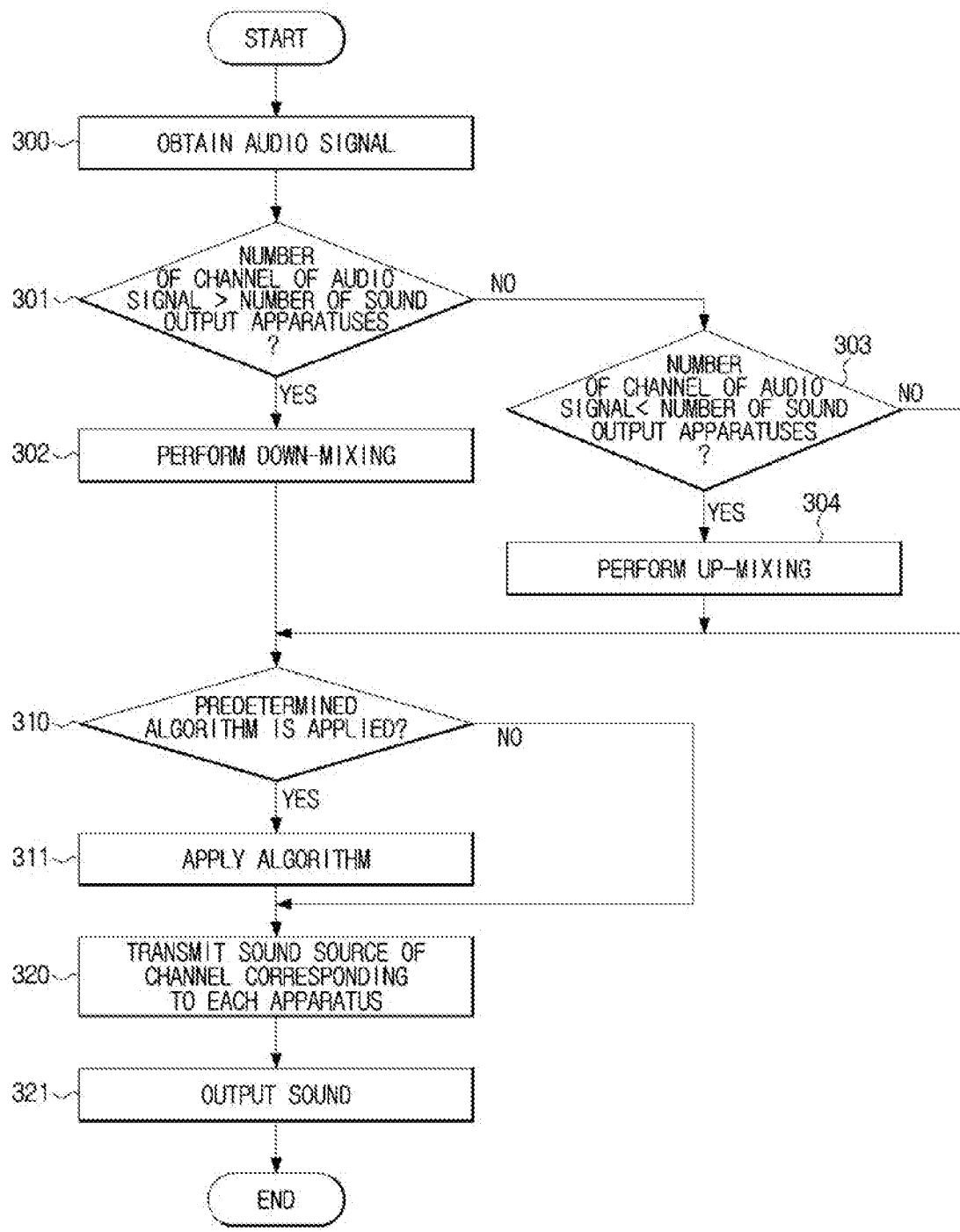
FIG. 40 is a flowchart illustrating an embodiment of a method for controlling the second sound outputter.

FIG. 40 is a flowchart illustrating an embodiment of a method for controlling the sound output apparatus.

Referring to FIG. 40, a sound source including an audio signal of at least one channel is obtained (300). Acquisition of the sound source may be performed by the processor, and the processor may acquire the sound source from at least one of the storage, the wireless communicator, the wired communicator, and the input interface.

Sequentially, the number of channels of the audio signal contained in the sound source may be compared with the number of apparatuses configured to output a sound, that is, the number of the at least one first sound outputter and the number of the at least one second sound outputter (301 and 303).

When the number of channels of the audio signal is greater than the number of apparatuses configured to output a sound (Yes in 301), down-mixing is performed (302). That is, the number of audio channels is reduced.

When the number of channels of the audio signal is smaller than the number of apparatuses configured to output a sound (No in 301 and Yes in 303), up-mixing is performed (304). That is, the number of audio channels is increased.

When the number of channels of the audio signal is equal to the number of apparatuses configured to output a sound (No in 301 and No in 303), the performing of the down-mixing and up-mixing is omitted.

Whether or not to apply the predetermined signal processing algorithm is determined according to the user's operation or predetermined settings (310). For example, the signal processing algorithm may include an application algorithm of a reinforcement signal about audio data of each channel, a selective delay algorithm of output time of audio data of each channel, an amplification algorithm of audio data of each channel, and/or at least one kind of filter algorithm.

When the application of the signal processing algorithm is needed (Yes in 310), the signal processing algorithm is applied to the audio data needing the signal processing algorithm among the audio data of each channel (311).

When the application of the signal processing algorithm is not needed (No in 310), the application process of the signal processing algorithm is omitted.

Sequentially, an electrical signal corresponding to the audio signal according to the processing result may be transmitted to the apparatus configured to output a sound, that is, the at least one first sound outputter and/or the at least one second sound outputter, respectively (320). In this case, an electrical signal may not be transmitted to at least one of the first sound outputter and the at least one second sound outputter.

The apparatus configured to output a sound, that is, the at least one first sound outputter and/or the at least one second sound outputter may output a sound in response to the transmission of the signal (321). Accordingly, a user can listen to a sound having at least one of the immersive effect, the height effect, the surround effect, and the ambient effect.

The control method of the sound output apparatus according to the above-described embodiment can be applied to the control method of the display apparatus provided with the first sound outputter without changes or with modifications.

As is apparent from the above description, according to the sound output apparatus, the display apparatus and the control method thereof, it may be possible to output a sound having the high immersive effect and the wide sound field.

The sound output apparatus, the display apparatus and the control method thereof may allow an apparatus, in which a conventional speaker cannot be installed or a number of speakers is limited due to a small size or a thin thickness, to implement the high immersive effect and the sound field effect.

The sound output apparatus, the display apparatus and the control method thereof may allow a sound having the directivity to be radiated to a variety of reflectors in the indoor space so that the reflected sound can be appropriately provided to the user.

The sound output apparatus, the display apparatus and the control method thereof may allow a slip display apparatus or a curved display apparatus to implement the sound having the high immersive effect and the wide sound field effect, wherein the slip display apparatus or the curved display apparatus is provided with a main speaker device, which is installed at the lower end of the display apparatus to allow the output direction of the sound to face the lower end direction due to the structure or the design thereof.

The control method of the sound output apparatus and the control method of the display apparatus according the above-described embodiment may be implemented in the form of a program executed by a variety of computer means. The program may include program instructions, data files, and data structures as itself or a combination therewith. The program may be designed or manufactured by using higher level code executed by the computer by using an interpreter, as well as by using a machine code that is produced by a compiler. In addition, the program may be particularly designed to implement the control method of the above mentioned image acquisition apparatus or may be implemented by using various functions or definition that are well-known and available to a group of ordinary skill in the computer software field.

Programs for implementing the control method of the above-mentioned sound output apparatus may be recorded on a recording medium readable by a computer. The recording medium readable by a computer may include various types of hardware devices capable of storing a particular program executed in response to a call from a computer, e.g. magnetic disk storage media such as a hard disk or a floppy disk, optical media such as a magnetic tape, a compact disc (CD) or a DVD, magneto-optical media such as a floptical disk, and semiconductor memory devices such as ROM, RAM, or flash memory.

Hereinbefore, a variety of embodiments of the sound output apparatus, the display apparatus and the control method of the sound output apparatus are described, but is not limited thereto. A variety of embodiments which is implementable by those skilled in the art by correcting and modifying based on the above mentioned embodiment may correspond to the above mentioned sound output apparatus, display apparatus and control method of the sound output apparatus. For example, when the above-mentioned techniques is executed in a different order from the above-mentioned method, and/or the above-mentioned components such as system, structure, device and circuit is coupled or combined in a manner different from the above-mentioned method or is replaced or substituted by other components or equivalents, the same or the similar result as the above-mentioned sound output apparatus, display apparatus and control method of the sound output apparatus may be achieved and those may correspond to an example of the above-mentioned sound output apparatus, display apparatus and control method of the sound output apparatus.

What is claimed is:

1. A sound output apparatus comprising:
a housing; and
at least one speaker provided on a surface of the housing, wherein the housing comprises an accommodation portion provided with an insertion groove to which the at least one speaker is inserted and mounted,
wherein the at least one speaker comprises:
a sound generator configured to generate a sound; and
a guide tube that has a cross sectional area that changes from a first end of the guide tube to a second end of the guide tube,
wherein the guide tube receives the generated sound via the first end, and the guide tube comprises an outer surface having a plurality of radiation apertures arranged in at least one row,
wherein the at least one speaker is provided on at least one of an upper portion of the surface of the housing, a middle portion of the surface of the housing, and a lower portion of the surface of the housing, and
wherein the second end of the guide tube is in contact with or adjacent to one of a side end boundary and an upper end boundary of the surface of the housing.

2. The sound output apparatus of claim 1, wherein the at least one speaker is provided on the surface of the housing such that the outer surface of the guide tube having the plurality of radiation apertures extends in a direction in parallel to the surface of the housing, a direction inclined with respect to the surface of the housing or a direction normal to the surface of the housing.

3. The sound output apparatus of claim 1, wherein the guide tube extends in a direction parallel to the upper end boundary or the side end boundary of the surface of the housing.

4. The sound output apparatus of claim 1, wherein the accommodation portion provided with the insertion groove comprises at least one of:
a first accommodation portion provided with a first insertion groove to which the at least one speaker is inserted and mounted, wherein the first insertion groove protrudes from the surface of the housing;
a second accommodation portion provided with a second insertion groove to which the at least one speaker is inserted and mounted, wherein the second insertion groove is recessed in the surface of the housing, formed to be in parallel to the surface of the housing, or formed to be inclined with respect to the surface of the housing; and
a third accommodation portion provided with a third insertion groove to which the at least one speaker is inserted and mounted, wherein the third insertion groove is formed to be inserted into the surface of the housing.

5. The sound output apparatus of claim 4, wherein the first insertion groove faces an upper end of the housing, a side end of the housing, or a lower end of the housing.

6. The sound output apparatus of claim 4, wherein the second insertion groove faces in a direction inclined with respect to the surface of the housing, a direction normal to the surface of the housing or a tangential direction of the surface of the housing.

7. The sound output apparatus of claim 1, further comprising:
a processor configured to distribute an audio signal comprising a signal of at least one channel, to the at least one speaker.

8. The sound output apparatus of claim 7, wherein the processor is further configured to perform at least one of up-mixing and down-mixing on the audio signal.

9. The sound output apparatus of claim 7, wherein the at least one speaker comprises at least two speakers provided on the housing.

10. The sound output apparatus of claim 9, wherein the processor is further configured to distribute the audio signal to the sound generator of the at least two speakers.

11. A sound output apparatus comprising:
a housing;
at least one speaker provided on a first surface of the housing, and
a display panel provided on a second surface of the housing opposite to the first surface of the housing,
wherein the housing comprises an accommodation portion provided with an insertion groove to which the at least one speaker is inserted and mounted,
wherein the at least one speaker comprises:
a sound generator configured to generate a sound; and
a guide tube that has a cross sectional area that changes from a first end of the guide tube to a second end of the guide tube, and
wherein the guide tube receives the generated sound via the first end, and the guide tube comprises an outer surface having a plurality of radiation apertures arranged in at least one row.

12. The sound output apparatus of claim 11, wherein the display panel comprises a rigid display panel or a flexible display panel.

13. The sound output apparatus of claim 11, wherein the plurality of radiation apertures faces in a direction toward an upper end of the housing, a direction opposite to a direction to which the display panel is directed, a side surface direction of the housing, a direction toward of a lower end of the housing, or a direction in a range between the direction toward the upper end of the housing and the direction opposite to the direction to which the display panel is directed.

14. A control method of a sound output apparatus comprising:
obtaining an audio signal composed of a signal of at least one channel;
distributing the audio signal to at least one speaker, wherein the at least one speaker is provided on a surface of a housing of the sound output apparatus; and
radiating a sound from the at least one speaker,
wherein the at least one speaker comprises:
a sound generator configured to generate the sound; and
a guide tube that has a cross sectional area that changes from a first end of the guide tube to a second end of the guide tube,
wherein the guide tube receives the generated sound via the first end, and the guide tube comprises an outer surface having a plurality of radiation apertures arranged in at least one row,
wherein the at least one speaker is provided on at least one of an upper portion of the surface of the housing, a middle portion of the surface of the housing, and a lower portion of the surface of the housing, and wherein the second end of the guide tube is in contact with or adjacent to one of a side end boundary and an upper end boundary of the surface of the housing.

15. The control method of claim 14, further comprising: performing at least one of up-mixing and down-mixing on the audio signal.

16. The control method of claim 15, further comprising: performing sound processing by applying a predetermined algorithm to the audio signal.

17. A display apparatus comprising:
an exterior housing;
a display panel installed on a first surface of the exterior housing; and
at least one speaker provided on at least one of a second surface opposite to the first surface of the exterior housing and a side surface of the exterior housing,
wherein the exterior housing comprises an accommodation portion provided with an insertion groove to which the at least one speaker is inserted and mounted,
wherein the at least one speaker comprises:
a sound generator configured to generate a sound; and
a guide tube that has a cross sectional area that changes from a first end of the guide tube to a second end of the guide tube, and
wherein the guide tube receives the generated sound via the first end, and the guide tube comprises an outer surface having a plurality of radiation apertures arranged in at least one row.

18. The sound output apparatus of claim 1, wherein the surface of the housing is a rear surface of the housing, an upper surface of the housing, or a side surface of the housing.

\* \* \* \* \*